United States Patent [19]

Galanis et al.

[11] 4,121,292
[45] Oct. 17, 1978

[54] ELECTRO-OPTICAL GAGING SYSTEM HAVING DUAL CAMERAS ON A SCANNER

[75] Inventors: Tom L. Galanis, Bethlehem; Joel L. Hoffner, Johnstown; John C. Clymer, Bethlehem, all of Pa.; Richard S. Hostetter, Jr., Orchard Park, N.Y.; Duane T. Jones, Coopersburg, Pa.; Ronald W. Yerkes, Orchard Park, N.Y.

[73] Assignee: Bethlehem Steel Corporation, Bethlehem, Pa.

[21] Appl. No.: 778,809

[22] Filed: Mar. 17, 1977

[51] Int. Cl.$^2$ ....................... B21B 37/00; G06F 15/46
[52] U.S. Cl. .................................... 364/571; 364/469; 72/37
[58] Field of Search ............................ 235/151.3, 151.1; 72/37; 29/DIG. 32; 356/158, 160, 167, 159, 156; 358/101, 107; 364/472, 471

[56] References Cited

U.S. PATENT DOCUMENTS

| Re. 27,370 | 5/1972 | McNaugher | 72/8 |
|---|---|---|---|
| 3,052,809 | 9/1962 | Bahring et al. | 313/84 |
| 3,676,652 | 7/1972 | Millis, Jr. et al. | 235/151.1 X |
| 3,686,437 | 8/1972 | Leonard | 178/7.6 |
| 3,713,313 | 1/1973 | Spradlin | 235/151.1 X |
| 3,761,182 | 9/1973 | Kubisiak et al. | 356/160 |
| 3,854,822 | 12/1974 | Altman et al. | 356/156 |
| 3,874,798 | 4/1975 | Antonsson et al. | 356/159 |
| 3,894,259 | 7/1975 | Webb | 313/368 |
| 3,902,811 | 9/1975 | Altman | 356/156 |
| 3,907,439 | 9/1975 | Zanoni | 356/160 |
| 3,968,681 | 7/1976 | Cornforth et al. | 73/67.5 R |

OTHER PUBLICATIONS

"By Continuously Measuring the Dimensions of Rods and Bars, Expensive Loss of Stock Can be Avoided", AGA Electronics Div., Product AGA Diameter, Lidingo, Sweden, 1974, 511001, 8 pp.

*Primary Examiner*—Edward J. Wise
*Attorney, Agent, or Firm*—Joseph J. O'Keefe; John I. Iverson; George G. Dower

[57] ABSTRACT

Computerized electro-optical system gages two orthogonal dimensions of a moving hot bar at various peripheral positions. Dual back-light electronic camera heads mounted 90° apart on a scanner generate high-speed bar shadow pulses which represent the bar dimensions. Bar pulses are processed by way of individual camera electronics and a digital computer. CRT and printing terminals, interacting with the computer, indicate and/or record each cold-size bar diameter measurement, a plot of bar profile deviation from aim gage overlaid on full- and half-commercial tolerance references with a data header, and a gaging system histogram.

Each camera head electronics includes camera AGC circuit, a digital type one-axis bidirectional linear sweep, bar pulse edge-detection with an autocorrelator to remove noise and enhance the bar pulse, and a digital accumulator of digital bar size signals and digital bar position-in-field-of-view signals. The digital computer assimilates each bar size and bar position digital signal along with scanner position, bar temperature and other data signals. The computer is programmed to: (a) compensate each bar size signal for field-of-view errors and other optical and electronic nonlinearities, bar temperature and other sources of error; (b) calibrate the gage off-line and automatically recalibrate the gage on-line to correct for drift and slope errors; (c) automatically drive the scanner and implement incremental digital storage of corrected bar size signals for bar profile plotting; (d) perform gaging system histograms; and (e) communicate with the CRT and printing terminals and an exterior control system.

24 Claims, 85 Drawing Figures

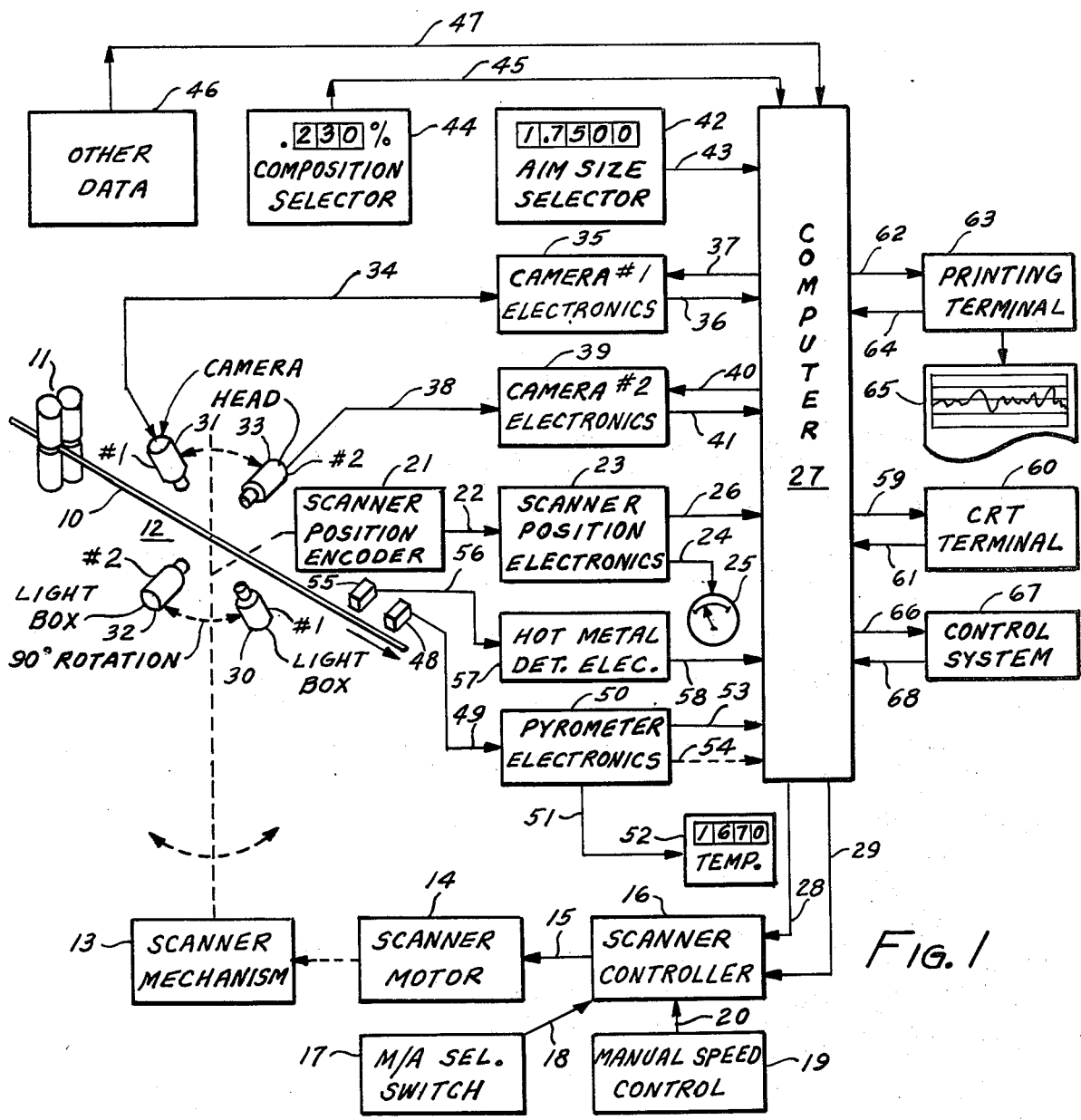
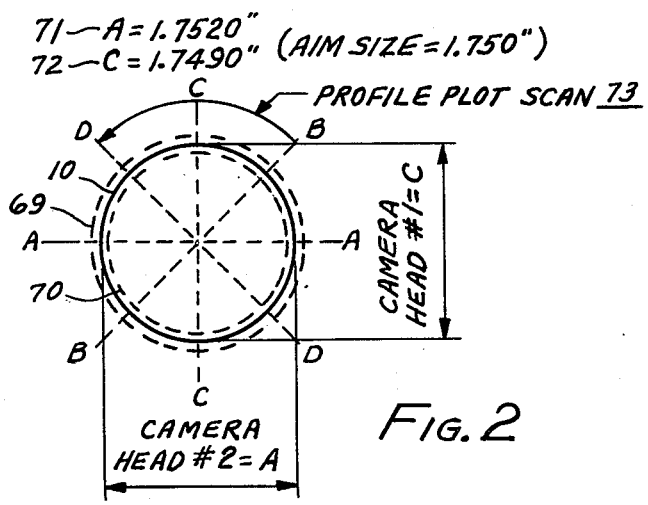
Fig. 1
Fig. 2

OPERATING DATA HEADER

```
    Date    Time              TEMP22 = 1670

AIM   = 1.7500  O/R=0.0115                    %OVER =  48
    CARBON= 0.230   MIN=1.7422                    %UNDR =   0
    HOTAIM= 1.7686  MAX=1.7578                    %O/RD =  44
```

```
                              76
     1.7700
     1.7690
     1.7680
     1.7670
     1.7660            76
     1.7650 - - - - - -/- - - - - - - - - - - - - - - - - - - - - - - -
     1.7640
     1.7630
     1.7620
 ̂    1.7610
 .    1.7600        78            74
 m    1.7590         /            /
 m    1.7580 B -30 -15  C  15******  D -30  -15   A   15   30   B
 =    1.7570              *       **
 4.   1.7560                       *
 5    1.7550     ******    *     * **
 2    1.7540 **        *           *   * **                          *
 x    1.7530         *       *       *   ** **                      **
(     1.7520                           *  ****      *              **
 S    1.7510      **    *       75   ***  *****
 E    1.7500 - - - - - - -*- - -/- - - - - - - - - - - - - - - - - - - -
 H    1.7490          *
 C    1.7480         *
 N    1.7470         *
 I    1.7460                      65
 -    1.7450                 79
 N    1.7440                 /
 O    1.7430
 I    1.7420 B -30 -15  C  15   30   D -30  -15   A   15   30   B
 T    1.7410
 A    1.7400
 I    1.7390
 V    1.7380
 E    1.7370          77
 D    1.7360          /
      1.7350 - - - - - -/- - - - - - - - - - - - - - - - - - - - - - - -
 E    1.7340
 Z    1.7330
 I    1.7320
 S    1.7310
      1.7300
 M
 I
 A
 -
 D
 L
 O
 C
```

SCANNER ANGULAR POSITION - DEGREES

FIG. 3

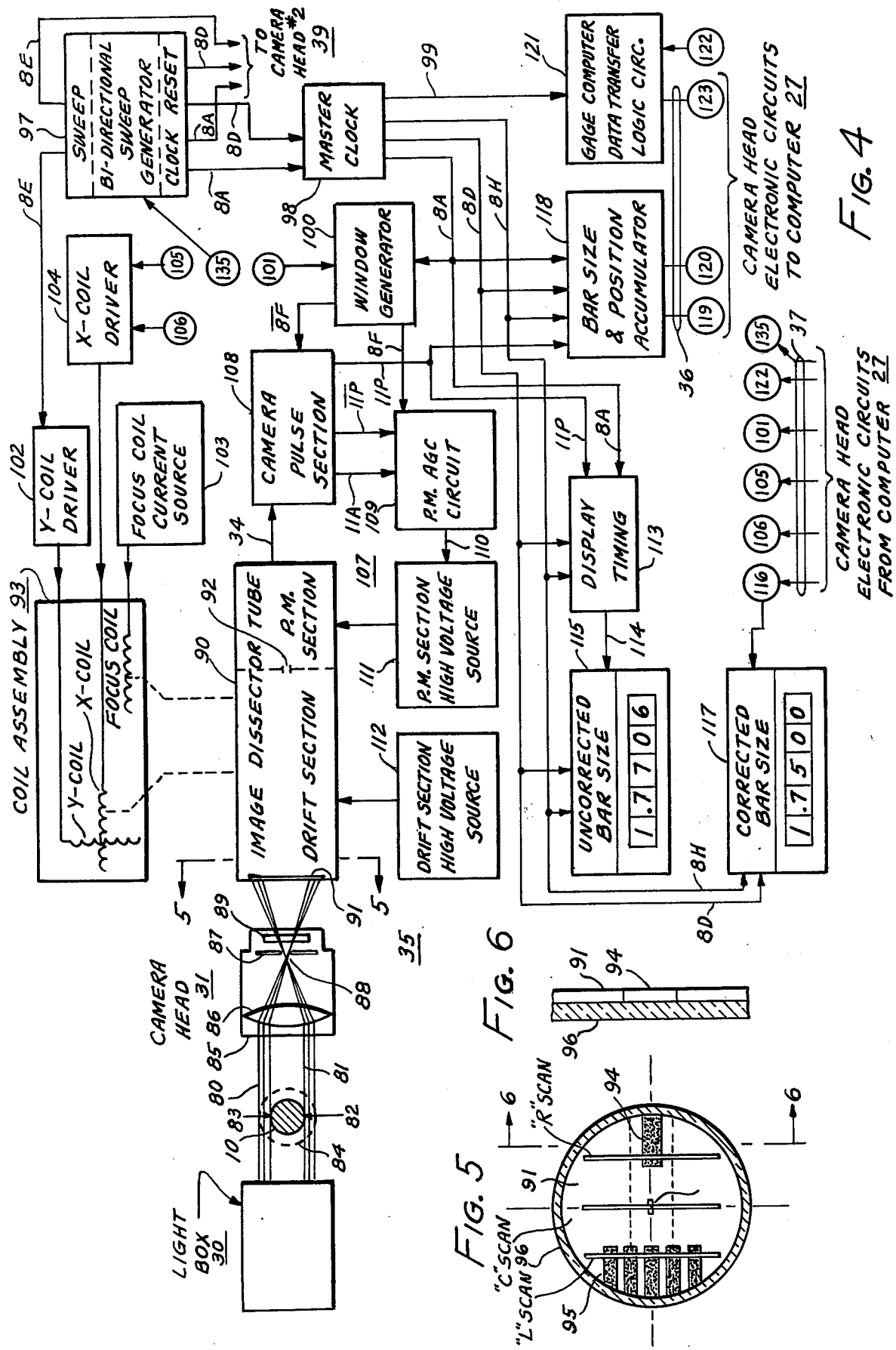

HEXADECIMAL CORE MAP

| TYPE | NAME | POSITION IN COMMON AREA | COMMON NAME | CORE LOCATION | DESCRIPTION |
|---|---|---|---|---|---|
| ARRAY | IFLDC1 | 0000 | IN | FCOMP1 | 9700 | HEAD 1 FIELD OF VIEW COMPENSATION MAP |
| ARRAY | IFLDC2 | 0000 | IN | FCOMP2 | 9800 | HEAD 2 FIELD OF VIEW COMPENSATION MAP |
| VARIABLE | IMULT1 | 0000 | IN | CORCOM | 9900 | HEAD 1 SLOPE CORRECTION |
| VARIABLE | IMULT2 | 0001 | IN | CORCOM | 9901 | HEAD 2 SLOPE CORRECTION |
| VARIABLE | IOFST1 | 0002 | IN | CORCOM | 9902 | HEAD 1 OFFSET CORRECTION |
| VARIABLE | IOFST2 | 0003 | IN | CORCOM | 9903 | HEAD 2 OFFSET CORRECTION |
| VARIABLE | ITMP1 | 0000 | IN | TMPOFF | 9904 | HEAD 1 AUTO-RECALIBRATION SLOPE CORRECTION |
| VARIABLE | ITMP2 | 0001 | IN | TMPOFF | 9905 | HEAD 2 AUTO-RECALIBRATION SLOPE CORRECTION |
| VARIABLE | IMASK1 | 0000 | IN | MSKCOM | 9906 | HEAD 1 RIGHT MASK REFERENCE VALUE |
| VARIABLE | IMASK2 | 0001 | IN | MSKCOM | 9907 | HEAD 2 RIGHT MASK REFERENCE VALUE |
| VARIABLE | IWINDX | 0002 | IN | MSKCOM | 9908 | WINDOW FOR NO X DEFLECT & RIGHT DEFLECT FOR HEAD 1 & HEAD 2 |
| VARIABLE | IGAGDM | 0003 | IN | MSKCOM | 9909 | SPARE - NO FUNCTION |
| ARRAY | ILFMSK | 0000 | IN | LEFTCL | 990A | LEFT MASK REFERENCE VALUES FOR HEAD 1 & HEAD 2 |
| ARRAY | IWINDO | 000A | IN | LEFTCL | 9914 | WINDOWS FOR EACH LEFT MASK ON HEAD 1 & HEAD 2 |
| VARIABLE | ISCNST | 0001 | IN | MASGAG | 9E5D | TARGET ANGLE FOR POSITIONING PROGRAM "GAGPOS" |
| VARIABLE | IBANGL | 0002 | IN | MASGAG | 9E5E | ANGULAR POSITION OF SCANNER IN COUNTS (255=90°) |
| VARIABLE | IANGLE | 0003 | IN | MASGAG | 9E5F | ANGULAR POSITION OF SCANNER IN DEGREES |
| VARIABLE | NSAMPL | 0006 | IN | MASGAG | 9E62 | THE NUMBER OF SAMPLES TO BE AVERAGED PER READING |
| ARRAY | IBDGT1 | 0007 | IN | MASGAG | 9E63 | PROFILE TABLE (CONTAINS 90-2° SLOTS) |
| ARRAY | IBDGT2 | 0065 | IN | MASGAG | 9EC1 | HISTOGRAM TABLE FOR HEAD 1 & HEAD 2 |
| ARRAY | IBDGT3 | 010C | IN | MASGAG | 9F68 | HISTOGRAM TABLE FOR DIFFERENCE BETWEEN HEAD 1 & HEAD 2 |
| VARIABLE | IDVLIM | 0161 | IN | MASGAG | 9FBD | MAXIMUM ALLOWABLE DEVIATION |
| VARIABLE | ICLFLG | 0162 | IN | MASGAG | 9FBE | CALIBRATION FLAG (PREVENTS CALLS TO CMPNST) |
| VARIABLE | IDEV1 | 0163 | IN | MASGAG | 9FBF | DEVIATION OF HEAD 1 FOR A SINGLE READING |
| VARIABLE | IDEV2 | 0164 | IN | MASGAG | 9FC0 | DEVIATION OF HEAD 2 FOR A SINGLE READING |
| VARIABLE | IPOS1 | 0165 | IN | MASGAG | 9FC1 | BAR POSITION OF HEAD 1 FOR A SINGLE READING |
| VARIABLE | IPOS2 | 0166 | IN | MASGAG | 9FC2 | BAR POSITION OF HEAD 2 FOR A SINGLE READING |
| VARIABLE | NGOOD1 | 0167 | IN | MASGAG | 9FC3 | FOR HEAD 1 - # OF GOOD SAMPLES AVERAGED IN A READING |
| VARIABLE | NGOOD2 | 0168 | IN | MASGAG | 9FC4 | FOR HEAD 2 - # OF GOOD SAMPLES AVERAGED IN A READING |
| VARIABLE | IERR | 0000 | IN | GAGERR | 57FB | GAGE ERROR CODE |
| VARIABLE | IRECAL | 0001 | IN | GAGERR | 57FC | RECALIBRATION FLAG (FALSE = NO RECALIBRATION DONE) |
| VARIABLE | IHMD2 | 0001 | IN | BDCCOM | 5701 | HOT METAL DETECTOR - FINISHING STAND |
| VARIABLE | ICDAIM | 0028 | IN | BDCCOM | 5728 | COLD AIM SIZE |
| VARIABLE | IGRADE | 0029 | IN | BDCCOM | 5729 | % CARBON |
| VARIABLE | IHAIM1 | 002A | IN | BDCCOM | 572A | HOT AIM SIZE FOR HEAD 1 |
| VARIABLE | IHAIM2 | 002B | IN | BDCCOM | 572B | HOT AIM SIZE FOR HEAD 2 |

FIG. 16A

HEXADECIMAL CORE MAP

| TYPE | NAME | POSITION IN COMMON AREA | COMMON NAME | CORE LOCATION | DESCRIPTION |
|---|---|---|---|---|---|
| VARIABLE | ISEC | 0000 | MONCOM | 5400 | CURRENT SECONDS |
| VARIABLE | IMIN | 0001 | MONCOM | 5401 | CURRENT MINUTES |
| VARIABLE | IHOUR | 0002 | MONCOM | 5402 | CURRENT HOUR |
| VARIABLE | IMONTH | 0005 | MONCOM | 5405 | CURRENT MONTH |
| VARIABLE | IDATE | 0006 | MONCOM | 5406 | CURRENT DATE |
| VARIABLE | IYEAR | 0007 | MONCOM | 5407 | CURRENT YEAR |
| VARIABLE | ITMP22 | 0001 | SYSCOM | 5450 | BAR TEMPERATURE AT FINISHING STAND |
| ARRAY | ITRABF | 0000 | TRKCOM | 5580 | TOLERANCE LIMITS FOR CURRENT BAR AT FINISHING STAND |

FIG. 16B

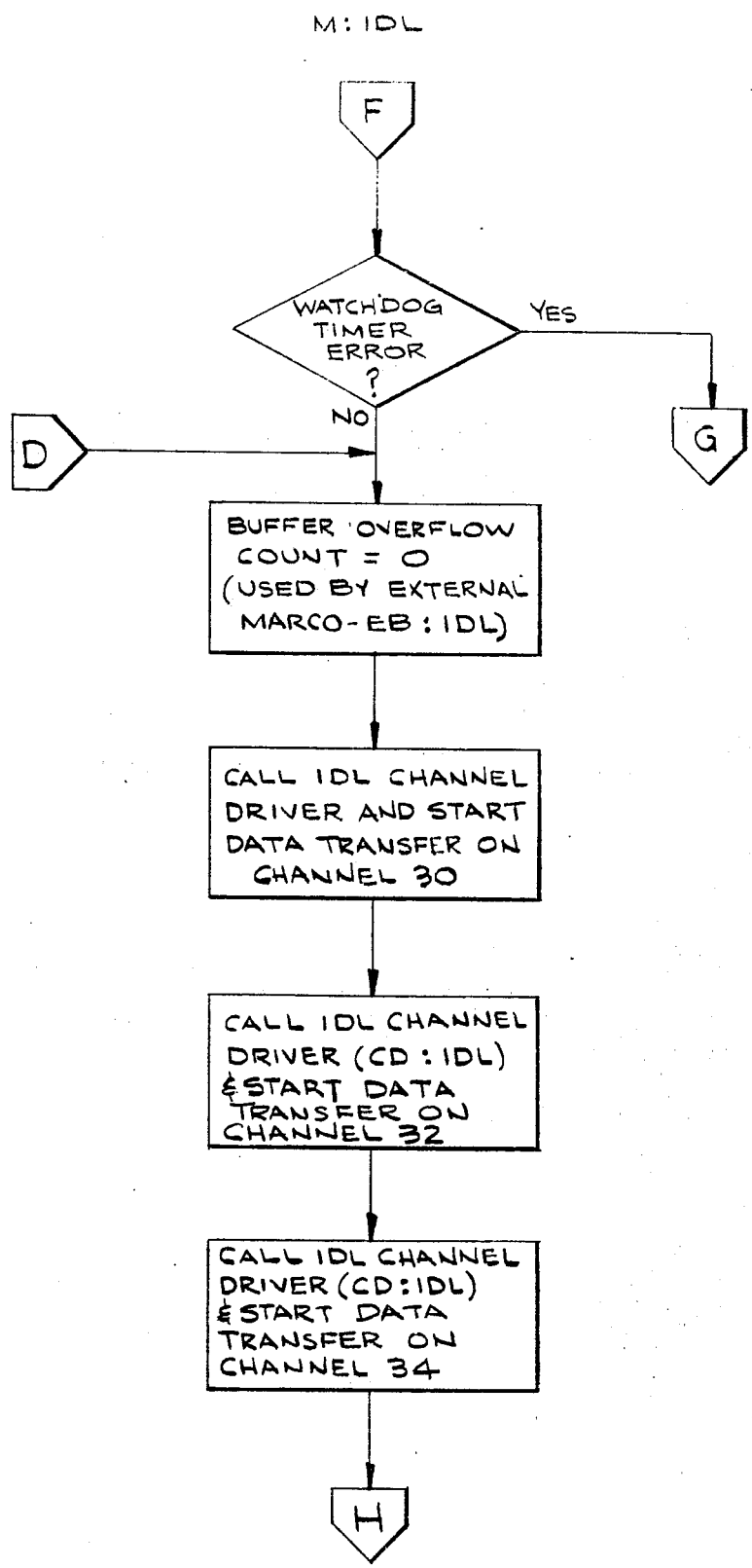
FIG.—17D

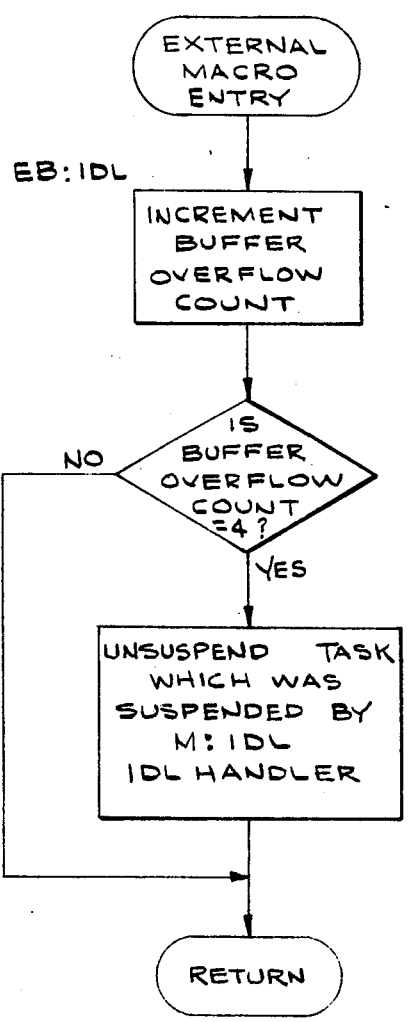
FIG.—19

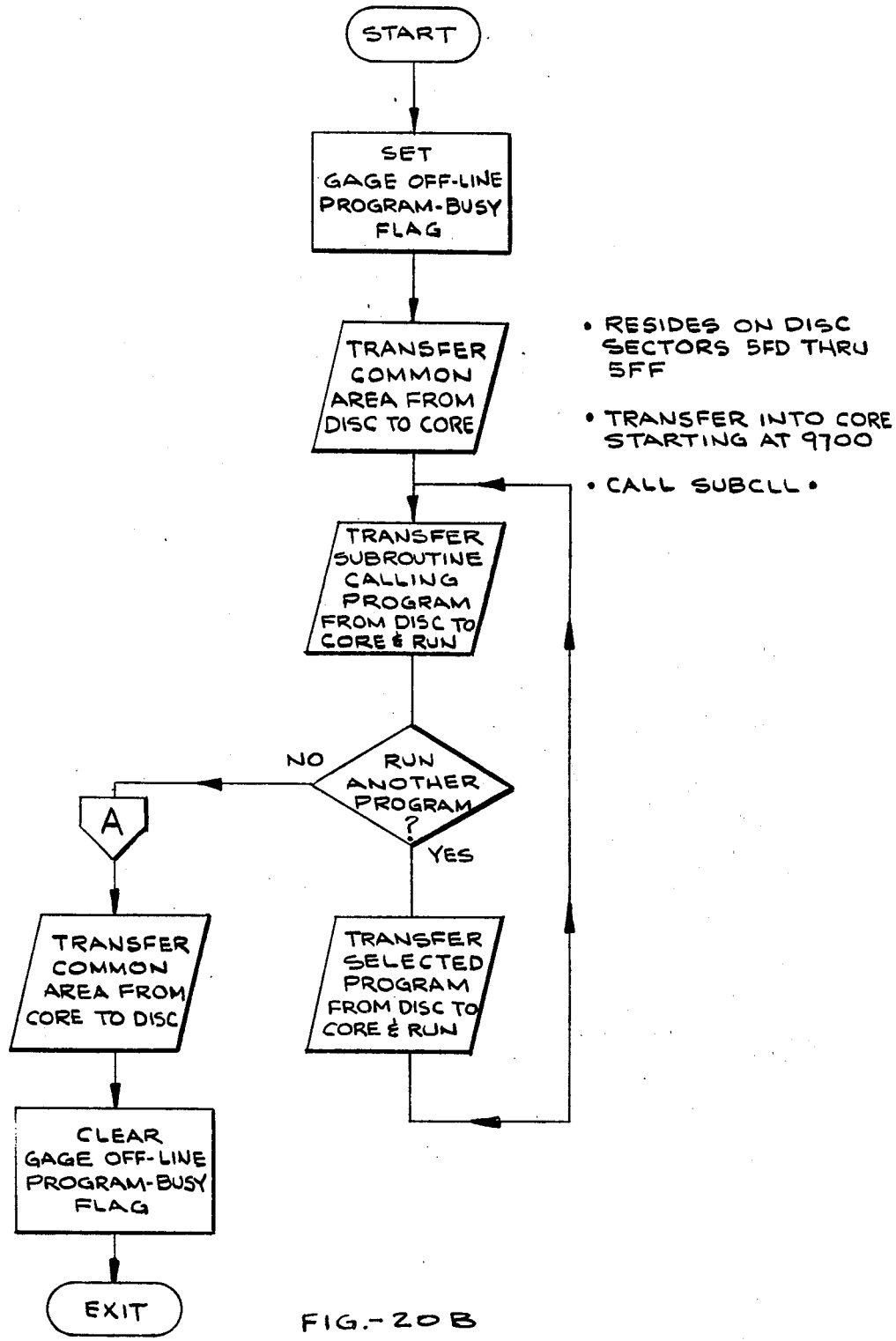

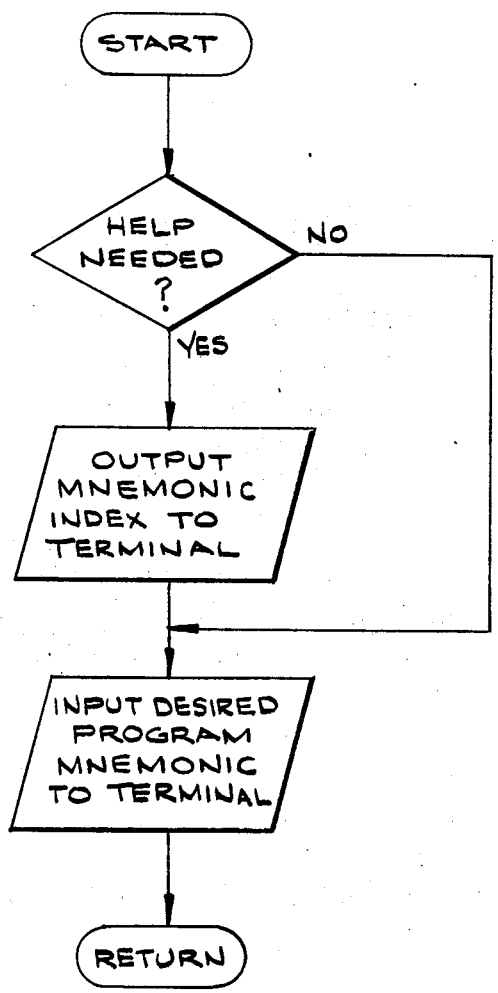
FIG.—21A

GAGE OFFLINE SYSTEM

MNEMONICS ARE AS FOLLOWS:

```
HS - HISTOGRAM FOR EACH HEAD
MP - BUILDS FIELD OF VIEW COMPENSATION MAPS
PR - ROTATES SCANNER 90 DEGREES AND BUILDS PROFILE TABLE
PL - PLOTS PROFILE TABLE
RP - BUILDS PROFILE TABLE ON RIGHT MASK DATA
CL - PERFORMS A CALIBRATION CHECK ON LEFT AND RIGHT MASKS
TY - PRINTS MAPS, SLOPE & OFFSET FACTORS, AND MASK VALUES
SC - ROTATES SCANNER TO DESIRED ANGLE
OF - ALLOWS ENTRY OF SLOPE AND OFFSET CORRECTION FACTORS
ZE - ZEROES ALL MAPS AND CORRECTION FACTORS !!!CAUTION!!!
LF - LEFT MASK DRIFT TEST
RT - RIGHT MASK DRIFT TEST (ALSO ALLOWS ENTRY OF WINDOW)
TR - DISK TRANSFER OF GAGE COMMON TO CONTROL SYS. AREA
XT - EXITS TO MONITOR AND ATTEMPTS TO WRITE COMMON AREA
     CONTAINING MAPS, SLOPE AND OFFSET CORRECTION FACTORS,
     MASK VALUES, AND WINDOW VALUES TO THE DISK.  THE DISK
     FILE WILL ONLY BE UPDATED IF DISK SWITCH 12 IS UP.
     THIS FILE IS READ FROM THE DISK WHEN THIS TASK (20)
     IS CALLED BY THE MONITOR.
```

FIG. 21B

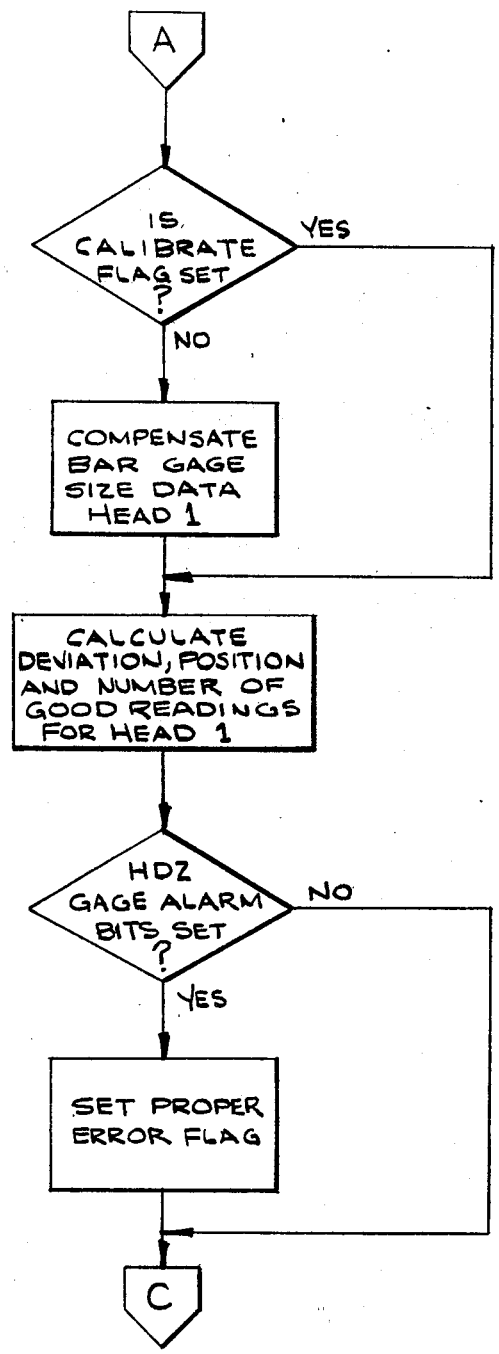
FIG.—23B

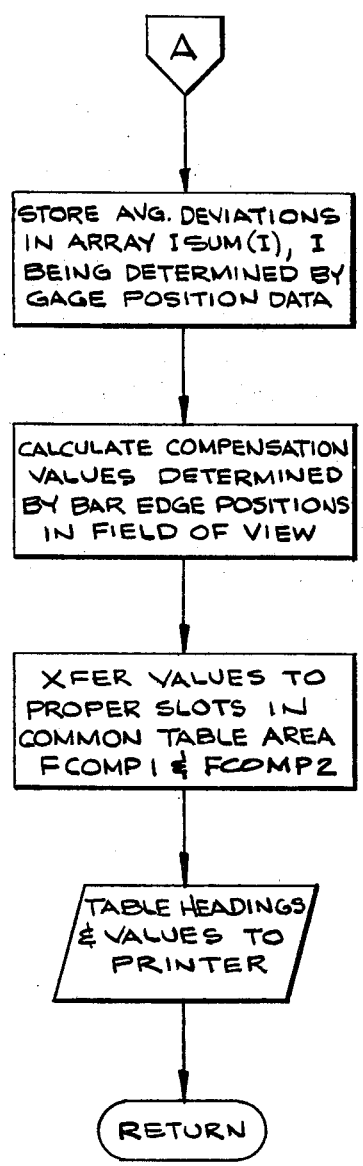
FIG.—24B

DATE          TIME

HEAD 1 FIELD OF VIEW COMPENSATION MAP

| | -1.6 | -1.2 | -0.8 | -0.4 | 0.0 | +0.4 | +0.8 | +1.2 | +1.6 |
|---|---|---|---|---|---|---|---|---|---|
| 0.000 | 99.0 | -1.0 | -1.0 | -0.2 | 0.0 | 0.4 | 2.8 | 10.2 | 108.0 |
| 0.016 | 98.8 | -0.8 | -1.0 | -0.2 | 0.0 | 0.6 | 3.0 | 10.6 | 108.4 |
| 0.032 | 99.0 | -0.8 | -1.0 | 0.0 | 0.0 | 0.4 | 3.2 | 11.0 | 108.8 |
| 0.048 | 3.0 | -1.0 | -1.0 | 0.0 | 0.0 | 0.6 | 3.2 | 11.6 | 109.2 |
| 0.064 | 3.0 | -1.0 | -1.0 | 0.0 | 0.0 | 0.6 | 3.6 | 12.0 | 109.6 |
| 0.080 | 2.6 | -1.0 | -1.0 | 0.0 | 0.0 | 0.6 | 3.8 | 12.8 | 110.2 |
| 0.096 | 2.4 | -1.2 | -0.8 | 0.0 | 0.0 | 0.8 | 4.2 | 13.4 | 110.6 |
| 0.112 | 2.0 | -1.0 | -0.8 | 0.0 | 0.0 | 0.8 | 4.2 | 14.2 | 111.0 |
| 0.128 | 1.8 | -1.4 | -0.8 | 0.0 | 0.0 | 0.8 | 4.4 | 14.6 | 111.6 |
| 0.144 | 1.4 | -1.2 | -0.8 | 0.0 | 0.0 | 1.0 | 4.8 | 15.6 | 112.0 |
| 0.160 | 1.2 | -1.2 | -0.8 | 0.0 | 0.0 | 1.0 | 4.8 | 16.4 | 112.8 |
| 0.176 | 1.0 | -1.0 | -0.8 | 0.0 | 0.0 | 1.2 | 5.2 | 17.2 | 113.4 |
| 0.192 | 0.6 | -1.2 | -0.6 | 0.0 | 0.0 | 1.2 | 5.4 | 17.8 | 114.2 |
| 0.208 | 0.4 | -1.2 | -0.8 | 0.0 | 0.0 | 1.2 | 5.6 | 18.8 | 114.6 |
| 0.224 | 0.2 | -1.2 | -0.6 | 0.0 | 0.0 | 1.4 | 6.0 | 19.6 | 115.6 |
| 0.240 | 0.0 | -1.2 | -0.6 | 0.0 | 0.0 | 1.4 | 6.2 | 20.4 | 116.4 |
| 0.256 | -0.2 | -1.2 | -0.4 | 0.0 | 0.0 | 1.6 | 6.8 | 21.2 | 117.2 |
| 0.272 | -0.2 | -1.2 | -0.4 | 0.0 | 0.0 | 1.6 | 7.0 | 105.4 | 117.8 |
| 0.288 | -0.2 | -1.2 | -0.4 | 0.0 | 0.0 | 1.8 | 7.2 | 105.6 | 118.8 |
| 0.304 | -0.4 | -1.2 | -0.4 | 0.0 | 0.0 | 1.8 | 7.8 | 106.0 | 119.6 |
| 0.320 | -0.6 | -1.2 | -0.4 | 0.0 | 0.2 | 2.0 | 8.0 | 106.2 | 120.6 |
| 0.336 | -0.8 | -1.2 | -0.4 | 0.0 | 0.2 | 2.2 | 8.4 | 106.8 | 121.2 |
| 0.352 | -0.8 | -1.0 | -0.2 | 0.0 | 0.2 | 2.2 | 8.8 | 107.0 | 205.4 |
| 0.368 | -1.0 | -1.0 | -0.2 | 0.0 | 0.2 | 2.4 | 9.2 | 107.2 | 205.6 |
| 0.384 | -1.0 | -1.0 | -0.2 | 0.0 | 0.4 | 2.4 | 9.6 | 107.8 | 206.0 |

HEAD 2 FIELD OF VIEW COMPENSATION MAP

| | -1.6 | -1.2 | -0.8 | -0.4 | 0.0 | +0.4 | +0.8 | +1.2 | +1.6 |
|---|---|---|---|---|---|---|---|---|---|
| 0.000 | 10.2 | 2.6 | 0.2 | 0.0 | 0.0 | 0.6 | 3.2 | 10.4 | 108.4 |
| 0.016 | 9.6 | 2.4 | 0.0 | 0.0 | 0.0 | 0.6 | 3.4 | 11.0 | 108.8 |
| 0.032 | 9.2 | 2.2 | 0.0 | 0.0 | 0.0 | 0.6 | 3.6 | 11.4 | 109.2 |
| 0.048 | 8.8 | 2.0 | 0.0 | 0.0 | 0.0 | 0.6 | 3.8 | 12.0 | 109.6 |
| 0.064 | 8.4 | 2.0 | 0.0 | 0.0 | 0.0 | 0.8 | 4.0 | 12.4 | 110.0 |
| 0.080 | 8.0 | 1.8 | 0.0 | 0.0 | 0.0 | 0.8 | 4.4 | 13.0 | 110.4 |
| 0.096 | 7.4 | 1.6 | 0.0 | 0.0 | 0.0 | 1.0 | 4.6 | 13.6 | 111.0 |
| 0.112 | 7.2 | 1.6 | 0.0 | 0.0 | 0.0 | 1.0 | 4.6 | 14.0 | 111.4 |
| 0.128 | 6.6 | 1.4 | 0.0 | 0.0 | 0.0 | 1.0 | 4.8 | 14.6 | 112.0 |
| 0.144 | 6.4 | 1.4 | 0.0 | 0.0 | 0.0 | 1.2 | 5.2 | 15.2 | 112.4 |
| 0.160 | 6.2 | 1.2 | 0.0 | 0.0 | 0.0 | 1.2 | 5.4 | 16.0 | 113.0 |
| 0.176 | 5.8 | 1.0 | 0.0 | 0.0 | 0.0 | 1.4 | 5.8 | 16.6 | 113.6 |
| 0.192 | 5.4 | 1.0 | 0.0 | 0.0 | 0.0 | 1.4 | 6.0 | 17.0 | 114.0 |
| 0.208 | 5.2 | 0.8 | 0.0 | 0.0 | 0.0 | 1.4 | 6.2 | 17.4 | 114.6 |
| 0.224 | 4.8 | 0.8 | 0.0 | 0.0 | 0.0 | 1.6 | 6.6 | 105.2 | 115.2 |
| 0.240 | 4.8 | 0.8 | 0.0 | 0.0 | 0.0 | 1.6 | 6.8 | 105.4 | 116.0 |
| 0.256 | 4.2 | 0.6 | 0.0 | 0.0 | 0.2 | 1.8 | 7.2 | 105.8 | 116.6 |
| 0.272 | 4.0 | 0.6 | 0.0 | 0.0 | 0.2 | 1.8 | 7.4 | 106.0 | 117.0 |
| 0.288 | 3.8 | 0.6 | 0.0 | 0.0 | 0.2 | 2.0 | 7.8 | 106.2 | 117.4 |
| 0.304 | 3.8 | 0.4 | 0.0 | 0.0 | 0.2 | 2.0 | 8.2 | 106.6 | 205.2 |
| 0.320 | 3.4 | 0.4 | 0.0 | 0.0 | 0.2 | 2.2 | 8.4 | 106.8 | 205.4 |
| 0.336 | 3.2 | 0.2 | 0.0 | 0.0 | 0.4 | 2.6 | 8.8 | 107.2 | 205.8 |
| 0.352 | 3.0 | 0.2 | 0.0 | 0.0 | 0.4 | 2.6 | 9.2 | 107.4 | 206.0 |
| 0.368 | 2.8 | 0.2 | 0.0 | 0.0 | 0.4 | 2.8 | 9.6 | 107.8 | 206.2 |
| 0.384 | 2.6 | 0.2 | 0.0 | 0.0 | 0.4 | 3.0 | 10.0 | 108.2 | 206.6 |

FIG. 24C

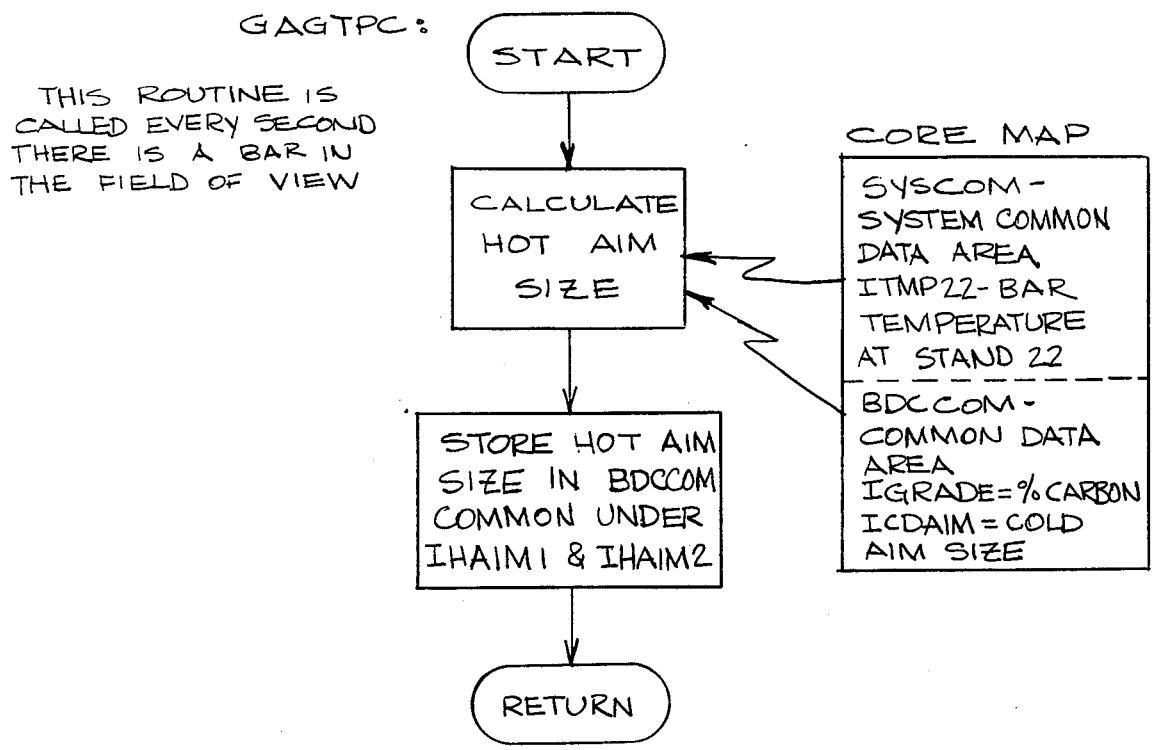
FIG.—28
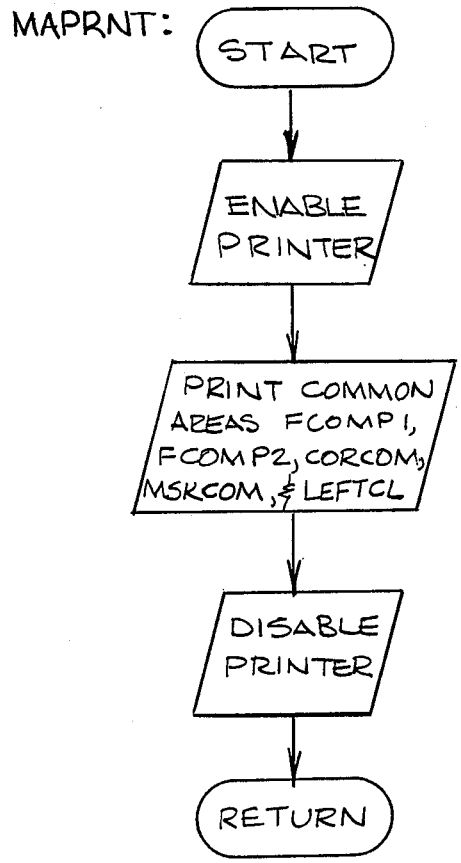
FIG.—27A

GAGE CALIBRATION DATA

DATE            TIME

HEAD 1 FIELD OF VIEW COMPENSATION MAP

| | -1.6 | -1.2 | -0.8 | -0.4 | 0.0 | +0.4 | +0.8 | +1.2 | +1.6 |
|---|---|---|---|---|---|---|---|---|---|
| 0.000 | 99.0 | -1.0 | -1.0 | -0.2 | 0.0 | 0.4 | 2.8 | 10.2 | 108.0 |
| 0.016 | 98.8 | -0.8 | -1.0 | -0.2 | 0.0 | 0.6 | 3.0 | 10.6 | 108.4 |
| 0.032 | 99.0 | -0.8 | -1.0 | 0.0 | 0.0 | 0.4 | 3.2 | 11.0 | 108.8 |
| 0.048 | 3.0 | -1.0 | -1.0 | 0.0 | 0.0 | 0.6 | 3.2 | 11.6 | 109.2 |
| 0.064 | 3.0 | -1.0 | -1.0 | 0.0 | 0.0 | 0.6 | 3.6 | 12.0 | 109.6 |
| 0.080 | 2.6 | -1.0 | -1.0 | 0.0 | 0.0 | 0.6 | 3.8 | 12.8 | 110.2 |
| 0.096 | 2.4 | -1.2 | -0.8 | 0.0 | 0.0 | 0.8 | 4.2 | 13.4 | 110.6 |
| 0.112 | 2.0 | -1.0 | -0.8 | 0.0 | 0.0 | 0.8 | 4.2 | 14.2 | 111.0 |
| 0.128 | 1.8 | -1.4 | -0.8 | 0.0 | 0.0 | 0.8 | 4.4 | 14.6 | 111.6 |
| 0.144 | 1.4 | -1.2 | -0.8 | 0.0 | 0.0 | 1.0 | 4.8 | 15.6 | 112.0 |
| 0.160 | 1.2 | -1.2 | -0.8 | 0.0 | 0.0 | 1.0 | 4.8 | 16.4 | 112.8 |
| 0.176 | 1.0 | -1.0 | -0.8 | 0.0 | 0.0 | 1.2 | 5.2 | 17.2 | 113.4 |
| 0.192 | 0.6 | -1.2 | -0.6 | 0.0 | 0.0 | 1.2 | 5.4 | 17.8 | 114.2 |
| 0.208 | 0.4 | -1.2 | -0.8 | 0.0 | 0.0 | 1.2 | 5.6 | 18.8 | 114.6 |
| 0.224 | 0.2 | -1.2 | -0.6 | 0.0 | 0.0 | 1.4 | 6.0 | 19.6 | 115.6 |
| 0.240 | 0.0 | -1.2 | -0.6 | 0.0 | 0.0 | 1.4 | 6.2 | 20.4 | 116.4 |
| 0.256 | -0.2 | -1.2 | -0.4 | 0.0 | 0.0 | 1.6 | 6.8 | 21.2 | 117.2 |
| 0.272 | -0.2 | -1.2 | -0.4 | 0.0 | 0.0 | 1.6 | 7.0 | 105.4 | 117.8 |
| 0.288 | -0.2 | -1.2 | -0.4 | 0.0 | 0.0 | 1.8 | 7.2 | 105.6 | 118.8 |
| 0.304 | -0.4 | -1.2 | -0.4 | 0.0 | 0.0 | 1.8 | 7.8 | 106.0 | 119.6 |
| 0.320 | -0.6 | -1.2 | -0.4 | 0.0 | 0.2 | 2.0 | 8.0 | 106.2 | 120.6 |
| 0.336 | -0.8 | -1.2 | -0.4 | 0.0 | 0.2 | 2.2 | 8.4 | 106.8 | 121.2 |
| 0.352 | -0.8 | -1.0 | -0.2 | 0.0 | 0.2 | 2.2 | 8.8 | 107.0 | 205.4 |
| 0.368 | -1.0 | -1.0 | -0.2 | 0.0 | 0.2 | 2.4 | 9.2 | 107.2 | 205.6 |
| 0.384 | -1.0 | -1.0 | -0.2 | 0.0 | 0.4 | 2.4 | 9.6 | 107.8 | 206.0 |

HEAD 2 FIELD OF VIEW COMPENSATION MAP

| | -1.6 | -1.2 | -0.8 | -0.4 | 0.0 | +0.4 | +0.8 | +1.2 | +1.6 |
|---|---|---|---|---|---|---|---|---|---|
| 0.000 | 10.2 | 2.6 | 0.2 | 0.0 | 0.0 | 0.6 | 3.2 | 10.4 | 108.4 |
| 0.016 | 9.6 | 2.4 | 0.0 | 0.0 | 0.0 | 0.6 | 3.4 | 11.0 | 108.8 |
| 0.032 | 9.2 | 2.2 | 0.0 | 0.0 | 0.0 | 0.6 | 3.6 | 11.4 | 109.2 |
| 0.048 | 8.8 | 2.0 | 0.0 | 0.0 | 0.0 | 0.6 | 3.8 | 12.0 | 109.6 |
| 0.064 | 8.4 | 2.0 | 0.0 | 0.0 | 0.0 | 0.8 | 4.0 | 12.4 | 110.0 |
| 0.080 | 8.0 | 1.8 | 0.0 | 0.0 | 0.0 | 0.8 | 4.4 | 13.0 | 110.4 |
| 0.096 | 7.4 | 1.6 | 0.0 | 0.0 | 0.0 | 1.0 | 4.6 | 13.6 | 111.0 |
| 0.112 | 7.2 | 1.6 | 0.0 | 0.0 | 0.0 | 1.0 | 4.6 | 14.0 | 111.4 |
| 0.128 | 6.6 | 1.4 | 0.0 | 0.0 | 0.0 | 1.0 | 4.8 | 14.6 | 112.0 |
| 0.144 | 6.4 | 1.4 | 0.0 | 0.0 | 0.0 | 1.2 | 5.2 | 15.2 | 112.4 |
| 0.160 | 6.2 | 1.2 | 0.0 | 0.0 | 0.0 | 1.2 | 5.4 | 16.0 | 113.0 |
| 0.176 | 5.8 | 1.0 | 0.0 | 0.0 | 0.0 | 1.4 | 5.8 | 16.6 | 113.6 |
| 0.192 | 5.4 | 1.0 | 0.0 | 0.0 | 0.0 | 1.4 | 6.0 | 17.0 | 114.0 |
| 0.208 | 5.2 | 0.8 | 0.0 | 0.0 | 0.0 | 1.4 | 6.2 | 17.4 | 114.6 |
| 0.224 | 4.8 | 0.8 | 0.0 | 0.0 | 0.0 | 1.6 | 6.6 | 105.2 | 115.2 |
| 0.240 | 4.8 | 0.8 | 0.0 | 0.0 | 0.0 | 1.6 | 6.8 | 105.4 | 116.0 |
| 0.256 | 4.2 | 0.6 | 0.0 | 0.0 | 0.2 | 1.8 | 7.2 | 105.8 | 116.6 |
| 0.272 | 4.0 | 0.6 | 0.0 | 0.0 | 0.2 | 1.8 | 7.4 | 106.0 | 117.0 |
| 0.288 | 3.8 | 0.6 | 0.0 | 0.0 | 0.2 | 2.0 | 7.8 | 106.2 | 117.4 |
| 0.304 | 3.8 | 0.4 | 0.0 | 0.0 | 0.2 | 2.0 | 8.2 | 106.6 | 205.2 |
| 0.320 | 3.4 | 0.4 | 0.0 | 0.0 | 0.2 | 2.2 | 8.4 | 106.8 | 205.4 |
| 0.336 | 3.2 | 0.2 | 0.0 | 0.0 | 0.4 | 2.6 | 8.8 | 107.2 | 205.8 |
| 0.352 | 3.0 | 0.2 | 0.0 | 0.0 | 0.4 | 2.6 | 9.2 | 107.4 | 206.0 |
| 0.368 | 2.8 | 0.2 | 0.0 | 0.0 | 0.4 | 2.8 | 9.6 | 107.8 | 206.2 |
| 0.384 | 2.6 | 0.2 | 0.0 | 0.0 | 0.4 | 3.0 | 10.0 | 108.2 | 206.6 |

FIG. 27B

```
                GAGE  CALIBRATION  DATA
            DATE                 TIME

HEAD 1 OFFSET CORRECTION=    16
    HEAD 1 SLOPE CORRECTION  =   13
    HEAD 2 OFFSET CORRECTION=    16
    HEAD 2 SLOPE CORRECTION  =   14

HEAD 1      HEAD 2      WINDOW

LEFT MASK 1     0.2158      0.2144      00AA    00AA
    LEFT MASK 2     0.2140      0.2124      012E    012E
    LEFT MASK 3     0.2142      0.2118      0191    0191
    LEFT MASK 4     0.2148      0.2112      01F4    01F4
    LEFT MASK 5     0.2178      0.2122      0278    0278

RIGHT MASK      0.5006      0.5000      005C
```

FIG. 27C

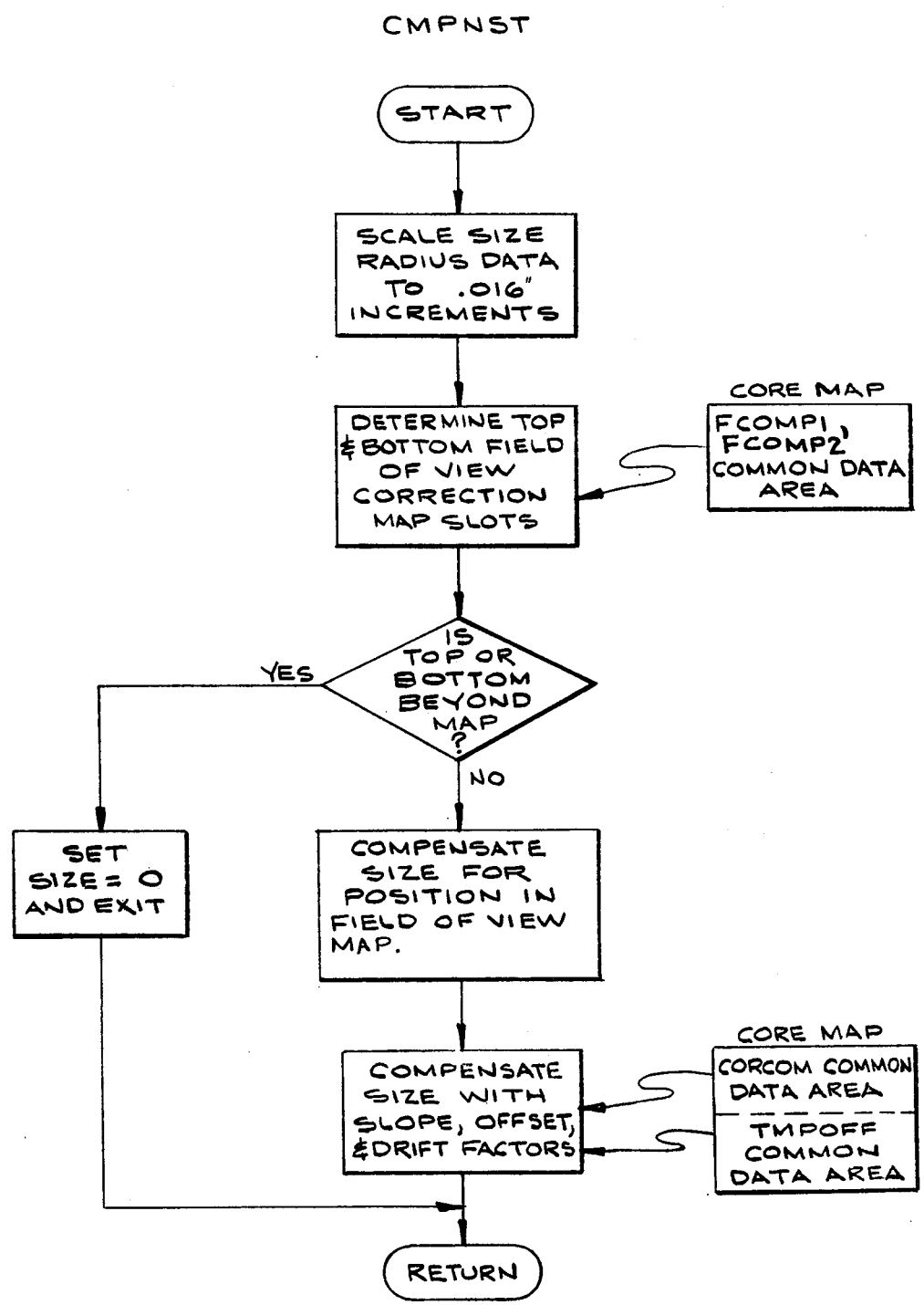
FIG.—29

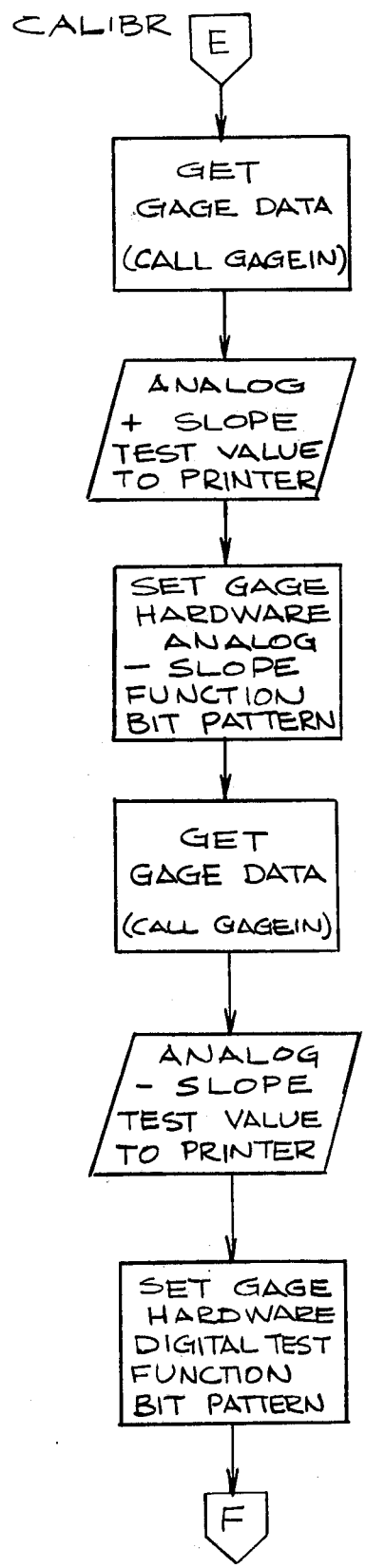
FIG.—30D

```
              G A G E   C A L I B R A T I O N   C H E C K
                DATE              TIME

HEAD 1      HEAD 2     WINDOW

LEFT MASK 1                   0.2158      0.2144      00AA      00AA
   LEFT MASK 1 DEVIATION         0.0000     -0.0006      00AA      00AA
   LEFT MASK 1 (+) SLOPE           172         200       00AA      00AA
   LEFT MASK 1 (-) SLOPE           176         200       00AA      00AA

LEFT MASK 2                   0.2140      0.2124      012E      012E
   LEFT MASK 2 DEVIATION         1.9998      1.9998      012E      012E
   LEFT MASK 2 (+) SLOPE           174         190       012E      012E
   LEFT MASK 2 (-) SLOPE           178         192       012E      012E

LEFT MASK 3                   0.2142      0.2118      0191      0191
   LEFT MASK 3 DEVIATION         0.0000     -0.0004      0191      0191
   LEFT MASK 3 (+) SLOPE           172         182       0191      0191
   LEFT MASK 3 (-) SLOPE           178         184       0191      0191

LEFT MASK 4                   0.2148      0.2112      01F4      01F4
   LEFT MASK 4 DEVIATION         0.0000     -0.0004      01F4      01F4
   LEFT MASK 4 (+) SLOPE           174         182       01F4      01F4
   LEFT MASK 4 (-) SLOPE           178         186       01F4      01F4

LEFT MASK 5                   0.2178      0.2122      0278      0278
   LEFT MASK 5 DEVIATION         0.0000     -0.0008      0278      0278
   LEFT MASK 5 (+) SLOPE           166         176       0278      0278
   LEFT MASK 5 (-) SLOPE           170         174       0278      0278

RIGHT MASK                    0.5006      0.5000      005C
   RIGHT MASK DEVIATION          0.0000     -0.0010      005C
   RIGHT MASK (+) SLOPE            176         182       005C
   RIGHT MASK (-) SLOPE            182         184       005C
   CALIBRATION CONSTANTS         0.0002      0.0010

ANALOG TEST                   1.0262      1.0252      005C
   ANALOG TEST (+) SLOPE           142         140       005C
   ANALOG TEST (-) SLOPE           142         136       005C

DIGITAL TEST                  1.0242      1.0240
```

FIG.-30F

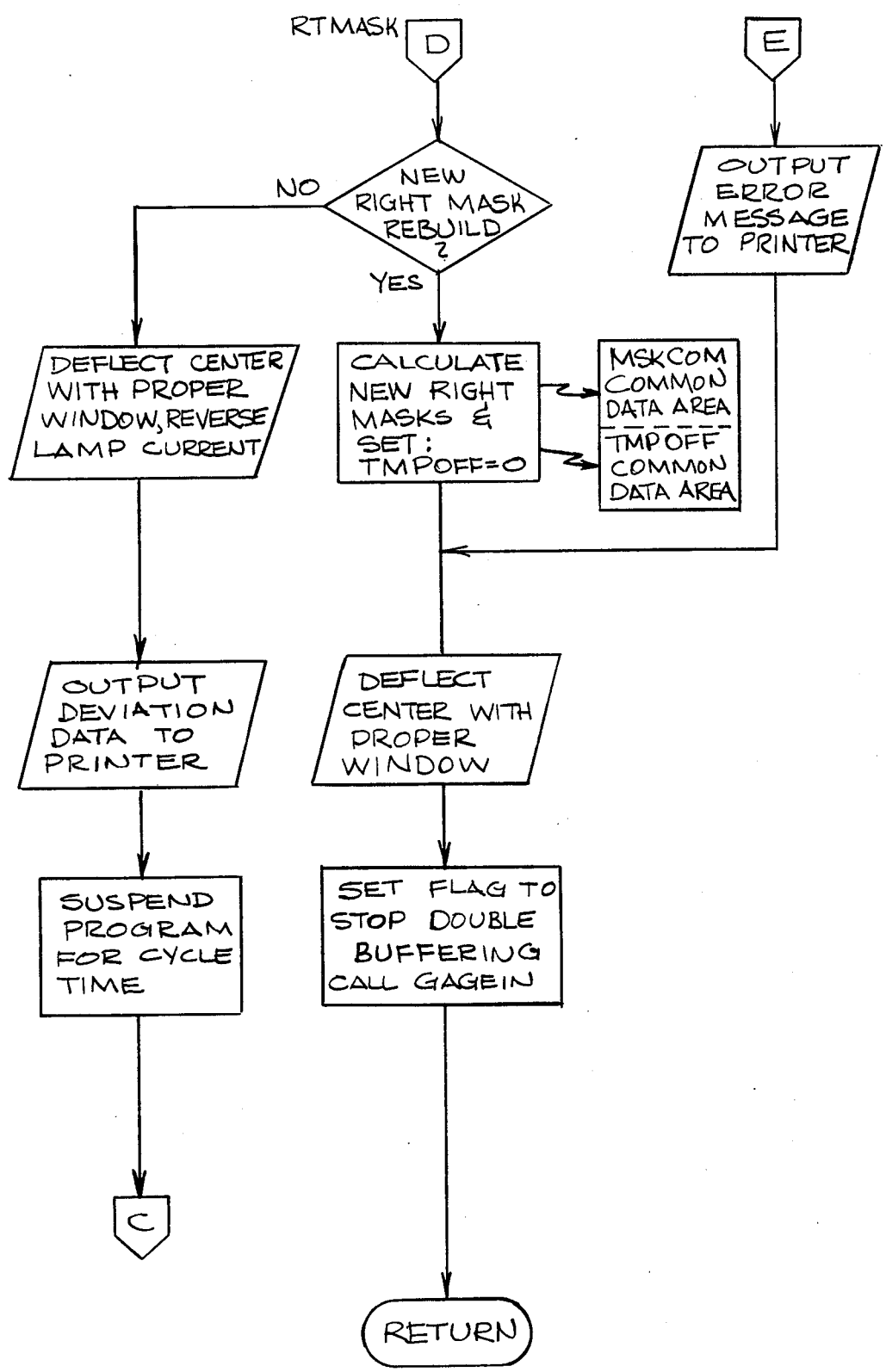
Fig.—31c

```
TYPE A 1 to ENTER WINDOW.

0

ENTER 1 FOR RIGHT MASK REBUILD.

0

ENTER CYCLE TIME IN SECONDS - XXX 010
            19:31:53      0         -5
            19:32: 3      0         -5
            19:32:13      0         -5
            19:32:23      0         -5
            19:32:33      0         -4
            19:32:43      0         -5
            19:32:54      0         -6
            19:33: 4      0         -5
            19:33:14      0         -5
            19:33:24      0         -5
            19:33:34      0         -5
            19:33:44      0         -6
            19:33:54      0         -5
            19:34: 4      0         -5
            19:34:14      0         -5
```

*Fig. 31D*

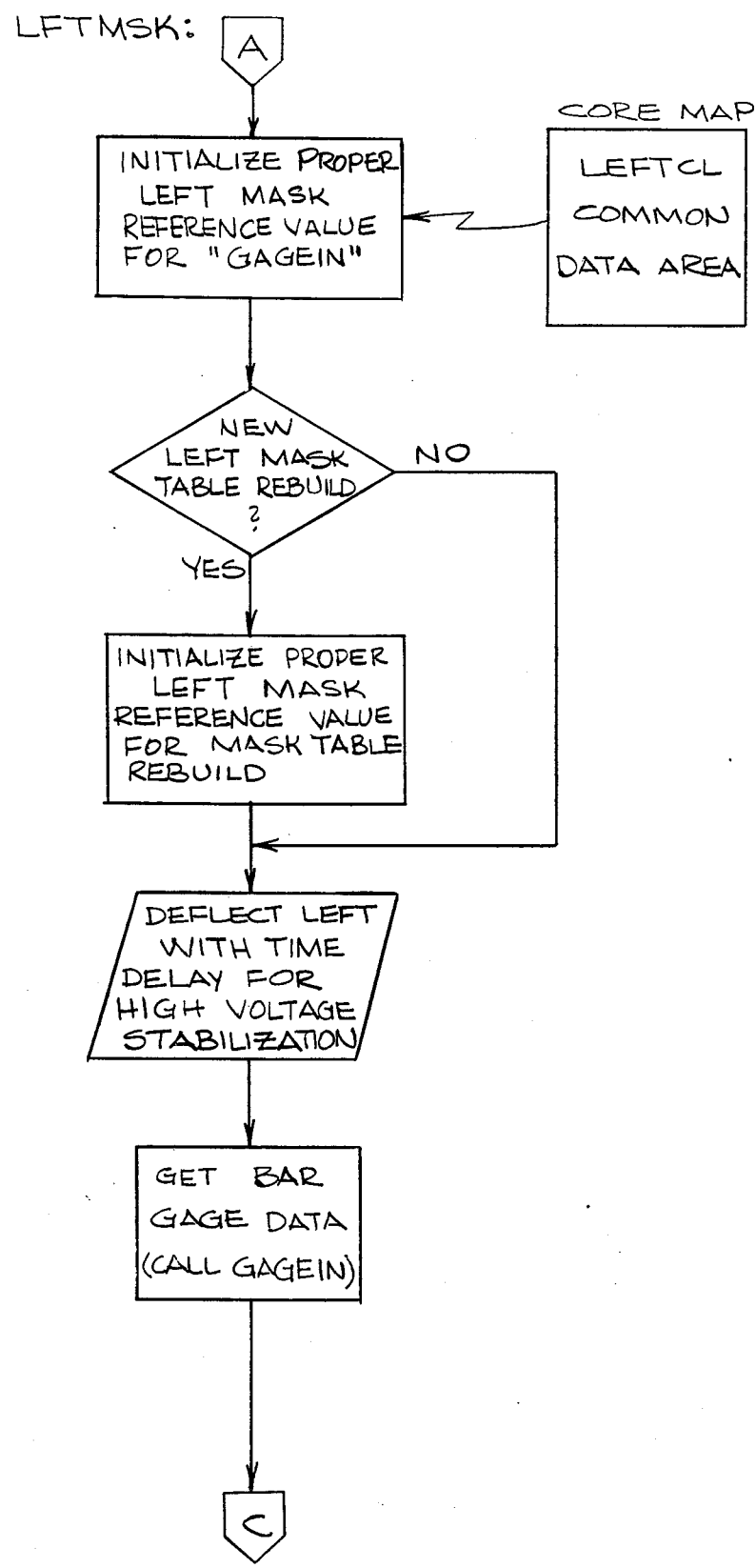
FIG.—33B

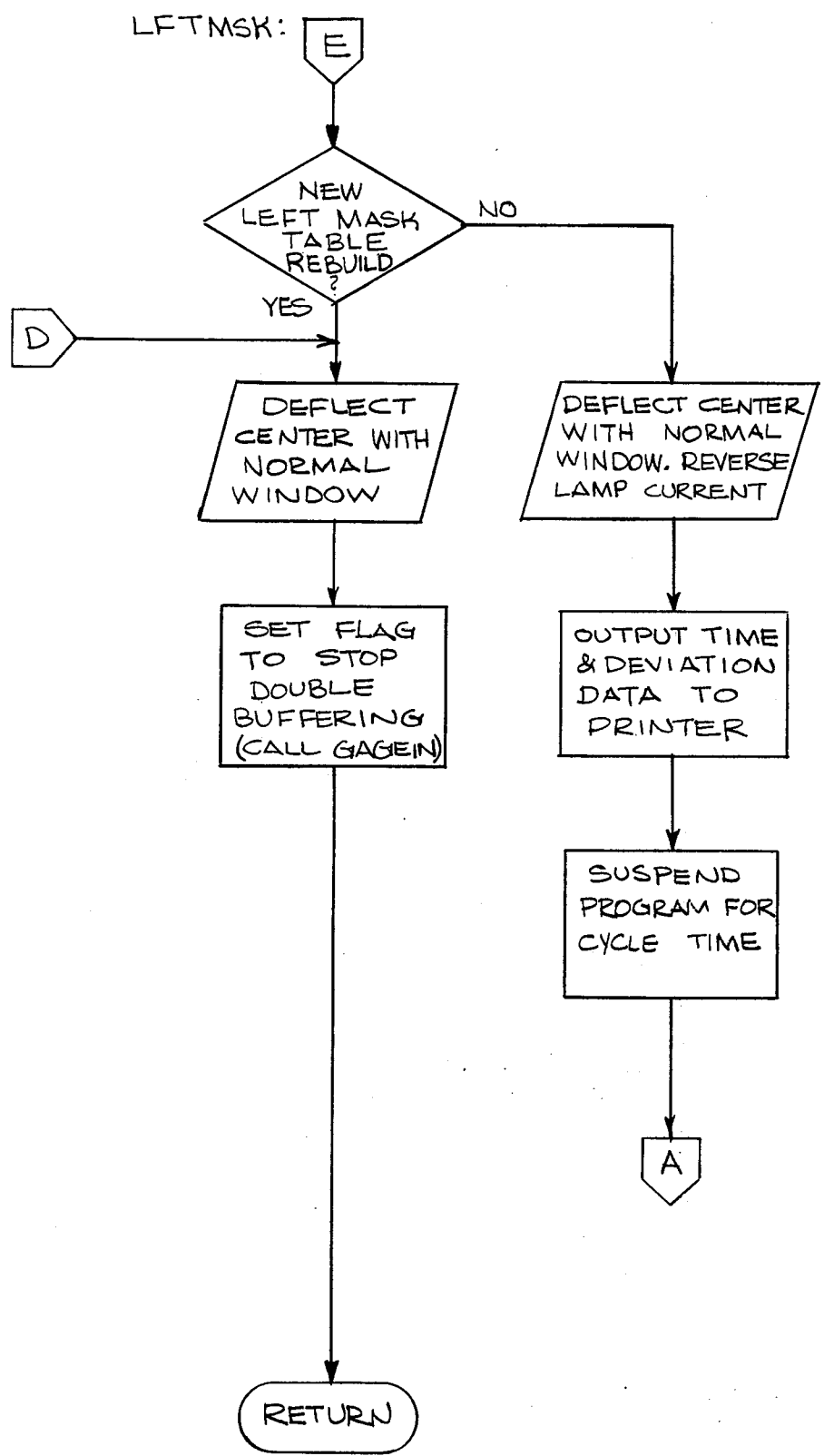
FIG.—33D

```
TYPE A 1 TO ENTER NEW LEFT MASK WINDOWS.

0

TYPE A 1 FOR LEFT MASK TABLE REBUILD.

0

ENTER CYCLE TIME IN SECONDS - XXX 020
          20:23:10      0  0  0  0  0        -3 -2 -2 -2 -3
          20:23:46      0  0  1  0  0        -2 -2 -2 -3 -3
          20:24:22      0 -1  0  0  0        -2 -2 -3 -3 -4
          20:24:57      0  0  0  0  0        -3 -3 -2 -2 -4
          20:25:33      0  0  0  0  0        -3 -2 -2 -2 -3
```

*Fig. 33E*

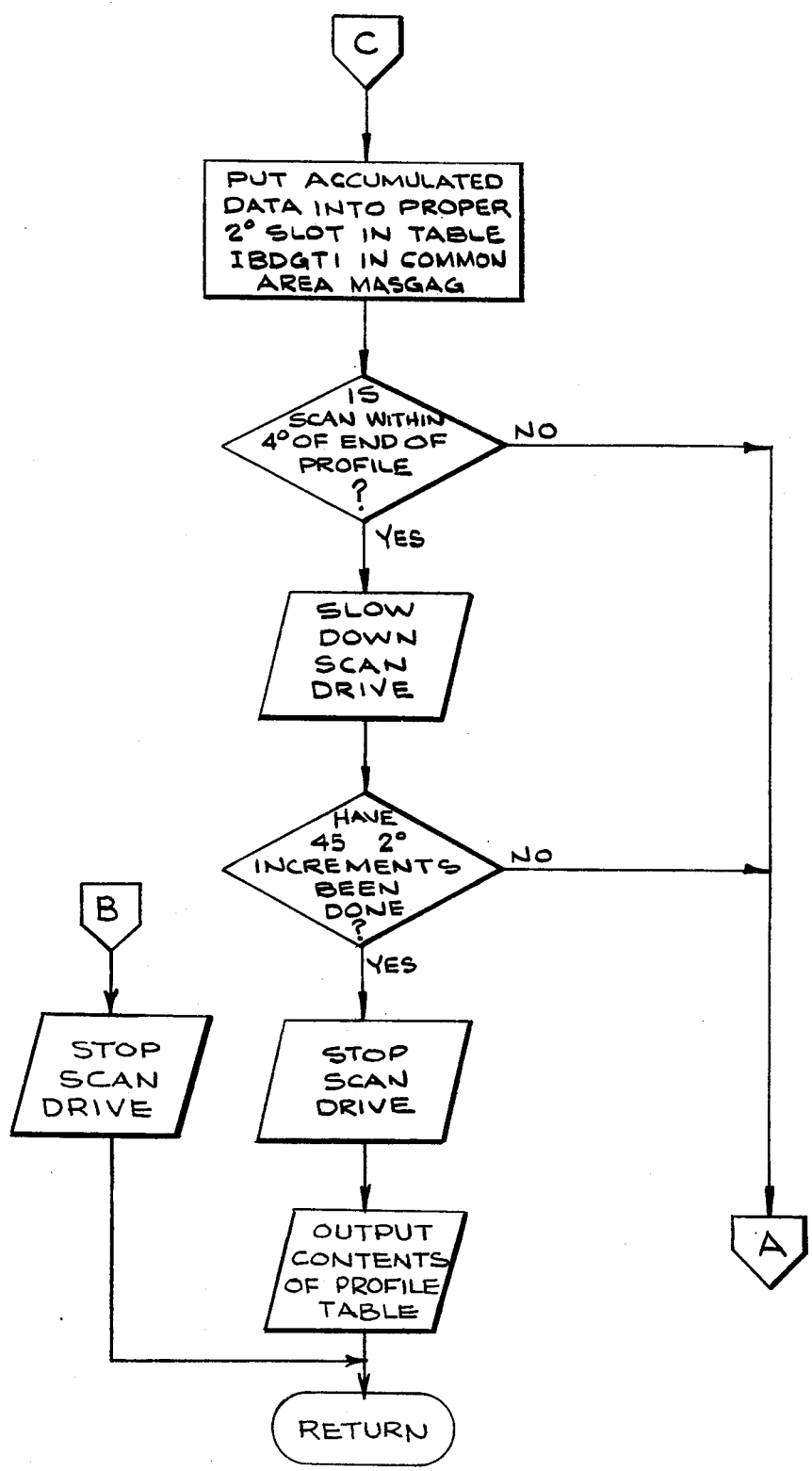
FIG.—36C

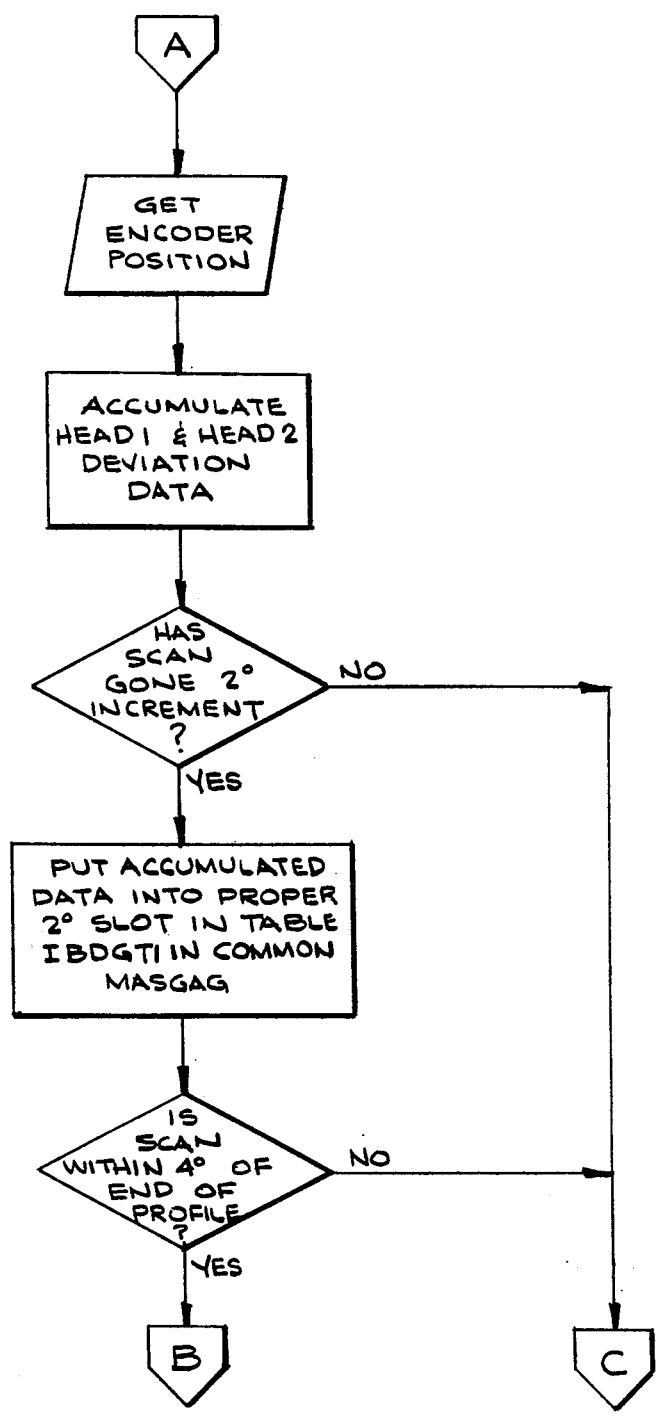
FIG.—41B

```
DATE            TIME
HEAD NO. 1

# SAMPLES/READING = 20      # READINGS =   50
AIMSIZE = 0.4962

MEAN = -0.0000              STD. DEV. =  0.0002

0    5.00
     0    4.80
     0    4.60
     0    4.40
     0    4.20
     0    4.00
     0    3.80
     0    3.60
     0    3.40
     0    3.20
     0    3.00
     0    2.80
     0    2.60
     0    2.40
     0    2.20
     0    2.00
     0    1.80
     0    1.60
     0    1.40
     0    1.20
     0    1.00
     0    0.80
     0    0.60  .
     2    0.40  *
     7    0.20  *****
    28    0.00  ****************************
     9   -0.20  *******
     3   -0.40  **
     1   -0.60  *
     0   -0.80
     0   -1.00
     0   -1.20
     0   -1.40
     0   -1.60
     0   -1.80
     0   -2.00
     0   -2.20
     0   -2.40
     0   -2.60
     0   -2.80
     0   -3.00
     0   -3.20
     0   -3.40
     0   -3.60
     0   -3.80
     0   -4.00
     0   -4.20
     0   -4.40
     0   -4.60
     0   -4.80
     0   -5.00
READINGS OUT OF RANGE =     0
EACH MARK =  1.00 READINGS
```

FIG.-42C

DATE                TIME
HEAD NO. 2

SAMPLES/READING = 20     # READINGS =   50
AIMSIZE = 0.4962

MEAN =  0.0002           STD. DEV. =  0.0002

0     5.00
         0     4.80
         0     4.60
         0     4.40
         0     4.20
         0     4.00
         0     3.80
         0     3.60
         0     3.40
         0     3.20
         0     3.00
         0     2.80
         0     2.60
         0     2.40
         0     2.20
         0     2.00
         0     1.80
         0     1.60
         0     1.40
         0     1.20
         0     1.00
         1     0.80   *
         0     0.60
        13     0.40   ***********
        27     0.20   ***************************
         8     0.00   *******
         1    -0.20   *
         0    -0.40
         0    -0.60
         0    -0.80
         0    -1.00
         0    -1.20
         0    -1.40
         0    -1.60
         0    -1.80
         0    -2.00
         0    -2.20
         0    -2.40
         0    -2.60
         0    -2.80
         0    -3.00
         0    -3.20
         0    -3.40
         0    -3.60
         0    -3.80
         0    -4.00
         0    -4.20
         0    -4.40
         0    -4.60
         0    -4.80
         0    -5.00
READINGS OUT OF RANGE =    0
EACH MARK =  1.00 READINGS

FIG.- 42 D

ELECTRO-OPTICAL GAGING SYSTEM HAVING DUAL CAMERAS ON A SCANNER

CROSS-REFERENCES TO RELATED APPLICATIONS

The following co-pending applications owned by the same assignee are incorporated as follows:

| Cross-Reference | Title |
| --- | --- |
| (A) | "Scanning Pyrometer System", by J. J. Roche et al Serial No. 522,363, filed 11-8-74. |
| (B) | "Magnetically Shielded Image Dissector Tube Assembly" by J. C. Clymer et al, filed concurrently herewith. |

BACKGROUND OF THE INVENTION

1. Field of the Invention

This invention relates broadly to electro-optical gaging methods and systems. More particularly, this invention relates to an electro-optical method and system for gaging plural dimensions of an object at various peripheral positions to determine the profile of the object. The invention may be used to determine two lateral dimensions and lateral profile of a moving hot bar during bar rolling in a steel mill as is disclosed herein. Similarly, the invention may be used to gage the dimensions and profile of other shaped objects and in other environments as well. In addition, the invention may be used to determined, and plot if desired, a gaging system histogram.

2. Description of the Prior Art

Generally, in steel mills where hot round bars are rolled, productivity demands require that a variety of bars be rolled at speeds of up to 4000 ft./min. (1219 m./min.) and sizes of up to three inches in diameter (7.62 cm.) while the bar rolling temperature is about 1700° F. (930° C.). Further demands require that the specifications on finished cold bar size and out-of-roundness be within one-half existing commercial tolerances. In order to meet these requirements, a computer-controlled rolling process must be implemented that will combine order data with operating measurements to produce mill control signals that will maximize productivity while minimizing, or desirably eliminating, off-specification product.

Some of the operating data used in mill control computer calculations and referred to herein are: desired bar diameter, or aim size; aim size full- and half-commercial tolerances; and bar grade, or percent carbon composition of the bar to be rolled. Some of the operating measurements mentioned above and of particular importance are: actual bar diameter, or bar size; actual bar lateral profile, or bar profile; and a histogram of bar size measurements. Another operating measurement is bar temperature, a parameter used to correct hot bar shrinkage in both bar measurement and computer control aspects of mill operation.

In order that the mill control computer may be programmed to meet the strict requirements of mill speed, bar size and size half-tolerances, it is desirous that all operating measurements have the following characteristics. Bar size measurements be made when the bar vibrates in a lateral orbit while moving longitudinally during rolling; be made at repetitive rates of about 300 Hz.; have a resolution of 0.0005 inch; have an absolute accuracy equivalent to one-quarter commercial tolerance; maintain a high degree of reliability; all measurements made under the severe environment normally present in a steel rolling mill. Bar temperature measurements should have similar characteristics. A histogram of bar measurements is also provided by the system.

Several types of electro-optical gaging systems are available to measure bar size. One early type of bar size gaging system operates on the self-illumination principle in which chopped infrared radiation from the hot bar is imaged through a lens onto an infrared detector. Elementary edge-detection circuitry was used in an attempt to define raw detector pulses in relation to bar edges.

Three more recent electro-optical systems applicable to bar size measurements operate on the principle of backlighting a test object to be measured and imaging a shadow of the object through a lens onto the face of an electronic camera. In one such gaging system, a scanning laser beam illuminates the test object and the lens system focuses the object shadow onto a phototransistor. In a second such gaging system, a stationary light source of fixed intensity illuminates the test object and the lens system focuses the object shadow onto an electronically scanned image orthicon tube having two-axis unidirectional scanning. In the third such system, the image orthicon tube is replaced by a self-scanning photodiode array.

The photoresponsive device in each of the three back-lighted gaging systems generates a raw camera pulse having a width that approximates the object dimension between shadow edges. Raw camera pulses are processed in edge detection circuitry having either plain differentiators or gated differentiators which further attempt to more closely define camera pulse width in relation to the object dimension.

Two additional types of electro-optical gaging systems are available which combine the above features to measure bar lateral profile. One type of profile gaging system combines two self-illuminated cameras fixedly disposed orthogonally perpendicular to the bar mill pass line. This system in fact produces only two bar diameter measurements 90° apart but not bar profile measurements. The other type of electro-optical bar profile gaging system incorporates two back-lighted cameras mounted orthogonally on a scanner, whereby two bar diameter measurements and a scanner position measurement are indicated separately and/or recorded on a multichannel recorder during peripheral scanning of the bar.

Each of the foregoing prior art electro-optical bar size and bar profile gaging systems has met with varying degrees of success in certain types of installations. However, none of these gaging systems is entirely satisfactory to use as a bar dimension and profile gaging system in the environment of a contemporary high-speed hot steel bar rolling mill. Such gaging systems fail to meet the foregoing measurement requirements for one or more of the following reasons.

Difficulties with prior art gaging systems are first, the object to be measured must be confined to a given position in the camera field-of-view. Second, inability to provide sufficient camera speed-of-response and/or camera resolution. Third, inability to meet system accuracy at high repetition rates because considerable switching noise occurs at such measuring speeds and differentiator noise is also particularly troublesome. In addition, some environmental electrical noise is present in varying degrees which further compounds the problem of making definitive bar measurements at high speeds and high reliability. Fourth, inability or insufficient capability to correct for such error sources as optical and electronic nonlinearities, all of which affect gaging system accuracy. Fifth, instability which causes drift in system calibration. Sixth, inability to provide a meaningful plot and display of cold bar diameters and profile information at various peripheral positions to either a rolling mill operator or a rolling mill control computer. Seventh, inability to provide a bar gaging system histogram. Eighth, inability to compensate or correct size for distortion resulting from high frequency lateral vibration of the bar.

SUMMARY OF THE INVENTION

A main object of this invention is to provide an improved electro-optical gaging method and system.

One other object of this invention is to provide an improved electro-optical gaging method and system which has a high response speed, a high repetition rate of measurement, a high accuracy, a high stability and/or a high reliability in the environment of a contemporary high-speed hot steel bar rolling mill.

Another object of this invention is to provide an improved electro-optical gaging method and apparatus which permits accurate measurement of an object when placed at any position in a camera field-of-view, including while the object is vibrating in an orbit lateral to longitudinal movement of the object.

Another object of this invention is to provide an improved electro-optical gaging method and system which determines both object size and object variable position in a camera field-of-view.

Still another object of this invention is to provide an improved electro-optical gaging method and system which processes a camera signal to remove noise combined with an object size pulse in the camera signal, thereby permitting precise definitions of the object size pulse and/or object position in the camera field-of-view.

Yet another object of this invention is to provide an improved electro-optical gaging method and system which corrects camera object size signals for optical and electronic nonlinearities and/or other sources of error.

A further object of this invention is to provide an improved electro-optical gaging method and system which plots and displays and/or records two orthogonal dimensions of an object and/or the object's profile at one or more peripheral positions of the object.

Still a further object of this invention is to provide an improved electro-optical gaging method and system which plots the profile of an object and displays and/or records the plot overlaid on one or more commercial tolerance references of the object.

A penultimate object of this invention is to provide an improved electro-optical gaging method and system which plots and displays and/or records one or more histograms of the gaging system.

A final object of this invention is to provide an improved electro-optical gaging method and system which plots a profile of an object and/or a gage histogram suitable for use by a computer controlled process.

The foregoing objects may advantageously be attained for use in a hot bar rolling mill, for example, by a computerized electro-optical system for gaging two-orthagonal dimensions of a moving and vibrating hot bar at various peripheral positions by using dual backlighted electronic camera heads mounted 90° apart on a scanner. Each camera head is provided with electronics which include camera AGC and a common digital bidirectional sweep generator for oneaxis scan of each camera simultaneously. Additional electronics process a bar shadow pulse in pulse edge-detection circuitry having an autocorrelator to remove noise. Other electronics include a digital accumulator which provides digital bar size and bar position-in-field-of-view signals Each camera's bar size and bar position signals, a scanner position signal, bar temperature and other signals are assimilated by a digital computer which is programmed to perform the following functions either off-line or on-line. First, correct each bar size signal by digitally compensating for field-of-view errors, other optical and electronic nonlinearities, bar temperature and other sources of errors, thereby providing highly accurate bar diameter measurements anywhere in the f.o.v. Second, calibrate the gage off-line and automatically recalibrate the gage on-line to offset calibration drift and slope errors. Third, automatically control scanner drive and incremental digital storage of corrected bar diameter measurements for each camera during scanning. Fourth, facilitate interaction with CRT and printing terminals to indicate and/or record: (a) each camera's bar diameter measurement anywhere in the scanning field; (b) using stored bar diameter data and operating data header, plot bar profile deviation from aim gage where the plot is overlaid on full- and half-commercial tolerance references; and (c) a histogram for each gage and a gage difference histogram. The computer is adapted to communicate profile and histogram data to a rolling mill control system when requested by the control system.

BRIEF DESCRIPTION OF THE DRAWINGS

FIG. 1 is a block diagram of the overall computerized electro-optical gaging system having dual cameras on a scanner.

FIG. 2 is a diagram of a bar cross-section showing maximum and minimum tolerance limits in dotted circles, and includes a four-plane overlay related to bar profile orientation.

FIG. 3 is a computer printout of bar profile deviation vs. scanner angular position in relation to the four-plane overlay of FIG. 2, and includes an operating data header.

FIG. 4 is a block diagram of camera electronics for each camera head of the dual camera system shown in FIG. 1.

FIG. 5 is a sectional view of a masked photocathode used in an image dissector tube used in the FIG. 4 camera electronics.

FIG. 6 is a cross-sectional view of the masked photocathode shown in FIG. 5.

FIG. 16A-B is a computer CORE MAP.

FIGS. 17A-E, 18, 19, 20A-B, 21A-B and 22 are flow charts of computer SERVICE PROGRAMS.

FIGS. 23A-D are flow charts of computer BAR GAGE DATA PROGRAM.

FIGS. 24A-C, 25, 26, 27A-C, 28 and 29 are flow charts of computer COMPENSATION PROGRAMS.

FIGS. 30A-F are flow charts of computer CALIBRATION PROGRAM.

FIGS. 31A-D, 32A-C and 33A-E are flow charts of computer RECALIBRATION PROGRAMS.

FIGS. 34, 35, 36A-D, 37A-E, 38A-B, 39A-B, 40, 41A-C are flow charts of computer PROFILE & POSITION PROGRAMS.

FIGS. 42A-D are flow charts of computer HISTOGRAM PROGRAM.

DESCRIPTION OF THE PREFERRED EMBODIMENT

Figure 7:
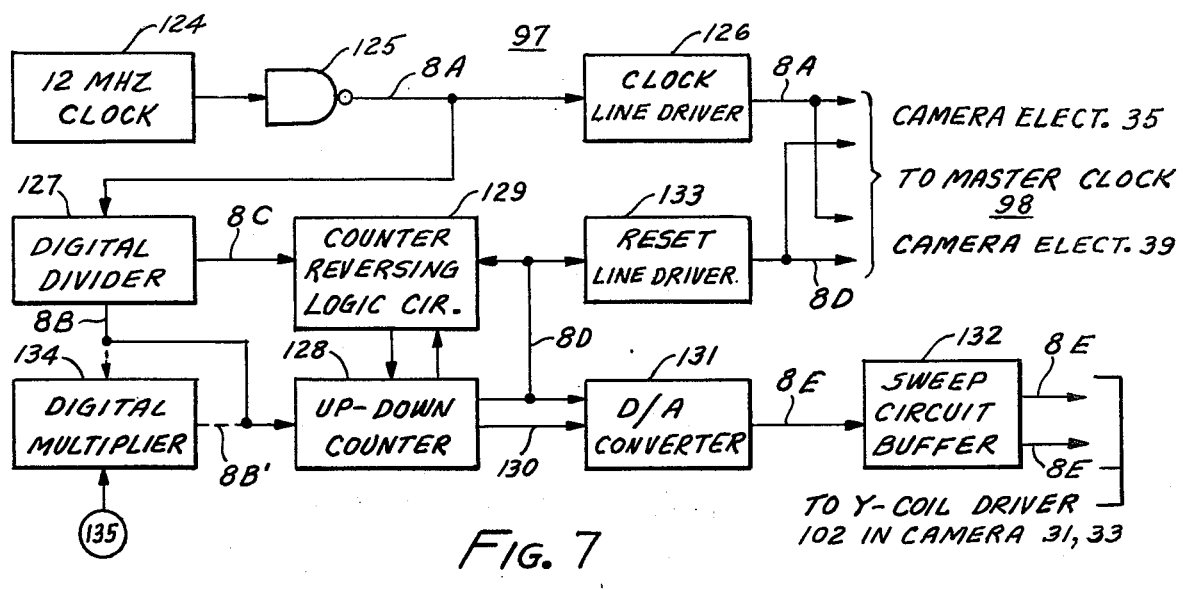
FIG. 7 is a block diagram of a bidirectional sweep generator used in the camera electronics shown in FIG. 4.

Referring now to the drawings, particularly FIG. 1, there is shown a computerized electro-optical gaging system having dual back-lighted cameras mounted on a scanner in a hot steel bar rolling mill. The gaging system measures two orthogonal diameters of bar 10, for example, beyond the exit side of roll stand 11 while the scanner scans the peripheral surface of bar 10 a prescribed angular displacement. As explained below, the two diameter signals and a scanner position signal are fed to a computer which plots the lateral profile of bar 10. Ultimately, the bar profile data is displayed, recorded and transmitted to a rolling mill control system which uses this data to control size and shape of the bar by (a) setting the lateral gap of the rolls in stand 11, (b) setting the vertical alignment of the rolls in stand 11 and (c) setting the lateral gap of the rolls in the stand immediately preceding stand 11.

More specifically, dual head scanner 12 consists of reversible scanner mechanism 13 driven by motor 14 which is energized over wire 15 by variable speed controller 16. Two-mode selector switch 17 provides for either manual or automatic scanner operation as signalled over wire 18 to controller 16. This depends on whether a gaging system operator or the computer is to exercise optional manual or automatic scanner 12 control. Under manual control mode, manual speed, start-stop and scanner 12 direction control originates in control device 19 and these signals are fed over wire 20 to controller 16. Under automatic control mode, the manual control signal sources are disabled and scanner controller 16 receives corresponding signals from the computer as will be explained below.

Scanner position encoder 21 is coupled to mechanism 13 and generates an analog signal representing the absolute position of scanner 12 rotation. The encoder signal is fed over wire 22 to scanner position electronics 23 where it is converted to both analog and digital sanner position signals. The analog scanner position signals are fed over wire 24 to scanner position indicator 25 which may be observed by the gage operator when the scanning operation is under manual control. The digital scanner position signals are fed over wire 26 to computer 27 where they are assimilated with computer command signals under automatic control mode of scanner 12. Computer 27 then generates start-stop signals and speed control signals as described below. These signals are fed over respective wires 28 and 29 to scanner controller 16. During the automatic control mode, the digital scanner position signals are used in bar profile determining operations, also described below.

Mechanism 13 of dual head scanner 12 is adapted to mount first and second backlighted electronic camera heads, orthogonally to each other so as to be perpendicular to bar 10 during peripheral scanning of bar 10 through a prescribed angular displacement. Bar 10 profile plot scan is shown in FIGS. 1 and 2 as 90° rotation by scanner 12. This will gather enough camera signals to permit later plotting of 180° lateral profile of bar 10. A 180° profile plot is quite useful to a mill operator and a mill control computer as described below. Under other scanning requirements for bar size measurements, the scanning angular displacement may be other than 90°.

First light box 30 is located opposite first electronic camera head 31 so that when bar 10 intercepts light from box 30 a bar shadow having a width proportional to bar diameter at a first lateral position with be imaged on first electronic camera head 31. Similarly, second light box 32 is located opposite second electronic camera head 33 so that when bar 10 intercepts light from box 32 a bar shadow having a width proportional to bar diameter at a second lateral position, orthagonal to the first, will be imaged on second electronic camera head 33. The arrangement of first back-lighted camera head, shown in FIG. 4 and described below, is typical of both camera heads.

Each light box 30, 32 is arranged to produce a light source perpendicular to bar 10 larger than the largest size bar 10 to be gaged in the camera field-of-view. For example, the camera field-of-view referred to below is three inches (7.62 cm.) and the light source used therewith is four inches (10.16 cm.). In addition, the wavelength and intensity of light boxes 30, 32 must be compatible with the sensitivity characteristics of electronic camera heads 31, 33. Typically, blue light from a D.C. fired fluorescent light source is preferred for the electronic camera heads described below.

The first shadow of bar 10, together with excess light beyond bar 10 edges directed from back light box 30, causes first electronic camera head 31 to generate a first camera signal. This signal consists of a raw camera pulse mixed with noise which is fed over wire 34 to first camera electronics 35. As described below in connection with FIG. 4, the first camera signal is processed to remove the noise and produce digital bar size and bar position signals which are fed over cable 36 to computer 27. Gage enable and other signals are fed over cable 37 from computer 27 to first camera electronics 35.

Simultaneously, the second shadow of bar 10, together with excess light beyond bar 10 edges directed by back light box 32, causes second electronic camera head 33 to generate a second camera signal. Similarly, this signal consists of a raw camera pulse mixed with noise which is fed over wire 38 to second camera electronics 39. The second camera signal is processed to remove the noise and produce digital bar size and position signals which are fed over cable 41 to computer 27. Gage enable and other signals are fed over cable 40 from computer 27 to second camera electronics 39.

Computer 27 in the present electro-optical bar gaging system also receives bar 10 aim size digital signals from thumbwheel selector 42 by way of cable 43. Aim size signals, exemplified as 1.7500 inches (4.445 cm.), are used to determine bar 10 profile deviation and other purposes described below. In addition, computer 27 also receives a bar 10 composition digital signal from thumbwheel selector 44 by way of cable 45. Composition signal, which is exemplified as 0.230% and represents percent carbon in the bar 10, is used as a factor in calculating hot bar aim size from cold bar aim size and other purposes described below. Further, computer 27 also receives appropriate order data signals, including date, time and size tolerances for bar 10, from source 46 by way of cable 47. Alternatively, any one or all of the aim size signals, composition signals, and other data signals may be supplied by a control system directly associated with rolling bar 10, depending upon the preference of the bar gaging system user.

In order to make temperature corrections to the diameter measurements of moving hot bar 10, a Land Co. optical pyrometer head 48 is provided adjacent scanner 12 and aimed at moving hot bar 10. Optical pyrometer head 48 is adapted to generate a high-response raw temperature signal which is fed over cable 49 to Land Co. pyrometer electronics 50. The raw temperature signal is corrected by scaling and linearizing circuits in pyrometer electronics 50 and the corrected temperature signal, exemplified as 1670° F. (910° C.), is fed over cable 51 to digital indicator 52. In addition, the corrected temperature signal is fed over cable 53 to computer 27 where it is used to compensate for hot bar 10 shrinkage.

Installation problems may preclude a Land Co. optical pyrometer head 48 and pyrometer electronics 50 from providing a corrected temperature signal to computer 27 and indicator 52 with desired accuracy and rate of response. If such is the case, an alternative to the Land Co. pyrometer arrangement may be to replace it with an optical field scanning pyrometer system disclosed in cross-reference (A). Briefly, the optical field scanning pyrometer system consists of a rapidly oscillating mirror mounted in a pyrometer head and aimed at a field-of-view through which hot bar 10 will travel. The hot bar is imaged through a slit and onto a high-response infrared detector in the pyrometer head. The infrared detector feeds a peak detector and sample-and-hold circuits to measure and store a nonlinear signal of bar 10 temperature. The stored nonlinear signal may be fed over cable 53 to computer 27 where it must be scaled and/or linearized. The stored temperature signal is updated every scan of the oscillating mirror, for example every 20 ms., by a busy-ready flag pulse fed over dotted-line cable 54. In addition, the stored temperature is scaled and linearized with less frequent up-dating and may be fed to bar temperature indicator 52. Provisions are made for adjusting field scanning frequency and width of field-of-view to suit a variety of installations.

One other feature of the present bar gaging system is an automatic recalibration system. As described below, this feature is initiated each time the trailing end of hot bar 10 is detected leaving mill rolls 11. For this reason, hot metal detector 55 detects the presence and absence of hot bar 10 and feeds a corresponding signal over wire 56 to hot metal detector electronics 57. A presence/absence signal is fed over cable 58 to computer 27 where it initiates the automatic recalibration system mentioned above.

All of the scanner position signals, first and second camera signals, aim size signal, composition signal, other signals, temperature signal and hot metal presence/absence signal fed over respective cables 26, 36, 41, 43, 45, 47, 53 and 58 are assimilated by computer 27 to perform a variety of functions under control of a group of computer off-line and on-line programs detailed below. One of these functions is to generate the scanner start-stop signal on cable 28 and the scanner speed control signals on cable 29, both under automatic scanning mode control. Another function is to feed bar diameter data, bar profile deviation data overlaid on commercial tolerance references and operating header data from computer 27 over cable 59 to CRT terminal 60, and to accept interaction between a standard keyboard on terminal 60 and computer 27 by way of cable 61.

Another function of computer 27 is to feed bar diameter data, bar profile data overlaid on commercial tolerance references and operating header data from computer 27 over cable 62 to printing terminal 63, and to accept interactions between a standard keyboard on terminal 63 and computer 27 by way of cable 64. Printing terminal 63 produces printout 65 which is illustrated in FIG. 3. Still another function of computer 27 is to feed bar 10 profile data and gaging system histograms over cable 66 to control system 67 in response to corresponding request signals fed back to computer 27 by way of cable 68.

Turning now to FIG. 2, there is shown a crosssectional diagram illustrating the lateral profile of bar 10. Dotted circular lines 69 and 70 are illustrative of maximum and minimum standard commercial tolerances for aim size diameter. Also illustrated by dotted straight lines are planes A-A, B-B, C-C and D-D which are of particular interest to a rolling mill operator and a control computer for determining the roll gap and alignment relationships of mill rolls 11 shown in FIG. 1. During non-scanning operations, it is preferred to bring scanner 12 to rest, at least temporarily, so that first camera head 31 and second camera head 33 will measure the diameters at planes C-C and A-A, respectively. The A plane dimension of bar 10 is illustrated at 71 as 1.7520 inches and the C plane dimension of bar 10 is illustrated at 72 as 1.7490 inches, the aim size being 1.7500 inches for illustrative purposes.

During bar scanning operations, it is preferred that second camera head 33 start profile plot scan 73 at plane B-B, continue counter-clockwise 90° through plane C-C, and stop at plane D-D. At the same time, first camera head 31 starts scanning at plane D-D, continues counter-clockwise 90° through plane A-A and stops at plane B-B. In this manner, first and second camera heads 31, 33 scan a 180° lateral peripheral surface of bar 10 and this scan is plotted from plane B-B to C-C, D-D, A-A and ends back at B-B. Other methods of scanning may be used. For example, scanning rotation may be clockwise instead of counter-clockwise. Also, scanner 12 may start at any plane or point in between, then scan 90° and return to the starting position, thereby permitting any 180° portion of bar 10 to be plotted by rotating cameras 31, 33 only 90°.

The resulting profile plot of bar 10 corrected to cold size is computer printout 65 shown in FIG. 3. Here bar profile 74 is overlaid on a specific size, size tolerance and bar position format generated by computer 27 shown in FIG. 1. The computer-generated format includes an operating data header; bar profile deviation from the actual cold aim size, selected by device 42 in FIG. 1, is the Y-axis variable; and the scanner 12 angular position is the X-axis variable. The Y-axis printout is graduated in 0.0010 inch increments above and below aim size dotted baseline 75 and extends beyond maximum and minimum full-commercial tolerance reference lines 76, 77. Reference lines 76, 77 are printed as dashed lines across the X-axis. In addition, maximum and minimum half-commercial tolerance reference lines 78, 79 are printed across the X-axis as alpha-numeric lines at fifteen angular degree increments of the 180° bar profile replot. At zero and each 45° increment, the FIG. 2 cross-section plane designations B, C, D, A and B are printed, while the intervening 15° and 30° increments are so printed relative to the A and C positions.

It should be noted that the display on CRT terminal 60 is substantially the same as computer printout 65, with two exceptions. That is, in addition to the bar profile deviation plot and computer-generated format, computer 27 also generates an additional display format of the FIG. 2 dottedline scanning planes A-A, B-B, C-C and D-D as well as the actual numerical bar sizes A and C shown as items 71 and 72 in FIG. 2. Second, full tolerance limits are not displayed if half tolerance is the aim of the system. Thus, CRT terminal 60 displays bar profile, bar diameter and bar scanning plane information in a form that is unique and quite useful to an operator of the bar gaging system as well as an operator of a rolling mill where the bar gage is used.

Electronic Camera Head

A typical back-lighted electronic camera head used in the present electro-optical bar gaging system is shown in FIG. 4 as camera head 33 placed along an optical axis on the opposite side of bar 10 from light box 31. This arrangement illuminates field-of-view 80 and produces bar shadow 81 that varies vertically proportional to the lateral dimension between hot bar edges 82, 83. An end view of hot bar 10 makes it appear stationary but in actual practice bar 10 vibrates in orbit 84 while traveling longitudinally at speeds up to 4000 ft./min. (1219 m./min.). For this reason, hot bar shadow 81 not only varies vertically proportional to bar size, but is also displaced horizontally and vertically within the confines of about a three inch diameter bar orbit 84. This phenomenon requires a larger field-of-view 80 than does a stationary bar, thereby increasing the problems of precision bar measurements.

Because the bar shadow 81 varies vertically and its position varies both horizontally and vertically, camera head 33 is provided with telecentric lens system 85 which is designed to admit only parallel light rays with a focal plane extending from at least the nearest horizontal edge of bar orbit 84 to at least the farthest horizontal edge of bar orbit 84. This is accomplished by seven-element lens 86 having a four-inch field-of-view 80 within which three inch bar orbit 84 is centered vertically. Other properties of lens 86 include an image size reduction of 2:1 and a telecentric lens stop 87 having a very narrow horizontal optical aperture 88 through which bar shadow 81 passes. Transmission of bar shadow 81 is limited by optical filter 89 to pass only blue light from light box 31, thereby eliminating undesirable effects of other light sources in the field-of-view which have different wavelengths.

Accordingly, telecentric lens system 85 produces a horizontally-oriented bar shadow 81 that varies vertically between bar edges 82, 83 and remains sharply in focus while bar 10 vibrates in orbit 84. Bar shadow 81 is the same size along the optical axis, but as it is displaced vertically away from the optical axis in either direction it becomes larger according to a nonlinear function. This phenomenon is caused by a combination of electronic, coil and lens non-linearities and is referred to as field-of-view error which will be corrected by computer 27 as described below.

Bar shadow 81 transmitted by telecentric lens system 85 is imaged upon image responsive device 90 which is capable of being scanned at least at 300 Hz., has a resolving power of at least 1 part in 10,000, and has a high sensitivity to blue light. Preferably, device 90 is an image dissector (I.D.) tube having photocathode electrode 91 with a central image translating area which receives the bar shadow 81 image. Photocathode electrode 91 is located behind a light-transmitting face in the drift section of I.D. tube 90. Photoelectrons emitted by photocathode electrode 91 are focused by external means to pass through electron aperture 92 so they can enter the photomultiplier (P.M.) section of image dissector tube 90. Preferably, device 90 is an ITT Co. high resolution image dissector tube No. F4052RP.

Camera head 33 also includes cylindrical deflection and focus coil assembly 93 surrounding the cylindrical body of image dissector tube 90. Coil assembly 93 includes separator Y-axis and X-axis deflection coils and a focus coil, each energized from separate external sources. Standard mu metal shielding surrounds the exterior cylindrical wall of coil assembly 93, thereby providing effective shielding against radial magnetic fields. A preferred coil assembly 93 designed for use with the above noted I.D. tube 90 is Washburn Laboratory, Inc. No. YF2308-CC3C.

Occasionally, the standard mu metal shielding in the Washburn Laboratory, Inc. coil assembly 93 may not provide enough shielding against both radial and axial magnetic field sources. For example, when I.D. tube 90 is operating at a high sensitivity level and scanner 12 rotates camera head 33 through earth's magnetic field and/or electrical magnetic fields present in rolling mills, I.D. tube 90 output may differ at one time or another from that when I.D. tube 90 is stationary. If this condition is encountered in practice, an alternative solution exists which requires modifying the Washburn standard mu metal shielding to improve the attenuation of axial magnetic fields according to the teachings in cross-reference (B). Essentially, this involves extending the standard Washburn cylindrical mu metal shield axially toward lens system 85 and closing down the end at filter 89, except for an optical aperture to image bar shadow 81 onto photocathode electrode 91 in tube 90. Additional axial magnetic field attenuation may be achieved by a second cylindrical mu metal shield surrounding the extended standard shield. Moreover, the standard coil shield may be used without extension, but axial field attenuation may be achieved by adding a second and possibly a third cylindrical mu metal shield extending axially as in the first instance.

Still referring to FIG. 4, the present electrooptical bar gaging system may experience other calibration drift and variations in optical, image dissector tube, and other electronic nonlinearities inherent in the bar gaging system. These drift and variable gaging conditions may be identified by providing on-line calibration checks and subsequently correcting the calibrated bar signals as described below. These calibration checks are made possible by modifying image dissector tube 90 to provide a masked photocathode electrode 91 as shown in FIG. 5.

As can be seen in FIG. 5, masked photocathode electrode 91 includes patterned image non-translating areas adjacent image translating areas. More specifically, calibration masks 94, 95 are made by selectively depositing the usual photoresponsive material of photocathode electrode 91 onto image transmitting glass face 96 using a precision mask to form the calibration reference patterns. For example, calibration mask 94 may consist of a single 0.250 inch mask centered on the right side of photocathode electrode 91. Calibration mask 94 is referred to as "right mask" and may be used for on-line checking of bar gaging system calibration drift under RTMASK computer program described below. Calibration mask 95 may consist of five 0.100 inch wide masks spaced 0.100 inch apart on the left side of photocathode electrode 91. Calibration mask 95 is referred to as "left mask" and may be used for on-line checking of variations in bar gaging system optical and electonic nonlinearities under LFTMSK computer program described below. FIG. 6 is an enlarged cross-section taken through FIG. 5 to show the right mask 94 void in masked photocathode electrode 91, the void extending to glass face 96 of image dissector tube 90.

During all bar gaging system operations a single-axis bidirection sweep signal is applied to the Y-axis deflection coil and a fixed amount of current applied to the focus coil, both as described below. Under normal bar gaging operations, there is no current applied to the X-axis deflection coil. This causes the Y-axis scan to traverse the "C" scan, or central image translating area of photocathode electrode 91 as shown in FIG. 5. Whenever detector 55 determines there is no bar 10 in the camera field-of-view, computer 27 may select either right or left calibration mask 94, 95 by applying a positive or negative bias current to the X-axis deflection coil. This X-axis bias shifts the Y-axis scan of photocathode electrode 91 to corresponding "R" scan and "L" scan positions on opposite sides of "C" scan as shown in FIG. 5.

The X-axis bias has the effect of shifting the right calibration mask 94, or the left calibration mask 95, over electron aperture 92 in the image dissector tube 90. When the single Y-axis scan voltage is applied to the Y-axis deflection coil, the image of right or left calibration mask 94, 95 is effectively moved up and down across electron aperture 92 in the same manner as actual bar shadow 81 is moved at the "C" scan position.

It should be noted that the raw camera pulse on wire 34 has the same pulse width when either the right or left calibration mask 94, 95 is selected by computer 27 as occurs when a bar shadow 81 having a corresponding size and position is imaged on the central area of photocathode electrode 91. Hence, the masked photocathode electrode 91 affords an effective way of on-line checking of bar gaging system drift as well as changes in optical and electronic nonlinearities.

Camera Electronics

Typical camera electronics used in the present electro-optical bar gaging system is shown in FIG. 4 as first camera electronics 35. The second camera electronics 39 is a duplicate of first camera electronics 35 except for bidirectional sweep generator 97. Details of camera electronics 35 may best be understood by referring to FIGS. 4 and 7 through 13. All electronic components therein are conventional solid-state devices and include TTL logic elements where logic symbols indicate or imply their use.

Figure 8:
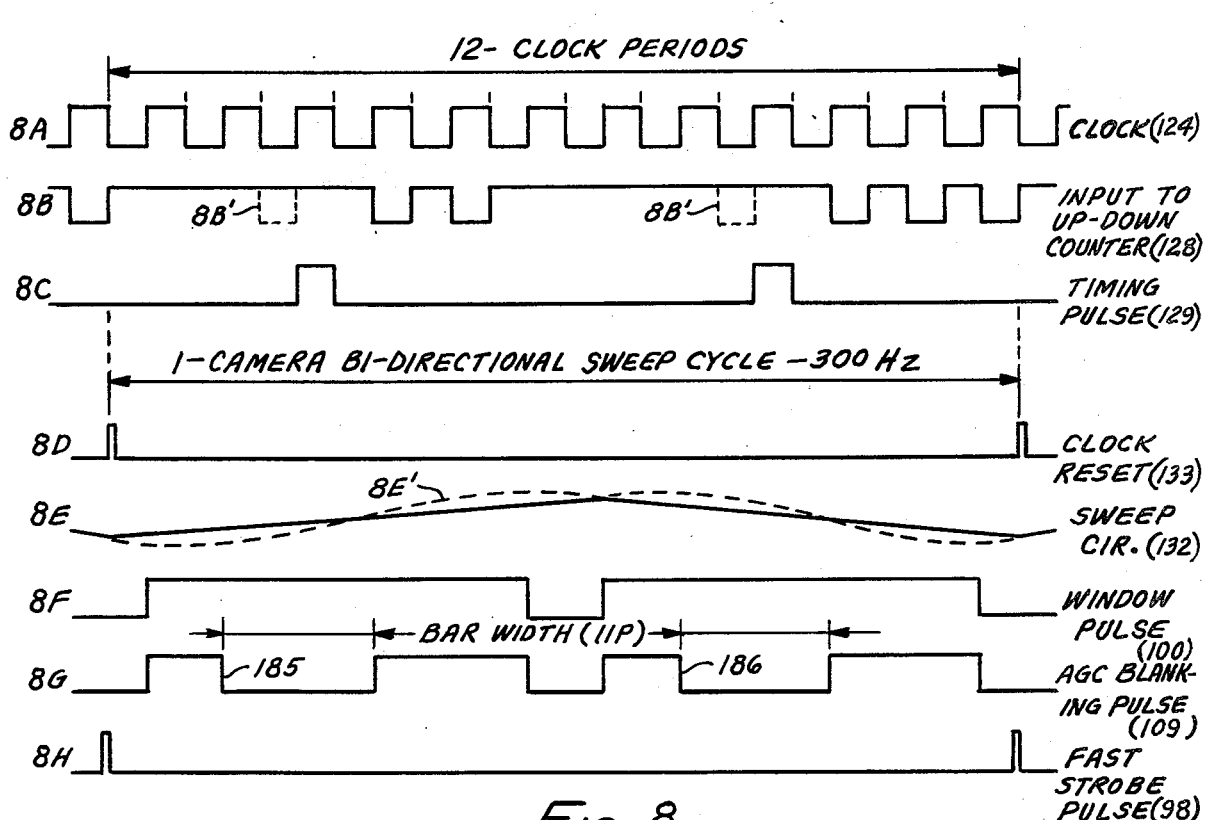
FIG. 8 is a timing diagram of pulses generated by the bidirectional sweep generator, master clock, window pulse generator, and AGC blanking circuits shown in the camera electronics of FIG. 4.

Generally, FIG. 4 shows bidirectional sweep generator 97 which is shared by both camera electronics 35, 39. Bidirectional sweep generator 97 is shown in FIGS. 7 and 8 and includes a 12 MHz. crystal oscillator that provides a train of basic square wave clock pulses 8A for the entire electro-optical bar gaging system. Except for actual measurement of processed bar pulses, all digital operations are synchronized with clock pulse 8A in addition to bidirectional sweep signal 8E and sweep reset pulse 8D, the latter two being generated in sweep circuitry at approximately 300 Hz. Clock pulse 8A and bidirectional sweep signal 8E are synchronized by sweep pulse 8D every sweep cycle so that sweep signal 8E may be divided for any purpose by using the appropriate sub-multiple of clock pulse 8A. Clock pulse 8A is used for actual measurements, while pulses for other bar gaging system requirements are derived by dividing clock pulse 8A down all the way to the frequency of bidirectional sweep signal 8E. It should be noted that the absolute frequency value of clock pulse 8A and bidirectional sweep signal 8E is not critical because the bar gaging system is calibrated by actually placing standard size bars in each camera's field-of-view. However, sweep stability and sweep linearity are highly critical, since they directly affect the bar gaging system accuracy.

Master clock 98 shown in FIG. 4 receives a train of the 12 MHz. clock pulse 8A and the 300 Hz. sweep reset pulses 8D from bidirectional sweep generator 97. Master clock 98 includes buffers, digital counter, divider and logic circuits to supply all synchronized pulses used throughout camera electronics 35 for timing and measuring purposes. These include buffered 12 MHz. clock pulses 8A, buffered 300 Hz. sweep reset pulses 8D. Additional pulses generated within are a 300 Hz. fast strobe pulse 8H of short duration and a data ready pulse similar to pulse 8H but longer in duration. The data ready pulse is outputed on wire 99 and the other pulses carry their some identity to other circuits shown in FIG. 4.

Although there is a separate master clock 28 for each camera electronics 35 and 39, the same 12 MHz. train of clock pulses 8A and sweep reset pulses 8D serve both. Therefore, both master clocks 98 will always be in phase and have identical waveshapes when they are working correctly. This, of course, is a great aid in troubleshooting and servicing.

Window generator 100 receives the 12 MHz. clock pulse 8A from master clock 98 and, by means of gates and logic circuitry, generates window pulse 8F once every half of each bidirectional sweep cycle as shown in timing diagram FIG. 8. An inverted window pulse $\overline{8F}$ is also generated. Both window pulses 8F, $\overline{8F}$ ae fed to other circuits described below. The width and timing of window pulses 8F, $\overline{8F}$ are determined by a control pulse on wire 101 fed from computer 27. Briefly, the width of window pulses 8F, 8F̄ is related to the time required for sweep signal 8E to sweep only the photocathode electrode 91, this being only a major portion of each up or down half of an entire 300 Hz. sweep cycle. For example, if the camera field-of-view is three inches and lens is four inches, as they are herein, then the three inch field-of-view is imaged down centrally to cover the entire face of photocathode electrode 91. Over-scanning of photocathode electrode 91 results in each up and down half of bidirectional sweep cycle 8E. This over-scanning is equally divided into two time intervals at the beginning and ending of each up and down half of bidirectional sweep cycle 8E. Thus, the sum of the durations of window pulse 8F (about 75%) and the overscan (about 25%) equal the duration of each up and down half of bidirectional sweep cycle 8E. As an alternative arrangement, window pulse width may be established manually by selective gating means not shown to replace the computer 27 control signal on wire 101.

During computer 27 programs RTMASK, LFTMSK, GAGRCL, CALIBR, and RTPROF described below, window generator 100 is programmed by way of wire 101 to modify the normal size and timing of window pulses 8F, 8F̄. During RTMASK, GAGRCL, and RTPROF, window pulse size and timing are set for the size and location of right calibration mask 94 in FIG. 5. During LFTMSK, five window pulses sized and timed for each side and location of left calibration mask 95 elements are generated one at a time to selectively cover the entire left calibration mask 95. During CALIBR, window pulse size and timing are selectively set for size and location of right calibration mask 94 and each of the five left calibration masks 95. The size of the normal window pulses 8F, 8F̄ is set by subroutine GAGEIN described below.

Still referring to FIG. 4, bidirectional sweep signal 8E is fed from bidirectional sweep generator 97 to Y-coil deflection driver 102 and into the vertical or Y-deflection coil in coil assembly 93. Constant current from focus coil current source 103 is fed to the focus coil in coil assembly 93. The magnitude of focus current is adjusted to focus all electrons emitted from each point on the photocathode surface 91 to a corresponding single point in the plane of the electron aperture 92.

X-coil driver 104 is connected to the horizontal or X-deflection coil in coil assembly 93. Under normal bar gaging operations there is no effective current applied to X-deflection coil. Therefore, the vertical single-scan of the Y-axis may occur as the "C" scan centrally in the image translating area of photocathode electrode 91 as shown in FIG. 5. During calibration checks by computer 27 under programs RTMASK and LFTMSK described below, positive and negative bias is applied alternatively by control wires 105 and 106 from computer 27 to X-coil driver 104. This will cause the vertical single scan of the Y-axis to shift to either the "R" scan or "L" scan position corresponding to the right mask 94 or the left mask 95, depending on which bias control wire 105, 106 is energized. As an alternative arrangement, the positive and negative bias currents may be selected manually from a source not shown instead of computer 27 supplying them.

In summarizing the image dissector tube 90 scanning effected by coil assembly 93, only single-scan Y-axis, or vertical, bidirectional scanning is present at any time, this occurring continuously as an up and down sweep with no blanking. Under normal bar gaging operations there is no X-axis sweep, there being only a positive or negative bias applied to check gage system calibration when not measuring bar shadow 81.

As bar shadow 81 is scanned over the camera field-of-view, output current from image dissector tube 90 drops sharply as bar shadow 81 is met, then rises again when the bar shadow is past. This current change, together with electrical noise from the mill environment, is converted to a voltage, amplified in a preamplifier not shown in FIG. 4 and is the raw camera signal output from camera head 31 and appears on wire 34. That is, the raw camera signal at this point consists of a not too well defined bar pulse mixed with noise.

Image dissector tube 90 in camera head 31, operates in a self-balancing measuring loop 107 together with camera pulse processor 108, photomultiplier (P.M.) AGC circuit 109 which produces a variable control voltage on wire 110, and a voltage-controlled high voltage source 111 for P.M. section of tube 90. The drift section of tube 90 is also fed from a separate but stable drift section high voltage source 112.

Figure 9:
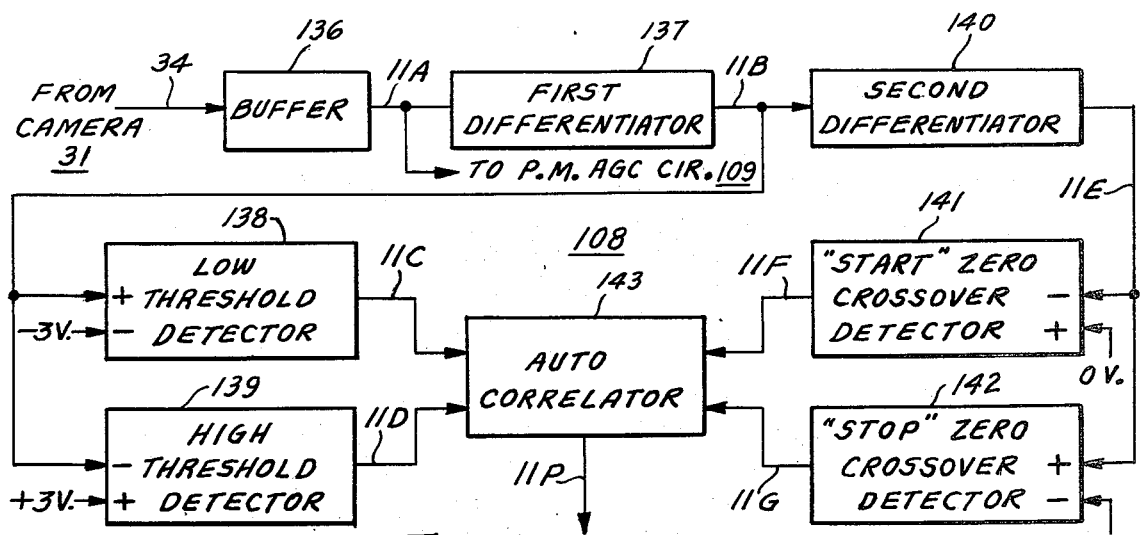
FIG. 9 is a block diagram of the camera pulse processor used in the camera electronics shown in FIG. 4.
Figure 10:
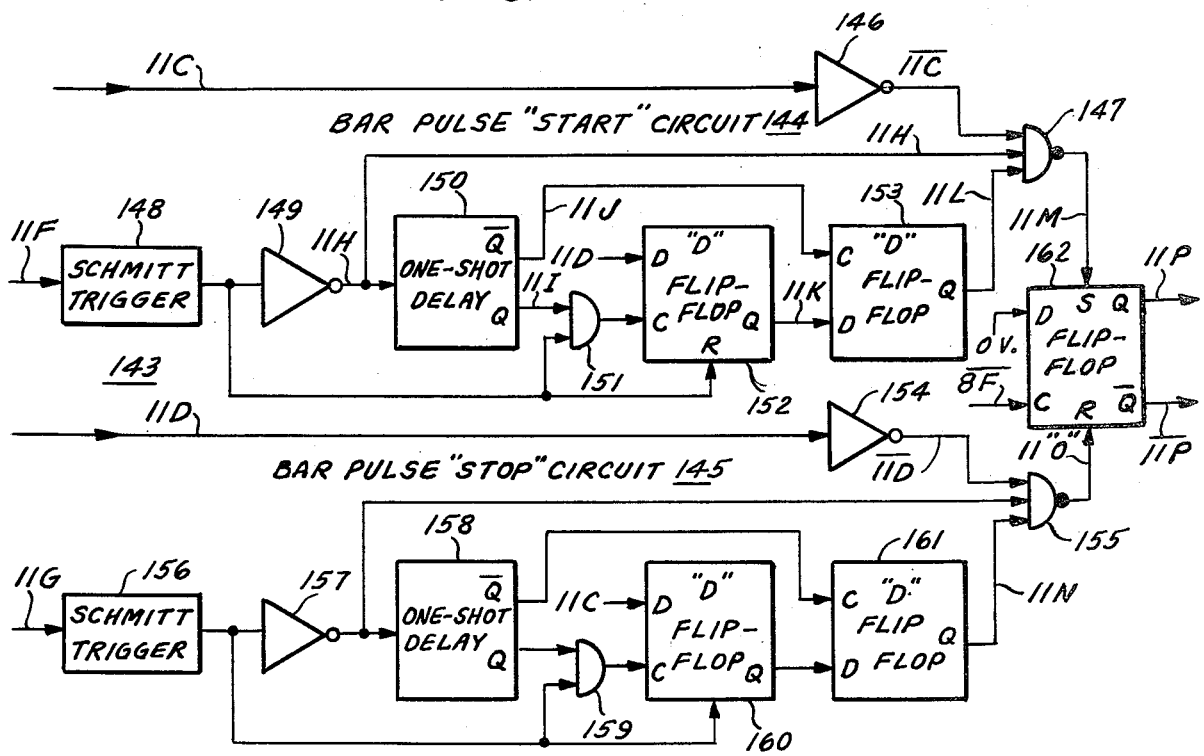
FIG. 10 is a block diagram of an autocorrelator used in the camera pulse processor shown in FIG. 9.
Figure 11:
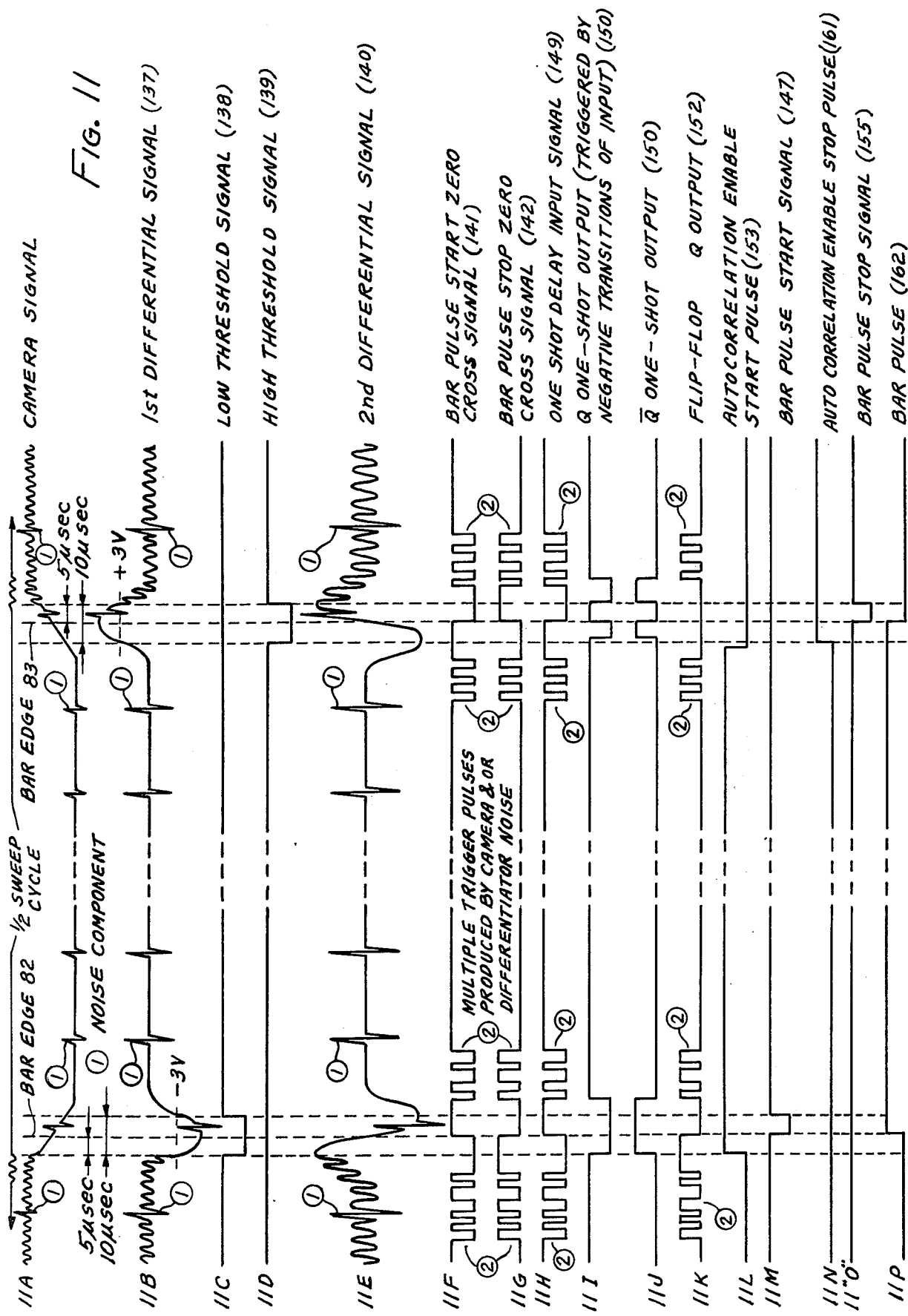
FIG. 11 is a timing diagram of various raw camera signal, differentiator, autocorrelator and bar pulses occurring in the pulse processor shown in FIG. 9.

Camera pulse processor 108 is shown in FIGS. 9 and 10 with FIG. 11 illustrating the processor timing pulses. Included are a buffer, double differentiators, level detectors, zero-crossing detectors and an autocorrelator to remove noise from the raw camera signal and from differentiators. Signals so treated are combined with inverted window pulse 8F̄ in processor logic to ensure that only bar pulses of proper amplitude and occurring at the correct time, will be passed outward for measurement purposes. This also prevents passage of bar pulses when the window is not open. Camera pulse processor 108 produces a buffered camera signal 11A and precision square wave bar pulses 11P, 11P̄ generated by an internal flip-flop. Bar pulse width varies proportional to bar shadow 81 and therefore proportional to bar dimension between bar edges 82 and 83.

Figure 12:
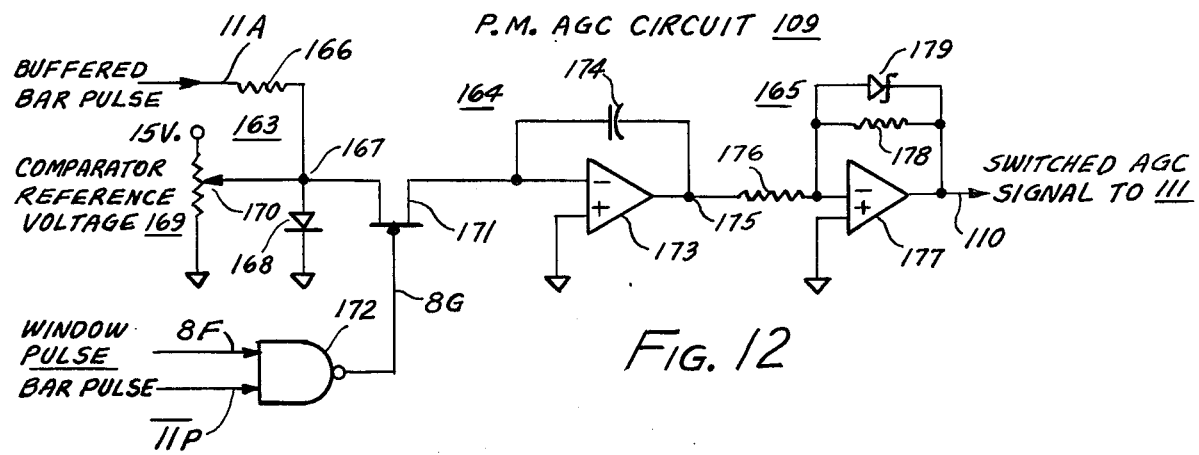
FIG. 12 is a circuit diagram of a P.M. AGC circuit shown in a camera self-balancing measuring loop incorporated in the camera electronics shown in FIG. 4.

P.M. AGC circuit 109, which is shown in FIG. 12 and described below, receives buffered camera signal 11A and includes a comparator, a switched-integrator and an amplifier for producing a switched variable control voltage on wire 110. This control voltage is fed to P.M. section high voltage source 111 for the purpose of varying the gain of image dissector tube 90. The comparator establishes a reference gain level and an internal logic circuit generates an AGC blanking pulse 8G by combining window pulse 8F with inverted bar pulse 11P̄. The AGC blanking pulse effectively defines the time intervals when the camera signal should be sampled.

Action of the self-balancing measuring loop 107 will now be described. When there is no bar 10 in the gaging system, only light from box 30 is imaged on photocathode electrode 91. This causes the P.M. section in image dissector tube 90 to generate a current to flow on wire 34 which is proportional to the intensity of light from box 30. The gain of P.M. section in tube 90 is adjusted to a high level initially by the effective level of AGC control voltage produced by circuit 109. As light intensity deteriorates, or the image dissector tube 90 ages, AGC circuit 109 automatically compensates for this by adjusting the level of P.M. section high voltage from source 111 to vary the gain of the P.M. section of tube 90 and thereby maintain a constant amplitude of the camera signal.

When bar 10 is imposed in the path of light from box 30, AGC circuit 109 also functions to maintain a constant output amplitude from image dissector tube 90. Self-balancing measuring loop 107 thereby permits operation of image dissector tube 90 at a high sensitivity level while maintaining a reasonably high signal-to-noise ratio which is desirable for effective raw camera pulse processing.

Still referring to FIG. 4, precision bar pulses 11P, clock pulses 8A, clock reset pulses 8D and fast strobe pulses 8H are fed to display timing 113. Logic circuits therein are arranged to count clock pulses 8A for the duration of each of two bar pulses 11P occurring during a bidirectional sweep cycle, then dividing by two. Counting is synchronized by clock reset pulse 8D which occurs at the bottom of each bidirectional sweep signal 8E. Logic circuits are strobed by fast strobe pulse 8H in preparation for a binary bar size signal being outputed on wire 114 for display purposes. In order to avoid display flicker, the binary bar size signals are averaged over a predetermined number of bidirectional sweeps, such as 4, 32, 512 sweeps, by means not shown.

Binary bar size signals are fed over wire 114 to digital indicator 115. This device includes integrated counter-decoder-display modules calibrated to display in decimal digits the uncorrected size of bar 10 obtained anywhere in the camera field-of-view. The term uncorrected bar size is applied to bar dimensions at this part of the bar gaging system because no correction for optical and/or electronic nonlinearities, bar temperature and bar composition has been made.

Computer 27 does make corrections to the uncorrected bar size signals and feeds a corrected binary bar size signal over wire 116 to corrected bar size digital indicator 117. This digital indicator is structured the same as digital indicator 115. Both bar size indicators 115, 117 have visual displays adapted to be synchronized and updated every 512 sweeps under control of clock reset pulses 8D and fast strobe pulses 8H. It is to be noted that the difference between readings on bar size indicators 115, 117 signifies to a bar gage operator, and to a rolling mill operator, that (a) the correction features of the bar gaging system are working as required, and (b) that the rolling mill is rolling aim size product.

Computer correlation of bar pulses 11P is based upon accurately determining not only bar size but also bar centerline position in the camera field-of-view with respect to the optical axis of camera head 31. To do this, bar pulses 11P, clock pulses 8A, clock reset pulses 8D and fast strobe pulses are fed to bar size and position accumulator 118 which is illustrated in block diagram FIG. 13 and the timing of pulses is shown in FIG. 8. Two separate counter and latch circuits, each under control of a common control gate, provide binary bar size output signals on wire 119 and binary bar centerline position output signals on wire 120. The binary bar size signals on wire 119 are developed similarly to the uncorrected bar size signals associated with display timing circuits 113 described above. The binary bar position signals permit corrections to be made of the bar size signals to an accuracy of 1 part of 256 of the camera field-of-view.

Transfer of all data between the computer 27 and other parts of the bar gaging system is carried out by gage-computer data transfer logic circuit 121. Logic circuit 121 receives a command signal over wire 122 which is indicative of computer 27 being of such state as to permit data transfer. Command signal 122 is logically combined with the "data ready" pulse on wire 99, which is generated by master clock 98 as described above. Their combined presence causes logic circuit 121 to generate a "request to send" signal on wire 123 and synchronize the timing of the gaging system with computer 27.

Bidirectional Sweep Generator

Reference will now to made to bidirectional sweep generator 97 shown in FIG. 7 block diagram and FIG. 8 timing diagram. In order to make bar size measurements to a system accuracy of quarter commercial tolerance in a three inch field-of-view, the bidirectional sweep of the Y-axis in image dissector tube 90 must be extremely linear and repeatable. Conventional analog sweep circuits are generally difficult to design and maintain to the level of linearity required herein. But if a sacrifice in system accuracy is acceptable for some gaging systems, then analog sweep circuits may be considered. However, to meet the high accuracy requirements of the present gaging system, the bidirectional sweep of the Y-axis is generated by digital means with a crystal oscillator for a time base, digital counters, and a thirteen-bit digital-to-analog converter that develops the actual bidirectional sweep waveform 8E. Digital provisions are made to modify sweep waveform 8E as described below.

The time base provided is a highly stable 12 MHz. crystal clock oscillator 124 having a square wave output. Buffer 125 prevents nonuniform loading of time base 124 during sweep operations and feeds a train of clock pulses 8A of differential line driver 126. Output from driver 126 is fed as clock pulse 8A to master clock 98 in each camera electronics 35, 39. Buffer 125 output also feeds clock pulses 8A to digital divider 127 which has counting and logic devices that generate waveforms 8B and 8C. Waveform 8B is an input to up-down counter 128, a 13-bit binary reversing counter. Waveform 8B is 5/12 of the basic clock oscillator frequency, or 5 MHz. Waveform 8C is a timing pulse fed to counter reversing logic circuit 129 and occurs twice in a 12 clock cycle period. Waveform 8B uses five pulse locations in a period of 12 clock cycles and waveform 8C uses two locations. This leaves five unused pulse locations in a period of 12 clock cycles.

When the counter reversing logic circuit 129 senses that up-down counter 128 has reached a full count of all 1's, it gates a count-down enable signal back to counter 128. The timing of the count-down enable occurs at the first timing pulse 8C after the full count is reached. When counter 128 senses the count-down enable signal, it begins down counting on the next clock pulse 8B. When the counter reversing logic circuit 129 senses all 0's in counter 128, it generates a count-up enable signal on the next occurrence of timing pulse 8C. Counter 128 will begin counting up on the next clock pulse 8B.

Up-down counter 128 has a 13-bit binary output which is fed over wire 130 to 13-bit binary digital-to-analog converter 131. Digital-to-analog (D/A) converter 131 tracks counter 128 and produces an extremely linear analog bidirectional sweep signal 8E. This signal is buffered in sweep circuit buffer 132, to prevent overloading of D/A converter 131, and then fed as sweep signal 8E to Y-coil driver 102 in camera electronics 35, 39.

When up-down counter 128 reaches the last down bit, it generates reset pulse 8D which resets logic circuit 129 and D/A converter 131. Differential line driver 133 feeds the reset signal to master clock 98 in camera electronics 35, 39.

As mentioned above, there are five unused pulse locations in a period of 12 clock cycles. These may be used to provide an accurate nonlinear modification to the extremely linear sweep signal 8E by incorporating digital multiplier 134 in series between digital divider 127 and up-down counter 128 as shown by dotted lines in FIG. 7. Digital multiplier 134 will receive waveform 8B instead of up-down counter 128 and by means of a suitable multiplier generate modified waveform 8B'. Up-down counter 128 will receive modified waveform 8B' and, together with the timing pulse 8C influence on the command signal, will alter the total up-count or total down-count depending on the specific value of the multiplier. This modification will still produce a sawtooth sweep with slightly curved sides as indicated by modified sweep signal 8E'.

The multiplier for digital multiplier 134 is fed over wire 135 and may originate at computer 27. Alternatively, the digital multiplier may be set by manual means not shown. Regardless of its source the multiplier may be used to make sweep corrections for overcoming optical and/or electronic errors for which no other correction provisions have been made herein.

Camera Pulse Processor

The camera pulse processor 108 is shown in FIG. 9, 10 block diagrams and FIG. 11 timing diagram. Camera pulse processor 108 converts the raw camera pulse on lead 34 into a precise bar output pulse on lead 11P that has a width with well-defined edges that accurately represents the dimensional relationship between bar edges 82 and 83. Because of the differentiator, autocorrelator and other design features described below, camera pulse processor 108 is very well suited to process the raw camera pulses at the camera scanning rate of up to about 300 Hz., yet eliminate the effects of camera signal and differentiator noises.

Turning now to FIG. 9, camera pulse processor 108 is shown in block diagram form where alpha designations refer to FIG. 11 waveforms. The raw camera signal from lead 34 is buffered and amplified by buffer 136 to produce signal 11A. The 11A signal is differentiated by first differentiator 137 which has an output 11B. The first differential signal 11B is fed to low and high threshold detectors 138, 139 which have respective outputs 11C and 11D. Threshold detectors 138, 139 produce output signals when their plus (+) input has a lower voltage than their minus (−) input.

The first differentiated signal 11B is differentiated again in second differentiator 140 to produce output 11E. The second differentiated signal 11E is fed to start and stop zero cross-over detectors 141, 142. These detectors are set up to trigger on positive and negative zero crossing transitions greater than 1 mv., thereby producing bar pulse start zero and stop zero outputs 11F and 11G, respectively. The bar pulse start zero and stop zero outputs 11F and 11G, together with low and high threshold signals 11C and 11D, are fed to fixed-delay autocorrelator 143. Bar pulse start zero and stop zero signals 11F and 11G are processed internally in respective autocorrelator circuits as will be described below. Low and high threshold signals 11C and 11D define narrow windows during which the bar pulse start and stop signals 11M and 11"0" are triggered, thereby establishing precise timing for the leading and trailing edges of bar output pulse 11P.

As mentioned above, electronic camera 31 signal on lead 34 may also contain electrical noise. This may be high frequency, low amplitude noise which is frequently coupled magnetically into the electronic camera signal from high-current, SCR-fired, mill drive motor controllers located near electronic camera 31. Without fixed-delay autocorrelator 143, this noise will cause false triggering of bar output pulse 11P. For example, when a transition of camera signal 11A produces a first differentiated voltage 11B lower than a −3 volt threshold of detector 138, a low threshold signal 11C would be enabled which will allow start zero crossing detector 141 to generate a bar output pulse start trigger signal. Since the gain of differentiators 137 and 140 increases with input frequency, a low-amplitude, high-frequency noise spike may produce a first differentiator 137 output signal 11B lower than the −3 volt threshold of detector 138. This is precisely what will happen in rolling mill environments without enhancement of bar pulse generating circuitry.

For this reason, the fixed-delay autocorrelator 143 included in raw camera pulse processor 108 actually includes separate autocorrelator bar pulse start and stop circuits 144 and 145, respectively, as shown in FIG. 10. Bar pulse start and stop circuits 144 and 145 are provided to discriminate between second differentiated signals 11E generated by high frequency noise from those generated by valid bar pulse signals. During the falling edge of camera signal 11A, the second differentiated signal 11E rises to a positive voltage for about 10 microseconds before swinging to a negative voltage. For illustrative reasons, this detail is not shown to scale in FIG. 11 signal 11E waveform. Zero crossing detection of the second differentiated signal 11E by detectors 141 and 142 is the trigger point for the start and stop bar pulses of signals 11M and 11"0", thereby establishing the leading and trailing edges of bar output pulse 11P.

Autocorrelator bar start and stop circuits 144 and 145 take advantage of the respective 10 microsecond rise and fall period of second differentiated signal 11E. This is done by generating autocorrelator enable start and stop signals 11L and 11N as described below. Autocorrelator start enable signal 11L is generated when second differentiated signal 11E is continuously positive for at least one-half of this 10 microsecond period before swinging negative. Similarly, autocorrelator stop enable signal 11N is generated when second differentiated signal 11E is continuously negative for at least one-half of the 10 microsecond period before swinging positive.

Autocorrelator start and stop enable signals 11L and 11N are logically "anded" in circuits 144 and 145 with respective low threshold signals 11C and 11D and bar pulse start and stop zero crossing signals 11F and 11G to generate bar pulse start and stop signals 11M and 11"0". These signals cause the precise generation of bar output pulse 11P. It will now be apparent that high frequency noise which causes respective positive and negative excursions of the second differentiated signal 11E of less than 5 microseconds duration will not generate autocorrelator enable start and stop signals 11L and 11N, thus preventing triggering of bar output pulse 11P.

Still referring to FIG. 10, operation of autocorrelator bar pulse start circuit 144 will now be described. Operation of autocorrelator bar pulse stop circuit 145 is identical to circuit 144 with the exception that it responds to a second differentiated signal 11E which is continuously negative for 10 microseconds before swinging positive. Both circuits 144 and 145 employ conventional logic devices.

Low threshold signal 11C is inverted in amplifier 146 and fed to one of three inputs of NAND gate 147, the latter providing the bar pulse start signal 11M under proper logic conditions.

Bar pulse start zero crossing signal 11F is conditioned in Schmitt trigger 148 and inverted in amplifier 149, thereby producing trigger signal 11H which is fed to NAND gate 147 and one-shot delay device 150. A negative going transition of signal 11H triggers one-shot delay device 150 which produces a 5 microsecond logic "1" pulse 11I at Q output, and a 5 microsecond logic "0" pulse IIJ at $\overline{Q}$ output. Pulse 11I if fed to one of two inputs to AND gate 151. Schmitt trigger 148 output is also fed to the other input of AND gate 151 as well as to the reset input of flip-flop device 152. Pulse IIJ is fed to the clock input of flip-flop device 153. The high threshold signal 11D is wired to the data input of flip-flop 152 to enable the autocorrelator start circuit 144 during the falling edge of camera signal 11A and disable this circuit during the rising edge of signal 11A.

If signal 11H is going negative, the input to inverter 149 is going positive. This positive going action removes the reset condition on flip-flop 152 and puts a logic "1" on one input of AND gate 151. Gate 151 will now pass pulse 11I to the clock input of flip-flop 152, thus forcing a logic "1" pulse 11K at Q output. After a 5 microsecond delay, one-shot delay 150 will time out, thereby causing output $\overline{Q}$ to change state and go to a logic "1" pulse 11J. This action also clocks the input of flip-flop device 153 which has its data input fed by signal 11K from the Q output flip-flop device 152.

If signal 11K is a logic "1", flip-flop 153 output Q will be set, thereby producing start enable signal 11L. Signal 11L, which was generated from signal 11H, is logically combined with signals 11H and $\overline{11C}$, the inverted low threshold signal, in NAND gate 147 to produce the bar pulse start signal 11M. Thus, it will now be readily recognizable that a bar pulse signal is delayed, then combined with itself to perform a fixed-delay autocorrelation function.

If during the 5 microsecond period controlled by one-shot delay device 150, the output of Schmitt trigger 148 goes low, indicating that the second differentiated signal 11E is too narrow to be a valid bar signal, the reset of flip-flop 152 goes low and forces signal 11K to a logic "0". When one-shot delay device 150 times out after 5 microseconds, signal 11J will clock flip-flop 153 with its data input in a low state. This will force the Q output of flip-flop 153 to a logic "0" and prevents any further processing of the bar signal.

One-shot delay device 150 is retriggerable so that it may accommodate consecutive triggering pulses 11H. If multipler trigger pulses having a short duration of less than 5 microseconds trigger one-shot delay device 150, Q output signal I will stay high for all pulses and finally time-out 5 microseconds after the last triggering pulse. AND gate 151 allows flip-flop 152 to re-clock itself on each pulse. Since the output of one-shot delay device 150 stays high continuously during these multiple triggering pulses, the combining of signal 11I with the Schmitt triggering pulse in AND gate 151 guarantees that the clock line on flip-flop 152 will undergo a logic transition from "0" to "1" for each triggering pulse.

As noted above, the bar pulse stop circuit 145 was identical with circuit 144, the exception being that stop circuit 154 is triggered by a continuous negative going second differentiated signal 11E before swing positive. For this reason, it will be apparent to those skilled in the art that inverter 154, NAND gate 155, Schmitt trigger 156, inverter 157, one-shot delay 158, AND gate 159, flip-flop 160, and flip-flop 161 devices have construction and operating features the same as their counterpart in circuit 144. Therefore, it is felt an explanation of these devices is unnecessary to show how NAND gate 155 produces the bar pulse stop signal 11"0".

Having eliminated both the electrical noise in the raw camera bar pulse signal and the noise produced by differentiators 137 and 140, the bar pulse start and stop signals 11M and 11"0" produced in respective circuits 144 and 145 now precisely define the timing of bar pulse leading and trailing edges in relation to bar edges 82 and 83. Therefore, signals 11M and 11"0" are fed respectively to the set and reset inputs of flip-flop device 162. An inverted window pulse $\overline{8F}$ shown in FIG. 8 and fed from window generator 100 is fed to the clock input of flip-flop device 162. The data input for flip-flop 162 is tied to 0 volts. This will enable device 162 to produce the bar output pulse only during the presence of a window pulse 8F. The width and timing of the window pulse is different for bar gaging operations than in calibration checking operations as explained above.

During bar gaging operations the Q output of device 162 provides a precise bar output pulse 11P whose leading and trailing edges are free of noise and accurately define the lateral dimension of bar 10. During calibration checking operations where computer 27 selects RTMASK or LFTMSK programs, bar pulse 11P will accurately define right and left mask 94 and 95 dimensions.

P.M. AGC Circuit

The AGC circuit 109 for the photomultiplier (P.M.) section of image dissector tube 90 is shown in FIG. 12. P.M. AGC circuit 109, which is an essential portion of self-balancing measuring loop 107, includes comparator 163, switched integrator 164 and driver amplifier 165. Amplifier 165 drives P.M. section high voltage source 111 with a switched variable control voltage by way of wire 110. The switched variable control voltage acts as an automatic gain control for tube 90. This is done by varying P.M. section high voltage source 111 to maintain anode current in tube 90 at a constant reference value.

Buffered camera signal 11A is applied to one input of comparator 163 through summing resistor 166 to summing junction 167. Summing junction 167 is limited to positive-going inputs by diode 168. A comparator reference voltage from source 169 is adjusted at potentiometer slider 170 for the purpose of offsetting the bar pulse and establishing a nominal value of the switched control signal that will ultimately set high voltage source 111 at a nominal gain-producing value.

The buffered and offset camera signal at summing junction 167 is to electronic switch 171 in switched integrator 164. The window pulse 8F and the inverted bar pulse $\overline{11P}$ are logically combined in AND gate 172 to produce AGC blanking pulse 8G shown in FIG. 8. When a window pulse is present and a bar pulse is absent, the AGC blanking pulse 8G causes electronic switch 171 to conduct current to integrator amplifier 173 and to charge integrating capacitor 174. When both window pulse 8F and bar pulse 11P are present, electronic switch 171 opens and allows integrator output at junction 175 to maintain the nominal value input to driver amplifier 165.

Driver amplifier 165 consists of summing resistor 176 connected at one end to integrator output junction 175 and the other end to the input of operational amplifier 177. Feedback resistor 178 controls the gain of driver amplifier 165. Zener diode 179 limits the gain of driver amplifier 165 so as not to produce too high a switched control voltage on wire 110 that would overdrive high voltage power supply 111. In summary, when an AGC blanking pulse 8G is absent, the buffered camera signal 11A is conducted through AGC circuit 109 and varies the P.M. section high voltage supply 111. During the presence of an AGC blanking pulse, 11A is inhibited and the output of P.M. AGC circuit 109 maintained at a constant reference value determined by the charge on capacitor 174 in integrator 164.

Bar Size and Position Accumulator

Figure 13:
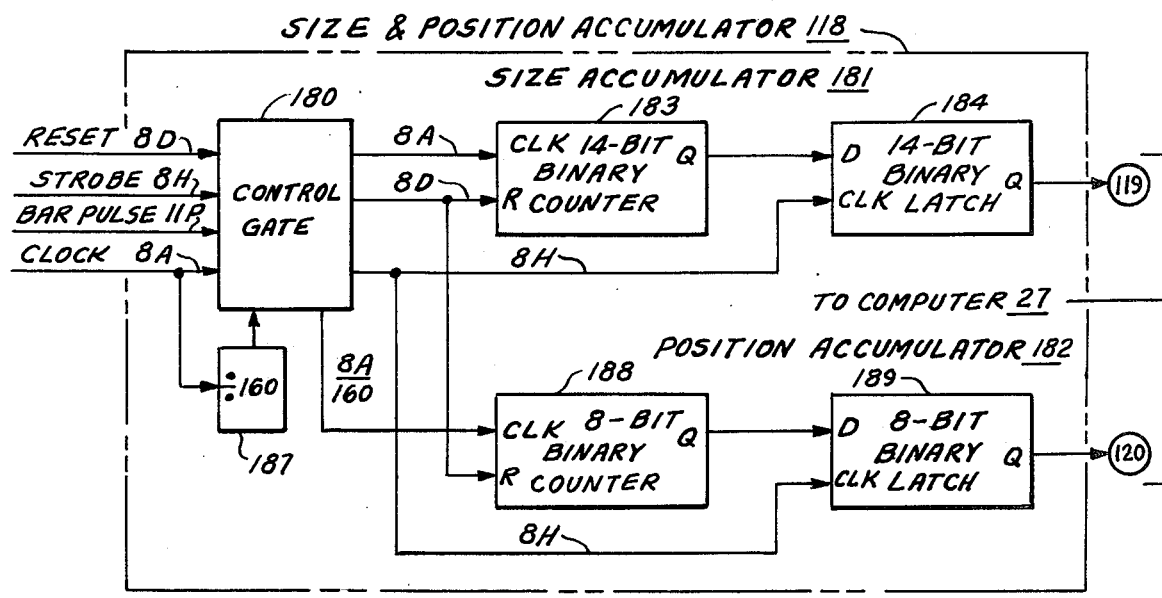
FIG. 13 is a block diagram of a bar size and position accumulator used in the camera electronics shown in FIG. 4.

The size and position accumulator 118 is shown in FIG. 13 with reference being made to FIGS. 8 and 11 timing diagrams. In the present bar gaging system, uncorrected digital bar size and bar position data fed to computer 27 are developed similar to, but separately and independently from, uncorrected digital bar size data displayed on indicator 115. Accumulator 118 is provided with control gate 180 which assimilates bar pulse 11P, clock pulse 8A, clock reset pulse 8D and fast strobe pulse 8H in bar size accumulator circuit 181 and bar position accumulator circuit 182. Circuit 182 determines the bar centerline anywhere in the camera field-of-view. Both circuits 181, 182 are synchronized by clock reset pulse 8D and both are strobed by fast strobe pulse 8H every complete sweep cycle.

Control gate 180 detects the leading and trailing edges of each bar pulse 11P and divides by two the number of clock pulses 8A occurring during the two bar pulses present during the up and down halves of the sweep cycle. Control gate 180 directs these clock pulses to the clock input of 14-bit binary counter 183 in bar size circuit 181 where a count of two bar pulses divided by two is registered. At the end of a first sweep cycle this size pulse count in counter 183 is transferred into the data input of 14-bit binary latch 184, presuming a previous application of the fast strobe pulse 8H has been applied to the latch's clock input. At the beginning of the second cycle, counter 183 is cleared by clock reset pulse 8D and is ready to receive a new pulse count.

Fourteen-bit digital data, representing uncorrected bar size between bar edges 82 and 83 from the first sweep cycle, is stored in latch 184 for a second sweep cycle. During the second sweep cycle this data is transferred over cable 119 to computer 27 for correction under computer program CMPNST described below. At the end of the second sweep cycle, counter 183 data is strobed into latch 184 by pulse 8H, thus repeating the cycle. The counting of bar size pulses is always one sweep cycle ahead of the latched bar size data in bar size accumulator circuit 181.

Control gate 180 also detects the first 11P bar pulse edge at 185 during the up-half of a sweep cycle and the first 11P bar pulse edge at 186 during the down-half of the same sweep cycle is shown in waveform 8G in FIG. 8. Control gate 180 determines the sweep time between pulse 11P leading edges 185 and 186 and divides this time by two, thereby establishing what will be referred to as the bar centerline position sweep time. In addition, control gate 180 also includes a bar position time base developed by dividing the train of 12 MHz clock pulses 8A by a factor of 160 in divider 187, thereby generating 8A/160 clock pulses. 8A/160 clock pulses are directed to the clock input of 8-bit binary counter 188 in bar position accumulator 182 for the duration of the bar centerline position sweep time. The count registered in counter 188 represents centerline position of bar 10 located anywhere in the camera field-of-view. This bar centerline position was determined totally independently of the bar size measurement made in size accumulator 181 or elsewhere.

At the end of a first sweep cycle the bar center-line position count in counter 188 is transferred into the data input of 8-bit binary latch 189, presuming a previous application of fast strobe pulse 8H has been applied to the latch's clock input. At the beginning of the second cycle, counter 188 is cleared by clock pulse 8D and is ready to receive a new bar centerline position pulse count.

Eight-bit data representing bar centerline position in the camera field-of-view is stored in latch 189 for a second sweep cycle. During the second sweep cycle this data is transferred over cable 120 to computer 27 for use in making optical error corrections to the bar size data in accumulator 181 under computer program CMPNST described below. At the end of the second sweep cycle latch, counter 188 data is strobed into latch 189 by pulse 8H, thus repeating the cycle. Counting of bar centerline position pulses is always one sweep cycle ahead of the latched data in bar position accumulator 182.

Bar position accumulator 182 divides one-half of a sweep cycle into 256 increments at 0.016 inch per increment. The optical centerline of camera head 31, 33 is at the 128th increment. The incremental total represents 4.096 inches of Y-axis sweep applied to the Y-axis deflection coil with a usable field-of-view of approximately three inches. The unusable field-of-view is 1.096 inches, the distance the Y-axis deflection coil sweeps off the top and bottom edges of photocathode electrode 91.

Computer

Figure 14:
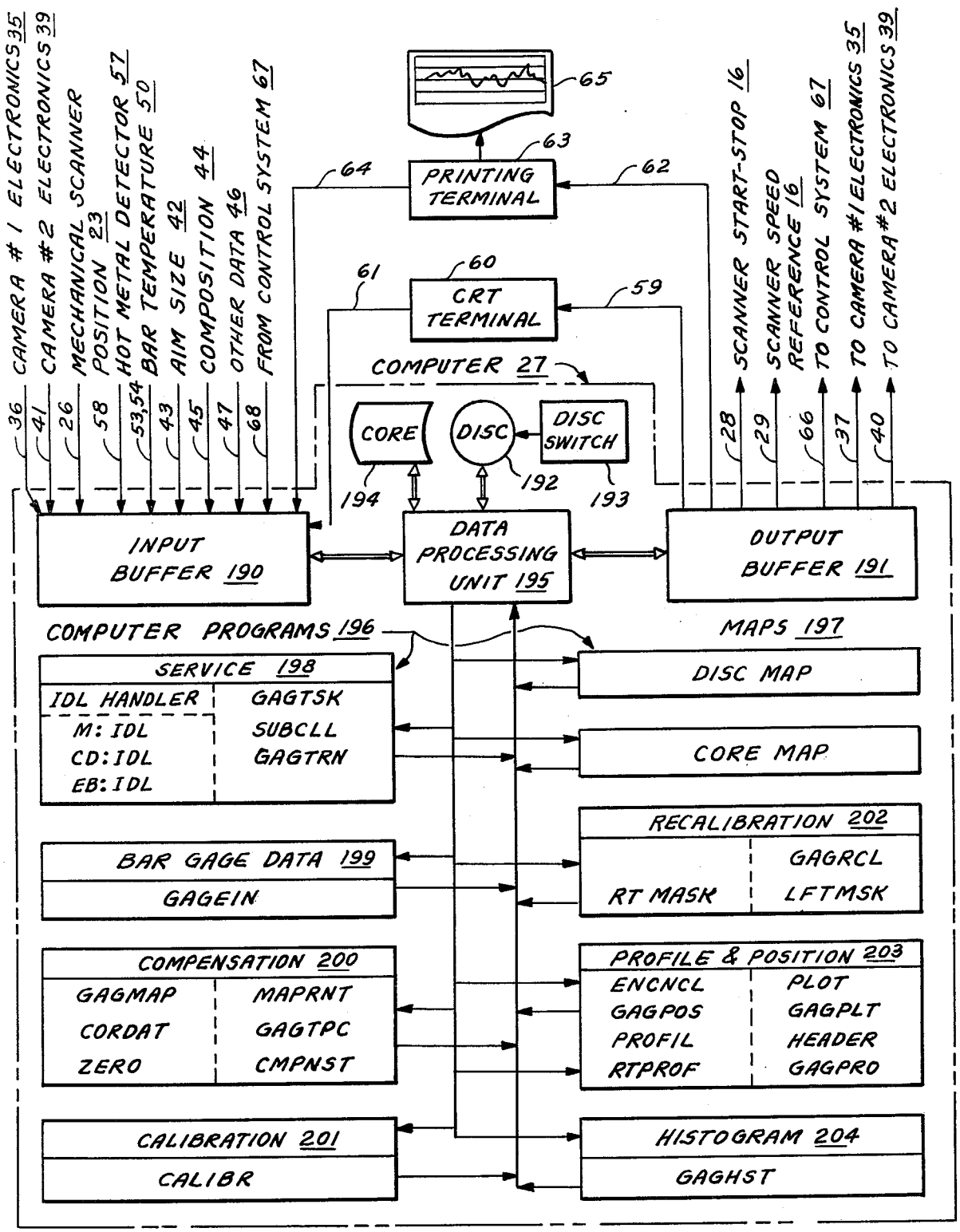
FIG. 14 is a block diagram of the computer shown in FIG. 1 and includes references to computer flow charts and printouts shown in FIGS. 15 to 42D.

A block diagram of the electro-optical bar gaging system computer 27 is illustrated in FIG. 14. Computer 27 is a digital system programmed to perform the various functions described below. A commercially available mini-computer may be used, or if desired, computer 27 may be shared in overall rolling mill control computer installation. Computer 27 is exemplified herein as a Westinghouse Electric Co. model W-2500 with an operating system for accommodating various levels of tasks as noted below:

Computer 27 is provided with conventional main components including input buffer 190, output buffer 191, disc storage 192, disc switches 193, core storage 194, all communicating by various channels with data processing unit 195. Computer 27 operations are controlled sequentially according to off-line and on-line computer programs 196. These comprise: computer maps 197, service programs 198, bar gage data program 199, compensation programs 200, calibration program 201, recalibration programs 202, profile and position programs 203, and histogram programs 204, all covered in FIGS. 15–43 described below.

All communications with the bar gaging system computer 27 from external sources are by way of input buffer 190 which includes means for converting input analog and digital signals to digital form. These include signals fed by wires or cables into the computer as follows: first camera electronics 35 on cable 36; second camera electronics 39 on cable 41; mechanical scanner position 23 on wire 26, hot metal detector 57 on wire 58; bar temperature 50 on cables 53, 54; bar aim size 42 on wire 43; bar composition 44 on wire 45; other data 46 on cable 47; control system 67 on cable 68; CRT terminal 60 on cable 61; and printing terminal 63 on cable 64.

All communications with bar gaging system computer 27 to external sources are by way of output buffer 191 which also includes means for converting output signals to digital and analog form. These include signals fed by wires or cables from the computer as follows: scanner start-stop 16 on cable 28; scanner speed reference 16 on cable 29, control system 67 on cable 66; first camera electronics 35 on cable 37; and second camera electronics 39 on cable 40.

Individual wires in signal cables have been used through the drawings and these have been cabled according to their source and function as described above.

CRT terminal 60 includes a keyboard for operator interaction with computer 27.

Printing terminal 63 includes a keyboard for operator interaction with computer 27. Terminal 63 computer printout 65 includes a plot of bar profile deviation shown in FIG. 3, as well as tabular data in various figures listed below.

Generally, it is permissible for both terminals 60 and 63 to plot the same data. All interactions from either keyboard are by way of program mnemonics listed, for example, in FIG. 21B.

Disc switches 193 include switches designated "switch 10" and "switch 12" in the programs below. These switches must be turned to "WRITE ENABLE" to update programs or data on the disc.

Computer Programs

The following table lists flow charts of individual and groups of programs associated with computer programs 196 used herein.

| FIG.NO. | FLOW CHART IDENTIFICATION | USED OFF-LINE | ON-LINE |
|---|---|---|---|
|  | MAPS (197) |  |  |
| 15 | DISC MAP | X |  |
| 16A,B | CORE MAP | X | X |
|  | SERVICE PROGRAMS (198) |  |  |
|  | IDL HANDLER |  |  |
| 17A-E | M:IDL | X | X |
| 18 | CD:IDL | X | X |
| 19 | EB:IDL | X | X |
| 20A,B | GAGTSK | X |  |
| 21A,B | SUBCLL | X |  |
| 22 | GAGTRN | X |  |
|  | BAR GAGE DATA PROGRAM (199) |  |  |
| 23A-D | GAGEIN | X | X |
|  | COMPENSATION PROGRAMS (200) |  |  |
| 24A-C | GAGMAP | X |  |
| 25 | CORDAT | X |  |
| 26 | ZERO | X |  |
| 27A-C | MAPRNT | X |  |
| 28 | GAGTPC | X | X |
| 29 | CMPNST | X | X |
|  | CALIBRATION PROGRAM (201) |  |  |
| 30A-F | CALIBR | X |  |
|  | RECALIBRATION PROGRAMS (202) |  |  |
| 31A-D | RTMASK | X |  |
| 32A-C | GAGRCL |  | X |
| 33A-E | LFTMSK | X |  |
|  | PROFILE & POSITION PROGRAMS (203) |  |  |
| 34 | ENCNGL | X | X |
| 35 | GAGPOS | X | X |
| 36A-D | PROFIL | X |  |
| 37A-E | RTPROF | X |  |
| 38A-B | PLOT | X |  |
| 39A-B | GAGPLT |  | X |
| 40 | HEADER | X | X |
| 41A-C | GAGPRO |  | X |
|  | HISTOGRAM PROGRAM (204) |  |  |
| 42A-D | GAGHST | X | X |
| 43 | PROFILE & HISTOGRAM INTERFACE WITH CONTROL SYSTEM | X | X |

MAPS (197)

Figure 15:
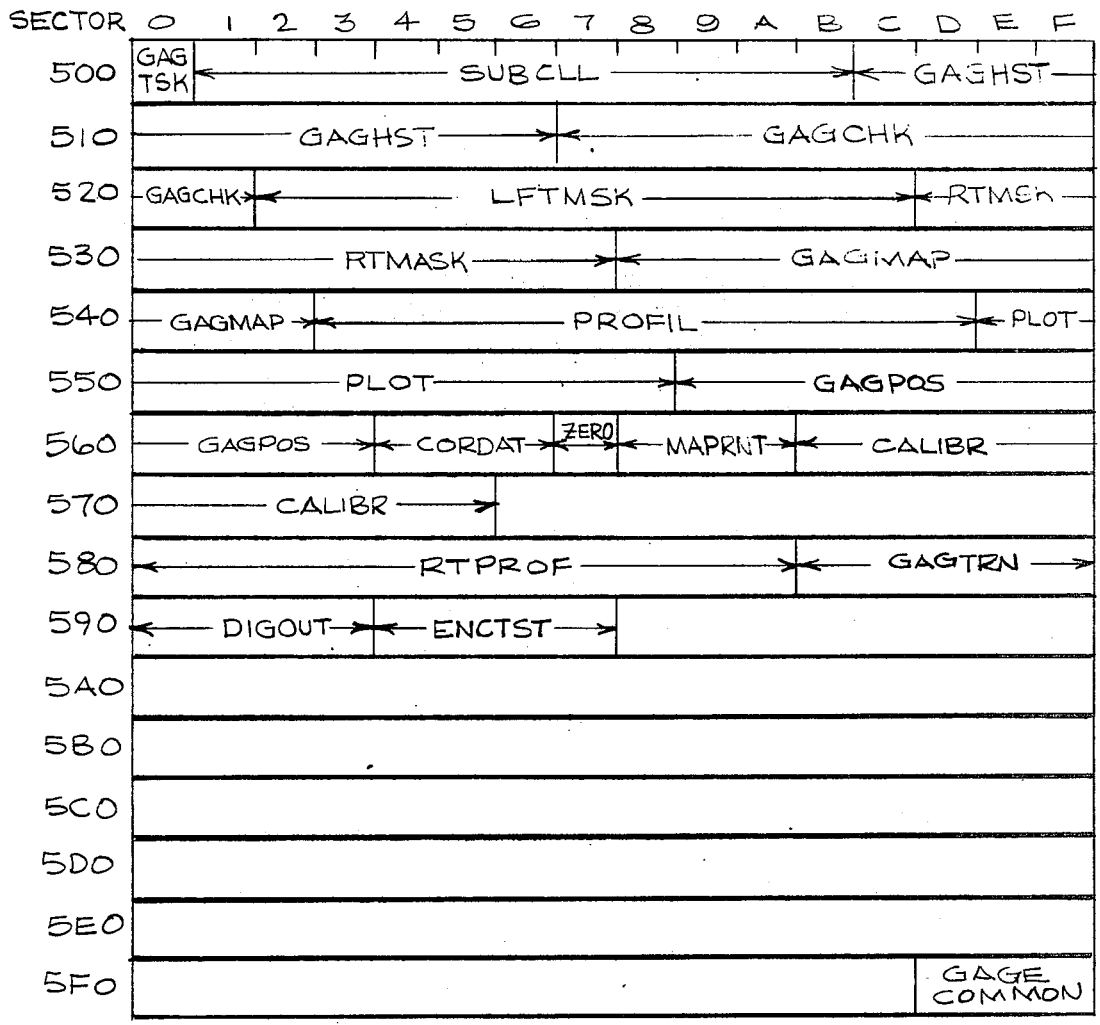
FIG. 15 is a computer DISC MAP.
Figure 17A:
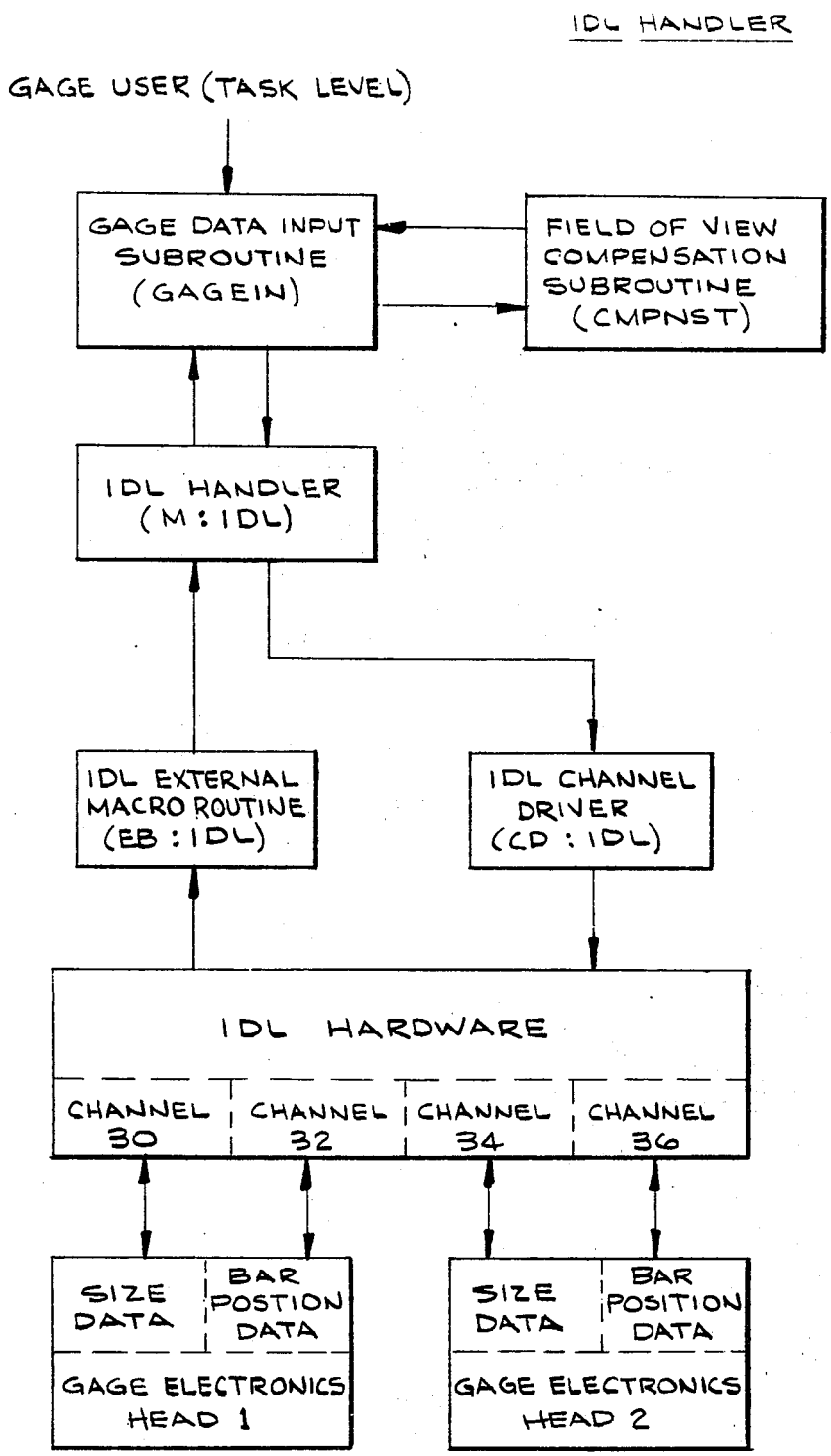
Figure 17B:
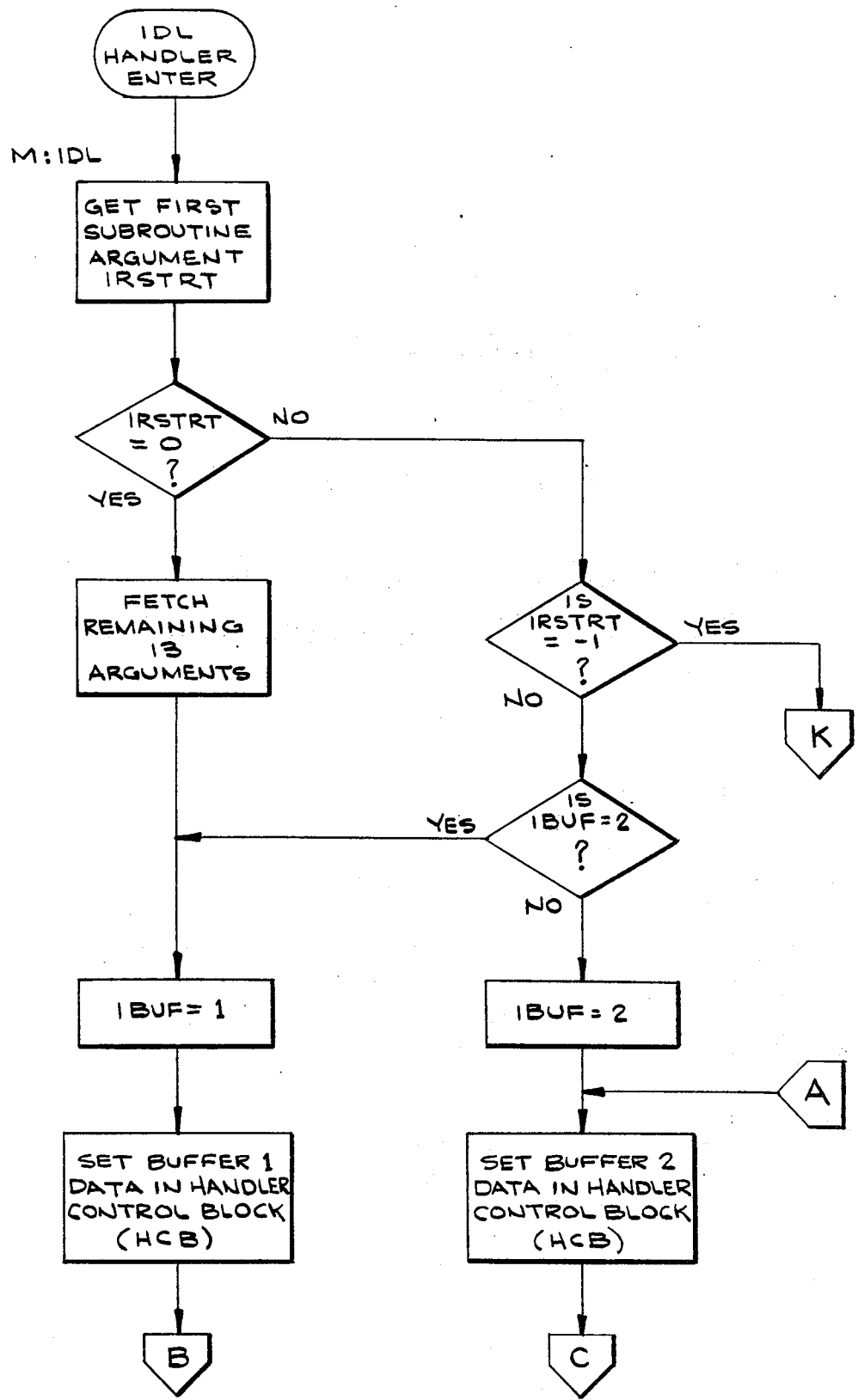
Figure 17C:
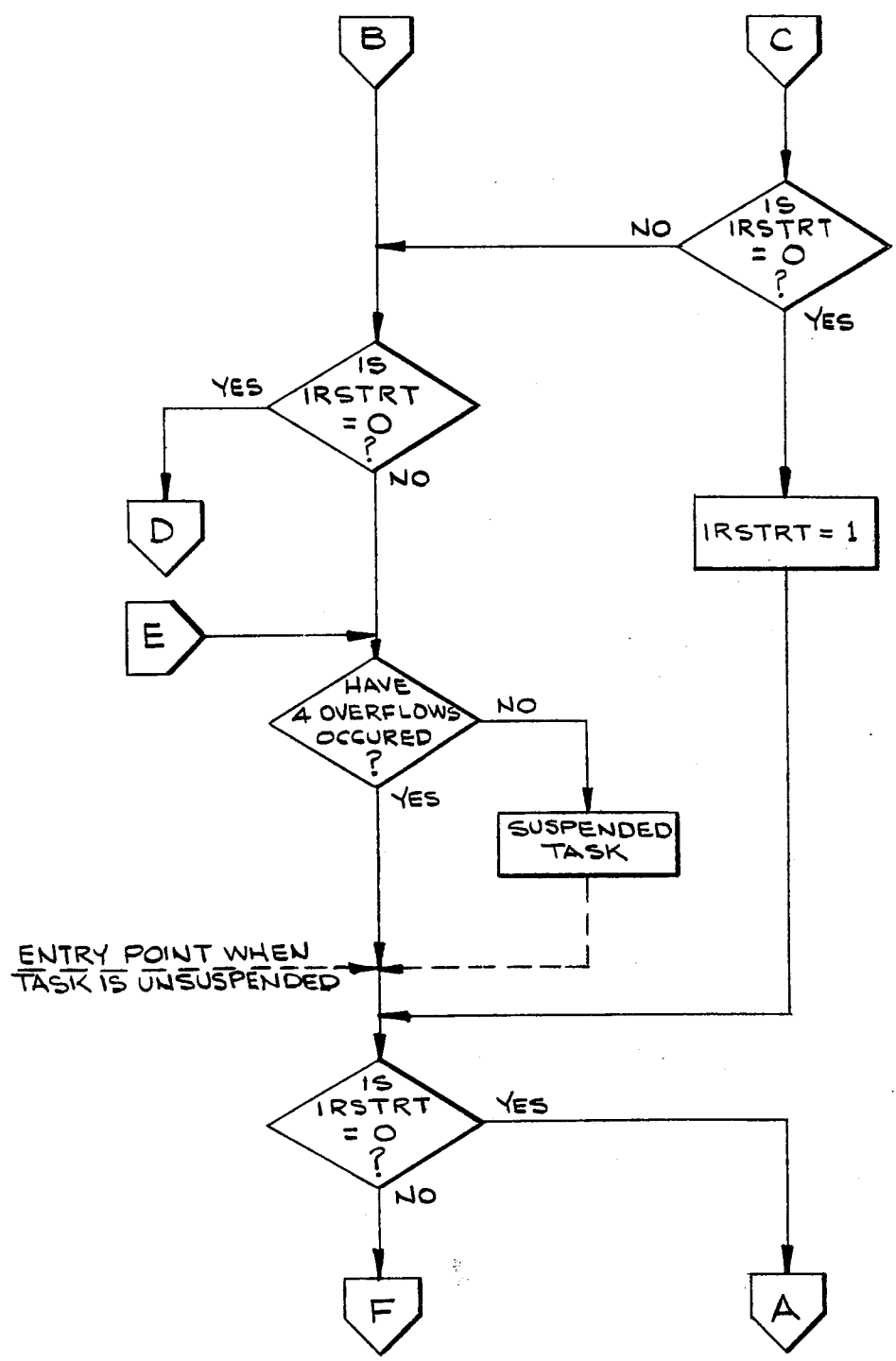
Figure 17E:
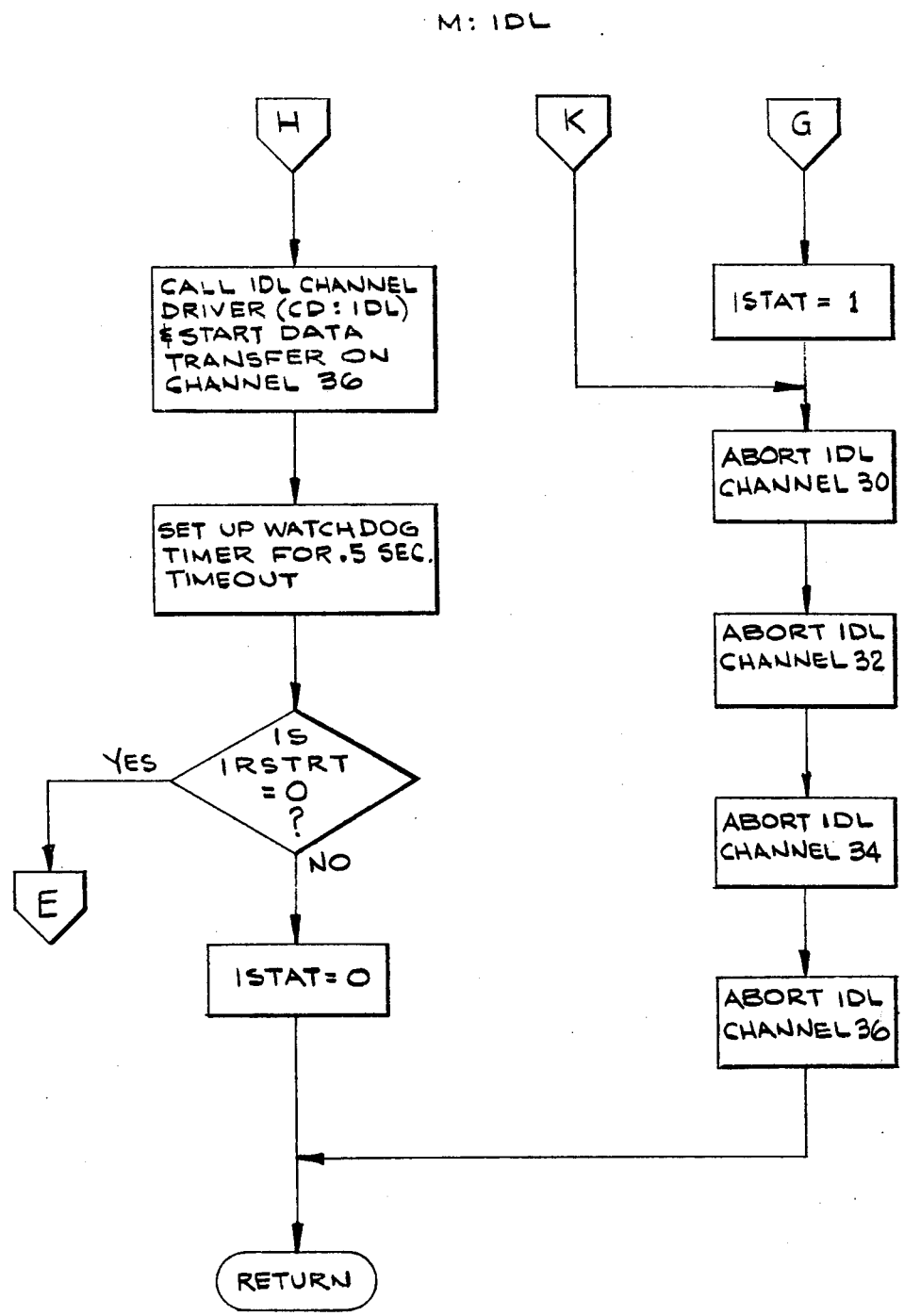

DISC MAP, see FIG. 15. Program address in disc storage 192.

CORE MAP, see FIG. 16A,B. Program address in hexadecimal core storage 194.

SERVICE PROGRAMS (198)

IDL Handler, M:IDL, see FIG. 17A-E. This routine handles all data transfers between the IDL hardware (channels 30, 32, 34, and 36) and the gage data input subroutine - GAGEIN. It communicates to the IDL hardware via the IDL channel driver CD:IDL. A double buffering scheme is used to speed up the total data transfer time by initiating an additional IDL transfer on all four channels to a second data buffer just before exiting from the handler. In this way data can be transferred into this second buffer by the IDL hardware using service request interrupts SRI's executed in the out-of-sequence range while the gage software is busy processing data from the first buffer. When this processing is completed, the handler is re-entered. If the data transfer on the second buffer is not complete, the task is suspended until the IDL external MACRO routine detects four buffer overflow interrupts. The task is unsuspended by the IDL external MACRO routine ED:IDL when four buffer overflows have been counted. If the data transfer on the second buffer is complete, or after the task is unsuspended by EB:IDL, the buffers are effectively switched and a data transfer using buffer 1 is initiated and an exit is made from the handler. The gage softward now processes the data in buffer 2 and repeats the above sequence.

A watchdog timer with a 0.5 second timeout is set before initiating each IDL transfer. If four buffer overflows are not returned within this time period, the clock routine will unsuspend the task and sets the variable ISTAT=1 to indicate an IDL transfer timeout error.

The variable IBUF is set by this routine to indicate which buffer, 1 or 2, contains data from the last IDL transfer. The variable IRSTRT must initially be set to 0 by the calling task so that this routine knows when entry has been made for the first time. When IRSTRT=0, the double buffering mechanism is initialized. This routine then sets IRSTRT=1 to indicate that the double buffering operation is in progress. If entry to the handler is made with IRSTRT=−1, an abort IDL command is sent to all four IDL channels to stop any transfer in progress. This command is usually initiated by the calling task before doing a call exit so that all IDL transfers are halted.

This routine calls the IDL channel driver CD:IDL and utilizes the IDL external MACRO routine EB:IDL. Therefore these routines must be linked with the IDL handler M:IDL.

Figure 18:
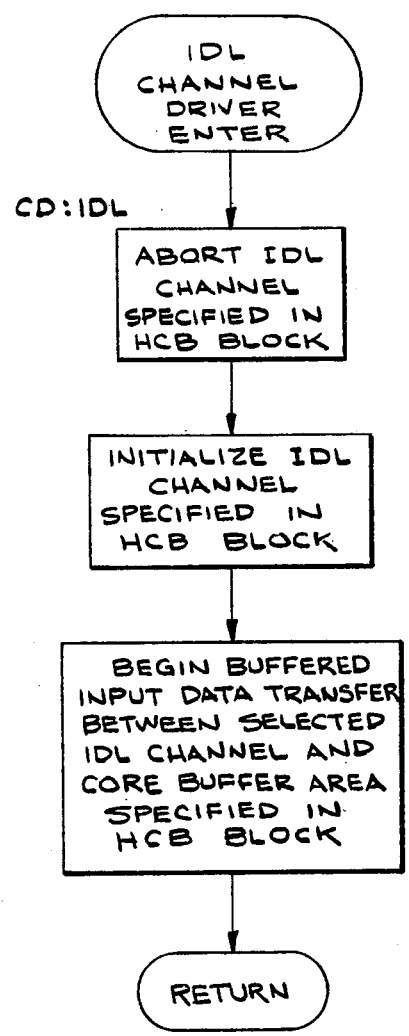

IDL Handler, CD:IDL, See FIG. 18. This routine is used to transfer data from the handler control blocks (HCB) defined in the IDL handler M:IDL to the IDL hardware (channels 30, 32, 34, 36). Control is transferred to this routine by loading the address of the HCB into the B register and jumping to CD:IDL (CD:IDL must be declared external). The HCB is a 9 word table having the following format:

| Word No. | Explanation | Example Using Channel 30 |
|---|---|---|
| 0 | Forced Buffer Input IDL Code | DAT X'B30' |
| 1 | Abort IDL Code | DAT X'F30' |
| 2 | Return Address - 1 | ADL RTR1-1 |
| 3 | Blank | DAT 0 |
| 4 | Buffer Input IDL Code | DAT X'530' |
| 5 | Core Location Containing Addr. to data | DAT X'11FB' |
| 6 | Number of Words to be Transferred | DAT 20 |
| 7 | Address of Data Buffer | SIZE 1 |
| 8 | SRI Address Vector (100 + SRI × 2) | DAT 354 |

This routine performs three functions using the HCB table. First, an abort code (HCB — word 1) is sent out on the I/O subsystem. The lower seven bits of this word define the channel number to be aborted. Second, a forced buffer input (HCB — word 0) is sent out on the I/O subsystem. This command initializes the IDL hardware on the selected channel. Third, the buffered input transfer code is sent out on the I/O subsystem to initiate the data transfer. The data is transferred into core memory from the selected IDL channel via service request interrupts (SRI). The pointers and counters used by the SRI's are set up by this routine using data supplied in the HCB's.

IDL Handler, EB:IDL, see FIG. 19. This routine is called by the POS/1 buffer overflow service request interrupt routine in the out-of-sequence instruction range in response to buffer overflow interrupts which occur when a buffered input data transfer on any of the IDL channels 30, 32, 34 or 36 is completed. Each entry to this routine causes the buffer overflow count word (ECB7) in the external MACRO control block to be incremented. When this count reaches 4, the task which was suspended by the IDL handler M:IDL is unsuspended. If this count is not 4, return is made to the POS/1 buffer overflow exit routine M:BOX and the state of the suspended task is unchanged. Thus, when the IDL handler M:IDL requests data from all four IDL channels it clears the buffer overflow count and suspends the task. It will be unsuspended when the IDL external MACRO routine counts four completion buffer overflow interrupts.

Figure 20A:
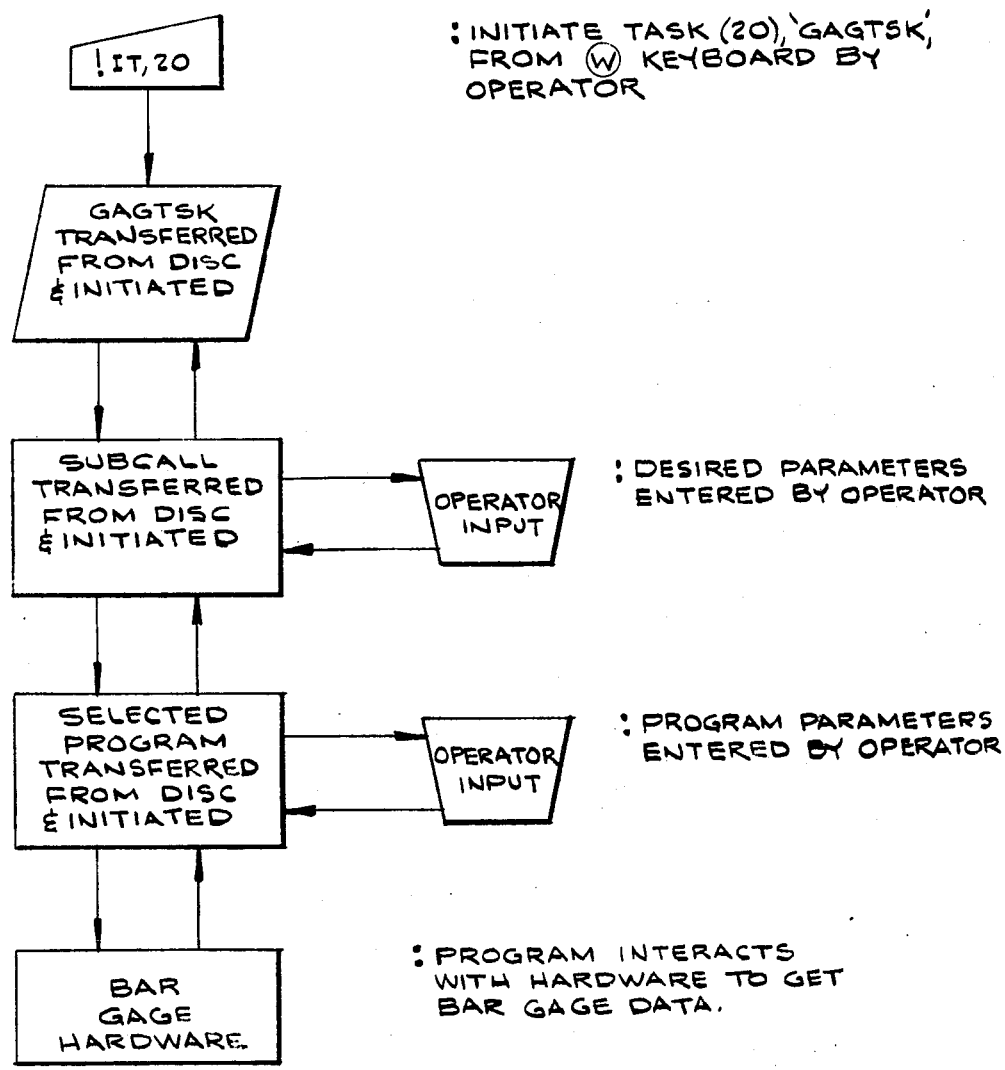

GAGTSK, see FIG. 20A–B. This disc resident task (Task 20) is an off-line task designed to read off-line gage subroutine overlays into core from disc and transfer control to them. GAGTSK calls a particular subroutine into core in response to mnemonic parameters passed to it by the operator interactive subroutine caller overlay SUBCLL. All programs and their mnemonics are described in the listing of the subroutine SUBCLL. GAGTSK also transfers a disc resident common area into core, and, if disc sector switch 12 is write enabled, writes the updated common area back to the disc when exiting from the task.

An off-line busy flag IGAGOF is set on entry to this task, and is cleared upon exit.

SUBCLL, see FIG. 21A–B. This disc resident subroutine is an overlay, run in the off-line mode, by means of which an operator may interact with the gage off-line system to run any of the available off-line bar diameter gage programs. It is transferred from disc to core and run by the off-line gage task GAGTSK (Task 20) by means of a system monitor disc-read-and-transfer-control routine. Operator entered mnemonics determine subroutine disc sectors which are returned as subroutine parameters to GAGTSK, which in turn transfers and runs the desired subroutine overlay. Subroutine functions are described in this program listing, and are available to the operator in response to his request for assistance.

Figure 22:
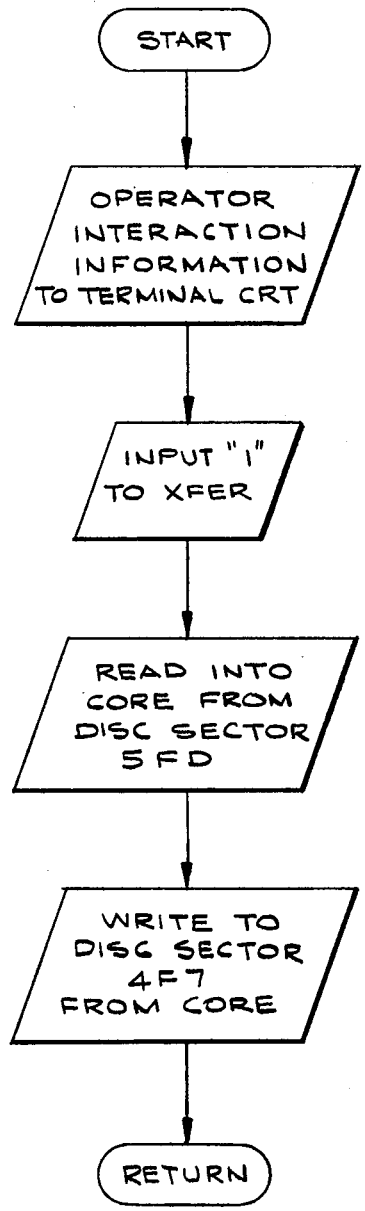
Figure 23A:
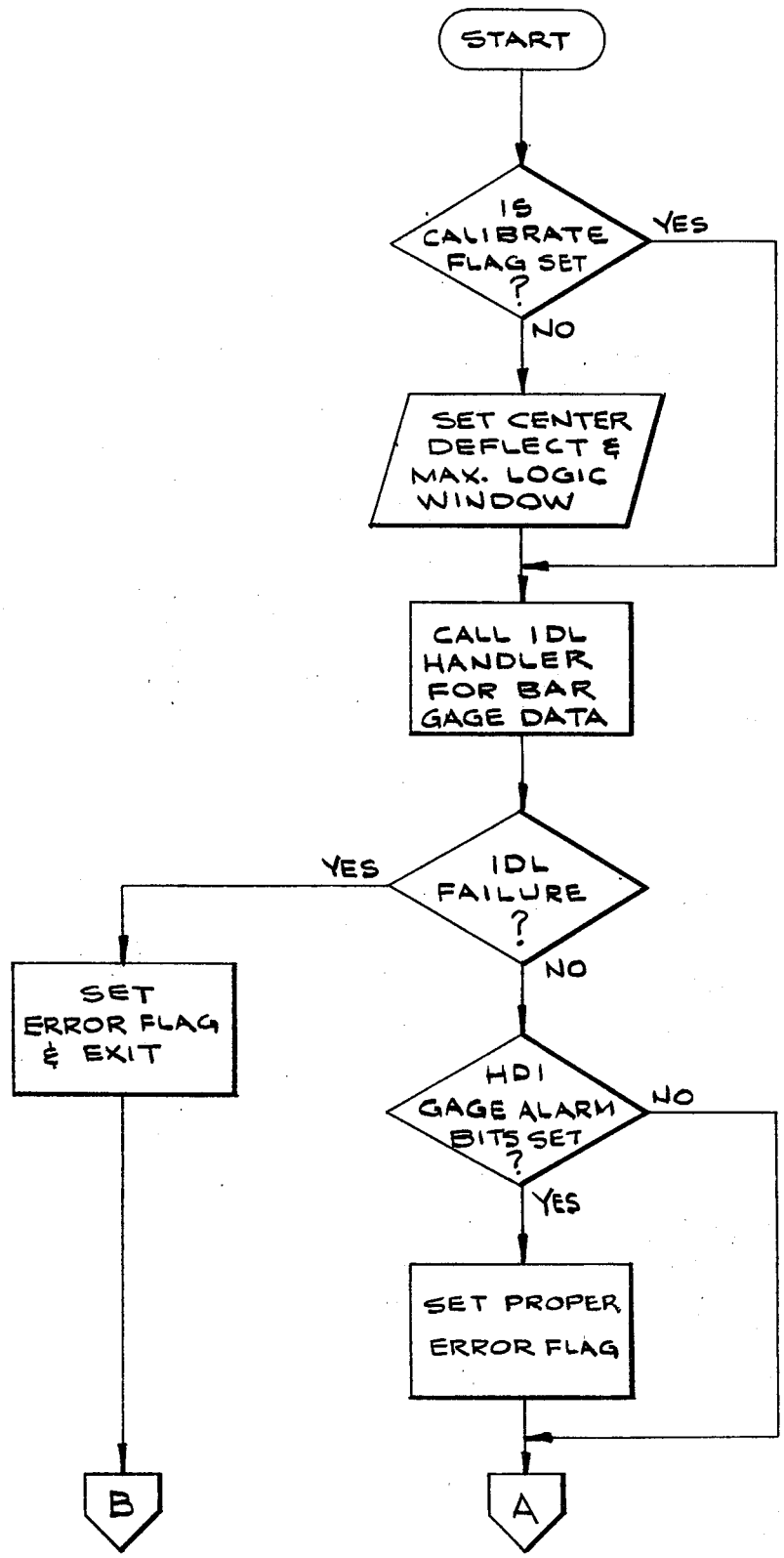
Figure 23C:
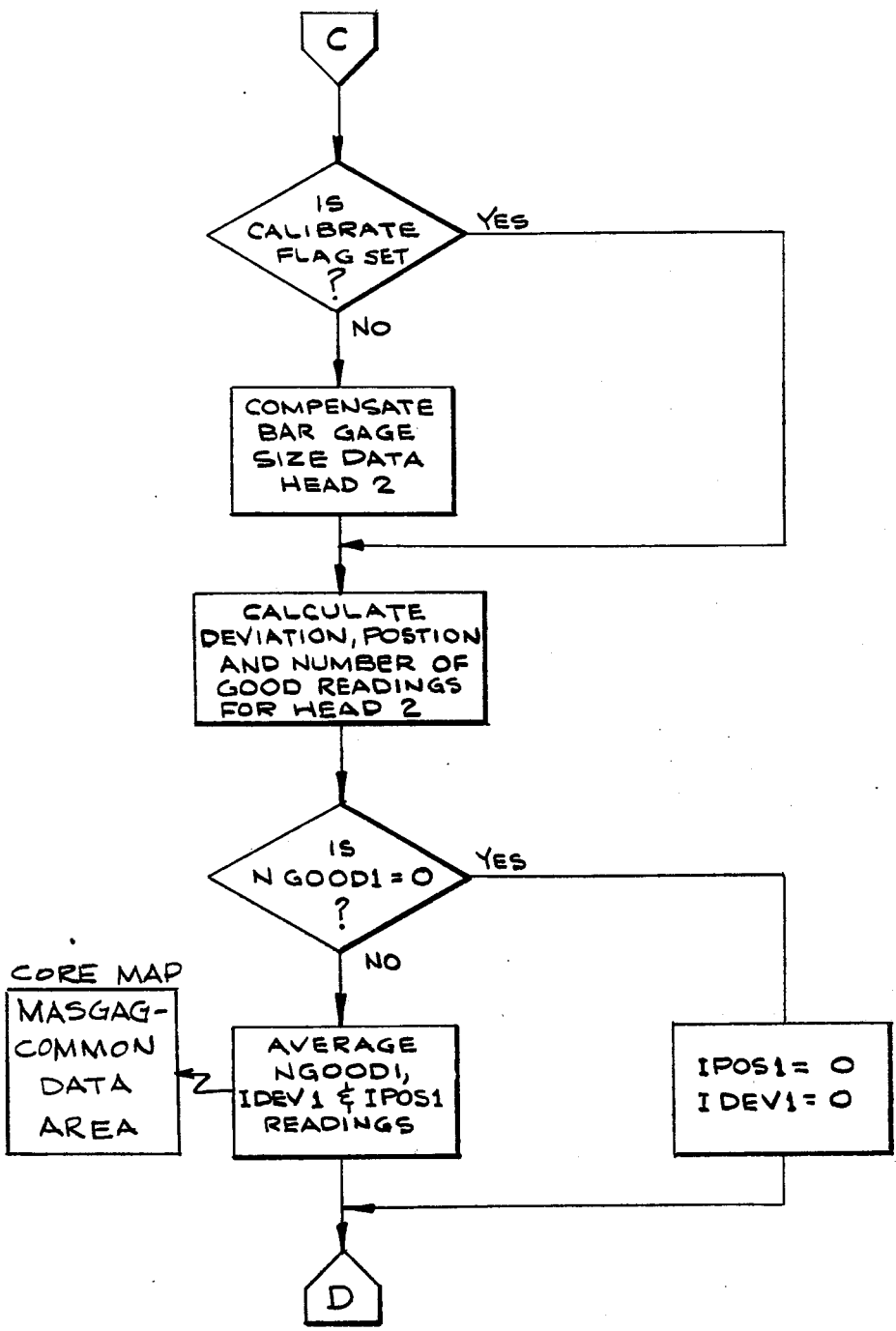
Figure 23D:
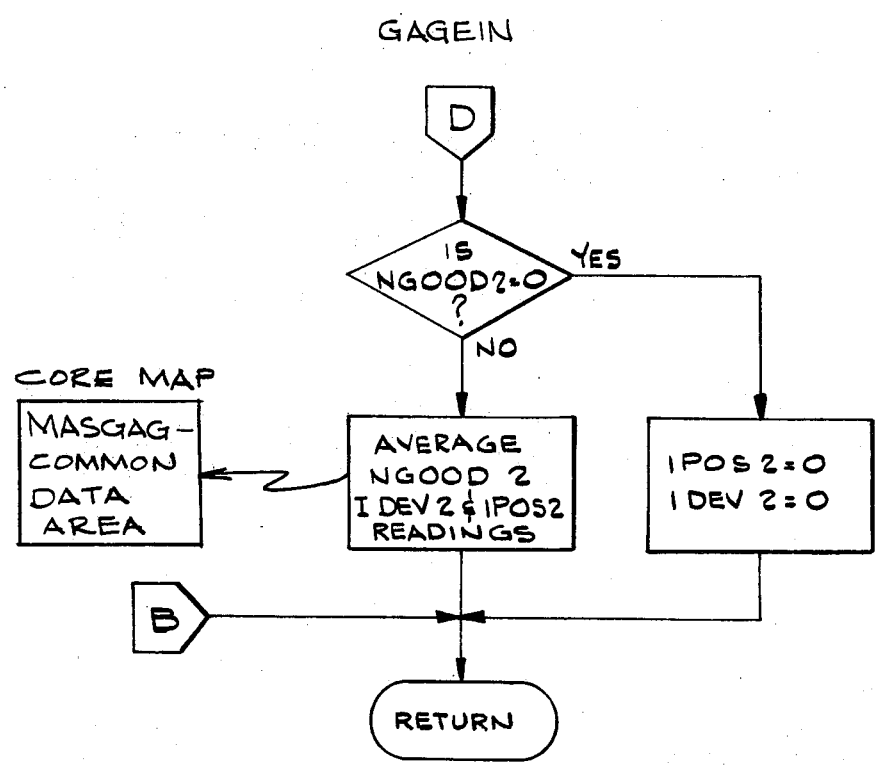

GAGTRN, see FIG. 22. This program runs in the gage off-line system. It transfers the 572 word gage data block from disc area 5FD to control system disc area 4F7. It performs a disc-core-disc transfer using the gage common area for intermediate storage. Disc switch 10 must be write enabled.

BAR GAGE DATA PROGRAM (199)

GAGEIN, see FIG. 23A–D. This auxiliary subroutine is always appended to any subroutine requiring bar gage data. It calls the IDL handler (M:IDL, CD:IDL, EB:IDL), also appended, to actually acquire the data, and the compensate subroutine (CMPNST), also appended, if compensation is required. It averages the good readings returned, both bar position and diameter, calculates deviations, and stores the results in common tables. Validity tests are made and error flags set as needed.

COMPENSATION PROGRAMS (200)

Figure 24A:
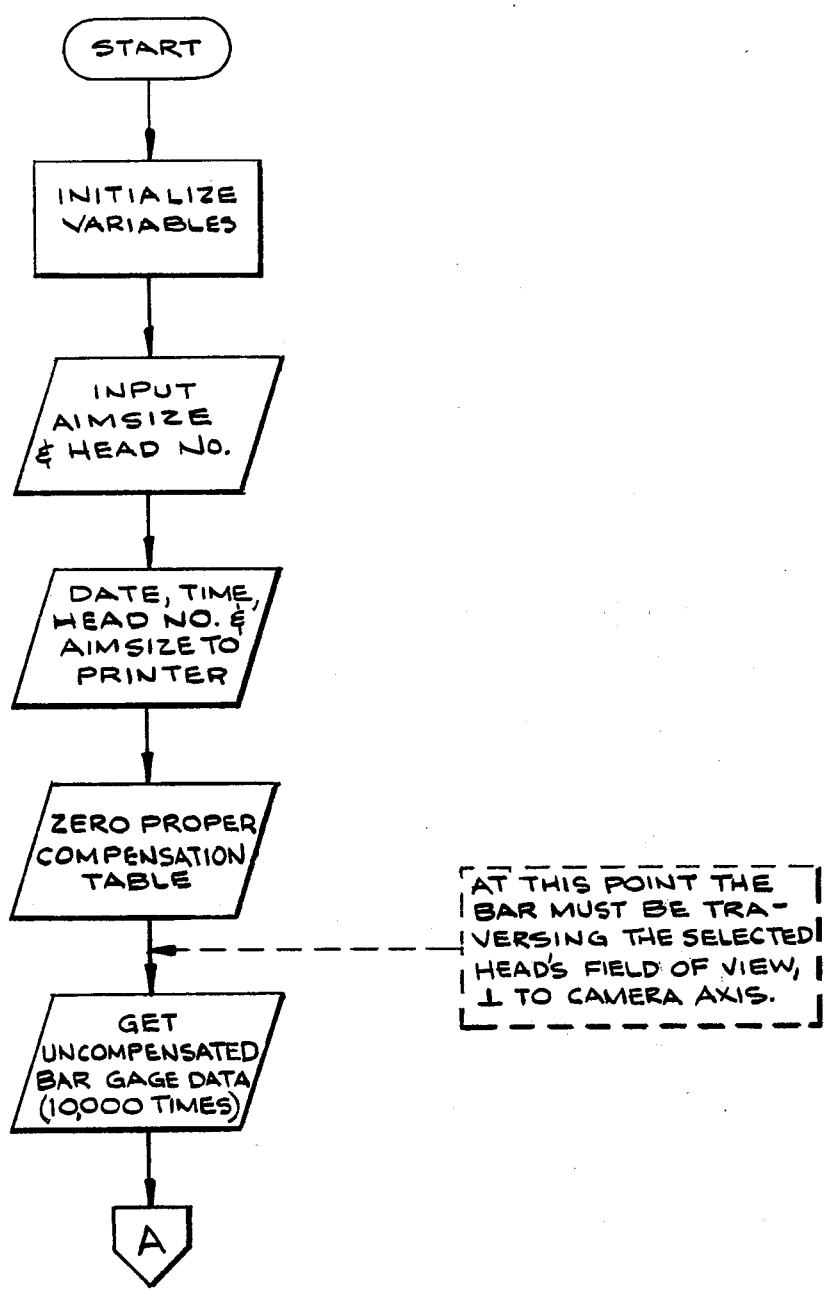

GAGMAP, see FIG. 24A–C. This disc resident subroutine is an overlay, run in the off-line mode, which generates a set of compensation tables used by on-line bar diameter gage tasks and subprograms, and those off-line gage programs requiring compensated size data. The tables reside in a common area, and are used to compensate for image-tube non-linearity across its field-of-view. The tables are formatted and output to printer 63. This program is required to be run before any bar-diameter data can be considered valid. It is invoked by the subroutine SUBCLL, and requires operator interaction.

Each compensation table consists of 256 entries corresponding to the 256 possible bar positions. Element one represents the bottom of the total 4.096 inches field and element 256 represents the top of the field. Each element contains correction data to be subtracted from the measured bar size based on the positions of the top and bottom edges of the bar. The actual correction is performed by subroutine CMPNST. Using the edge 82, 83 positions rather than the center position allows the map to be used for all sizes of bar 10.

During the map building procedure, a ½ inch machined sample bar 10 is moved ±1.5 inches back and forth in a plane perpendicular to the optical axis. While bar 10 is being moved, GAGMAP is executed in the off-line calibration system. This program processes 10,000 measurements and calculates the average deviation at each increment of bar position. These intermediate results are stored in a 256 element table called ISUM.

The final compensation map based on bar edge 82, 83 positions is generated from the ISUM table by the following steps:

1. The compensation map is cleared.
2. A computer simulation is performed in which an imaginary ½ inch bar 10 is positioned at 0.016 inches above the center of the field-of-view (slot 129). The positions of the top and bottom bar edges 82, 83 are calculated as follows:

$$\text{Top Edge 83} = \frac{[\text{field-of-view center position} + 0.016 + \text{bar size}/2)]}{0.016} \quad \text{(Eq. 1)}$$

$$\text{Bottom Edge 82} = \frac{[\text{field-of-view center position} + 0.016 - (\text{bar size}/2)]}{0.016} \quad \text{(Eq. 2)}$$

Example:

$$\text{Top Edge 83} = (2.048'' + 0.016'' + 0.5''/2) \div 0.016'' = 144 \quad \text{(Eq. 3)}$$

$$\text{Bottom Edge 82} = (2.048'' + 0.016'' - 0.5''/2) \div 0.016'' = 113 \quad \text{(Eq. 4)}$$

3. The value stored in the map at the upper edge 83 position (144) is the sum of the deviation stored in ISUM table corresponding to the position of the center of bar 10 (129) and the value stored in the map at the lower edge 82 position (113).

IMAP (upper edge
  83 position) = ISUM (center bar position) + IMAP
                 (lower edge position)       (Eq. 5)
IMAP (144) = ISUM (129) + IMAP (113)         (Eq. 6)

4. Steps 2 and 3 are repeated by incrementing the center position of the bar 10 to 0.032 inch above the center of the field-of-view, then 0.048 inch, 0.064 inch, etc. This is repeated until the upper edge 83 of bar 10 goes beyond +1.5 inches above the center of the field-of-view.

IMAP (145) = ISUM (130) + IMAP (114)
IMAP (146) = ISUM (131) + IMAP (115)
IMAP (147) = ISUM (132) + IMAP (116)
.
.
IMAP (220) = ISUM (205) + IMAP (189)
IMAP (221) = ISUM (206) + IMAP (190)

The upper half of the map is now complete.

5. The lower half of the map is filled in the same manner. Based on the same ½ inch sample bar 10 located at the center of the field-of-view (128) the positions of the upper and lower edges 83, 82 are calculated.

$$\text{Top Edge 83} = (\text{field-of-view center} + \frac{\text{bar size}}{2}) \div 0.016 \quad \text{(Eq.7)}$$

$$\text{Bottom Edge 82} = (\text{field-of-view center} - \frac{\text{bar size}}{2}) \div 0.016 \quad \text{(Eq.8)}$$

$$\text{Top Edge 83} = (2.048 + 0.5/2)/0.016 = 143 \quad \text{(Eq.9)}$$

$$\text{Bottom Edge 82} = (2.048 - 0.5/2)/0.016 = 112 \quad \text{(Eq. 10)}$$

6. The map value for lower edge 82 of the bar (112) is the sum of the deviation stored in ISUM corresponding to the position of the center of the bar (128) and the map value stored at upper edge 83 of bar 10 (143).

IMAP (lower edge 82 position) =              (Eq.11)
  ISUM (center bar position) + IMAP (upper edge 83 position)

IMAP (112) = ISUM (128) + IMAP (143)         (Eq.12)

7. Steps 5 and 6 are repeated by successively decrementing bar 10 position by 0.016 inch from the center of the field-of-view until the lower edge 82 of bar 10 goes beyond − 1.5 inches from the center of the field-of-view.

IMAP (111) = ISUM (127) + IMAP (142)
IMAP (110) = ISUM (126) + IMAP (141)
IMAP (109) = ISUM (125) + IMAP (140)
.
.
IMAP ( 36) = ISUM ( 52) + IMAP ( 67)
IMAP ( 35) = ISUM ( 53) + IMAP ( 68)

The lower half of the map is now complete.

8. Map positions above 221 and below 35 are not used. These positions correspond to the unused portion of the field-of-view in the shadow of the photocathode tube illustrated in FIG. 5.

9. Map elements 111 to 143 are zero. This corresponds to an area ±0.25 inch from the center of the field-of-view.

10. The maps corresponding to camera #1 and camera #2 are shown in FIG. 24C and are stored in a common data area labeled FCOMP1 and FCOMP2 respectively.

Figure 25:
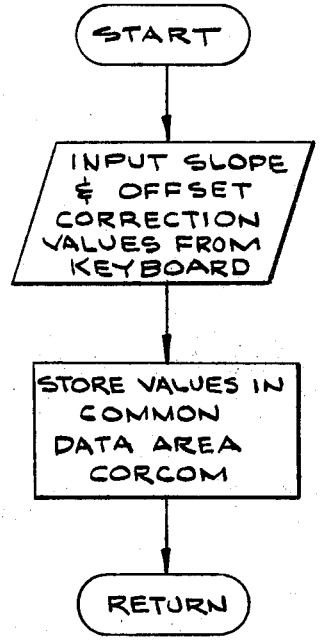

CORDAT, see FIG. 25. This program runs under the gage off-line system. Its purpose is to allow the operator to enter the slope and offset correction factors for each head. The four variables are:

IMULT1 — Slope correction factor for head 1
IOFST1 — Offset correction factor for head 1
IMULT2 — Slope correction factor for head 2
IOFST2 — Offset correction factor for head 2

Slope correction is added to all bars by the field-of-view compensation subroutine CMPNST based on the following formula:

$$\text{Size} = (0.5-\text{Size})*\text{IMULT1}$$

Offset correction is added to all bar sizes by the field-of-view compensation subroutine CMPNST based on the following formula:

Size = Size - IOFST1

Figure 26:
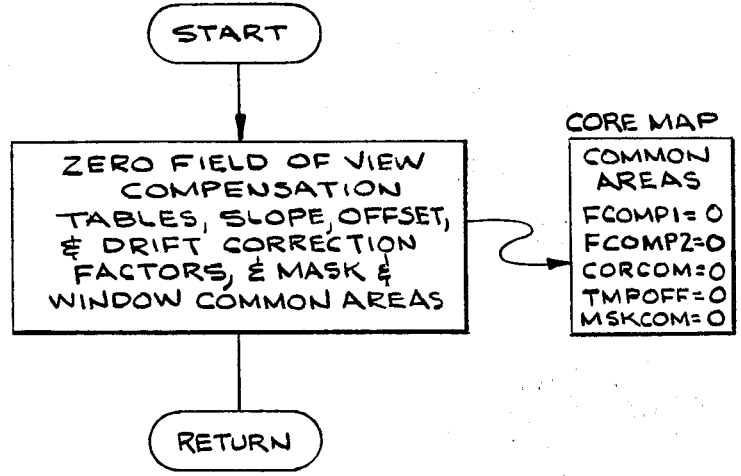
Figure 30A:
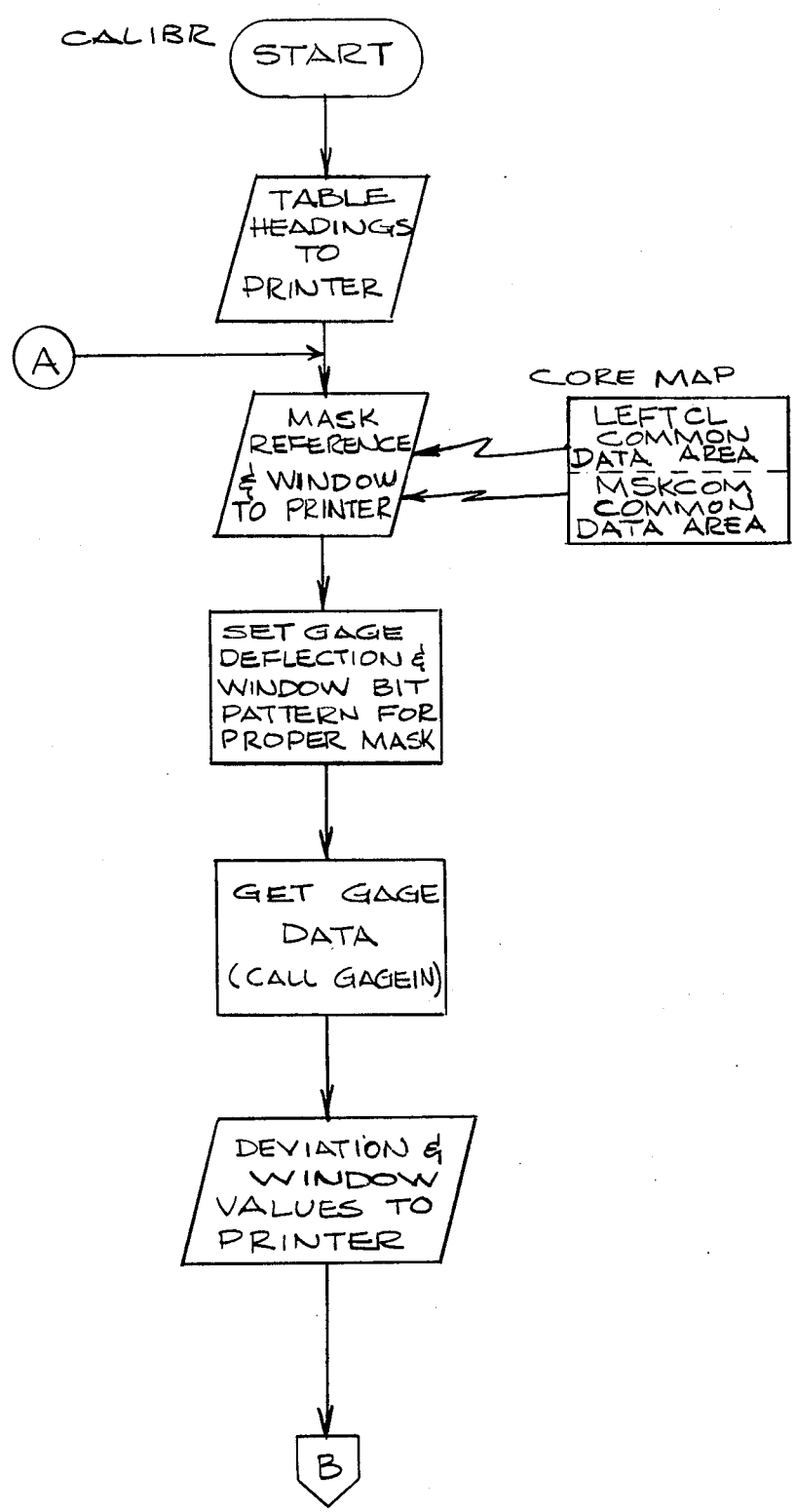
Figure 30B:
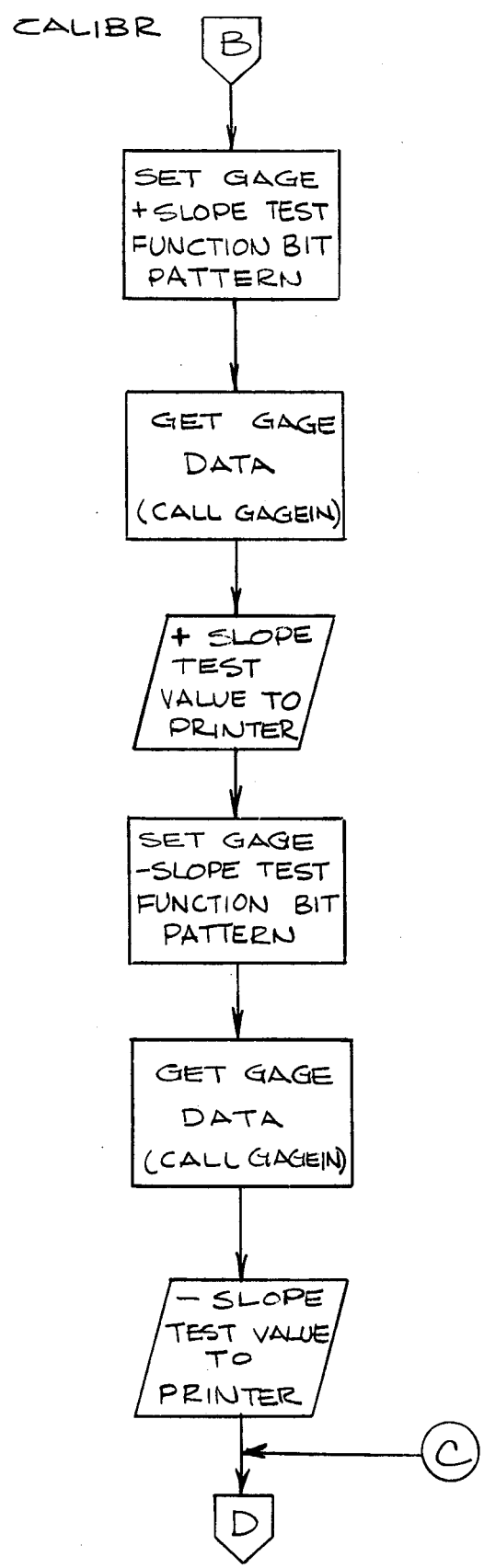
Figure 30C:
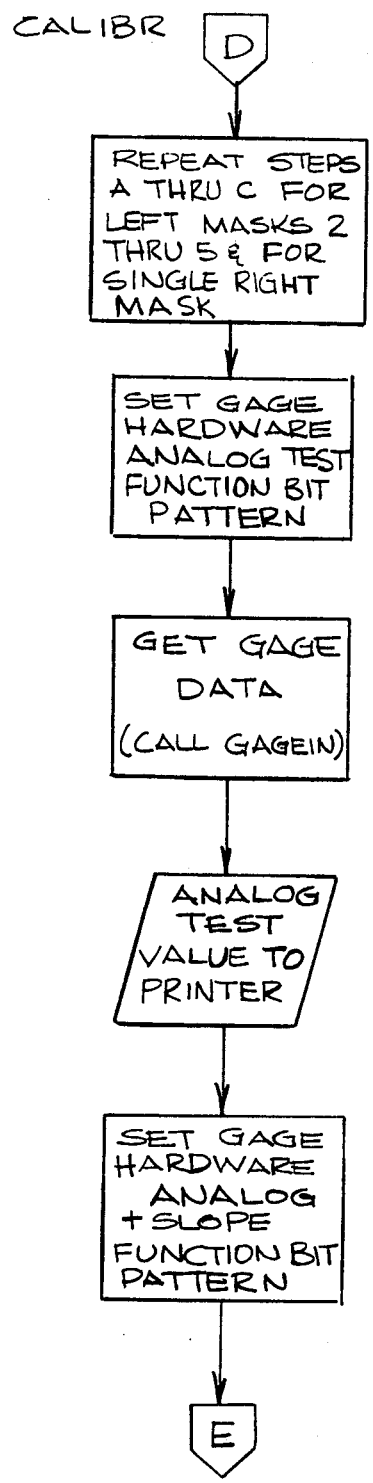
Figure 30E:
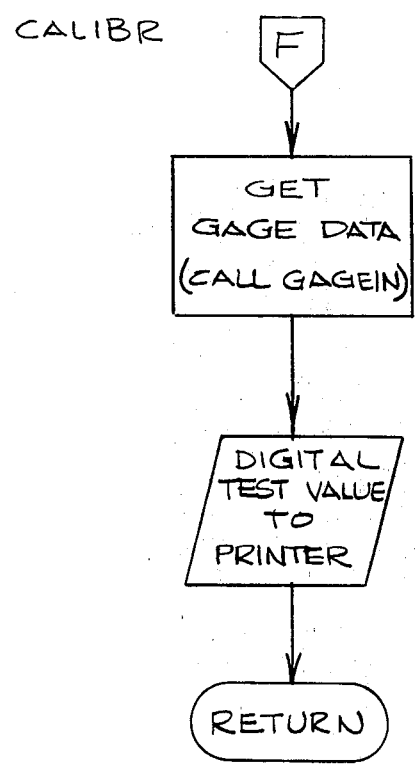
Figure 31A:
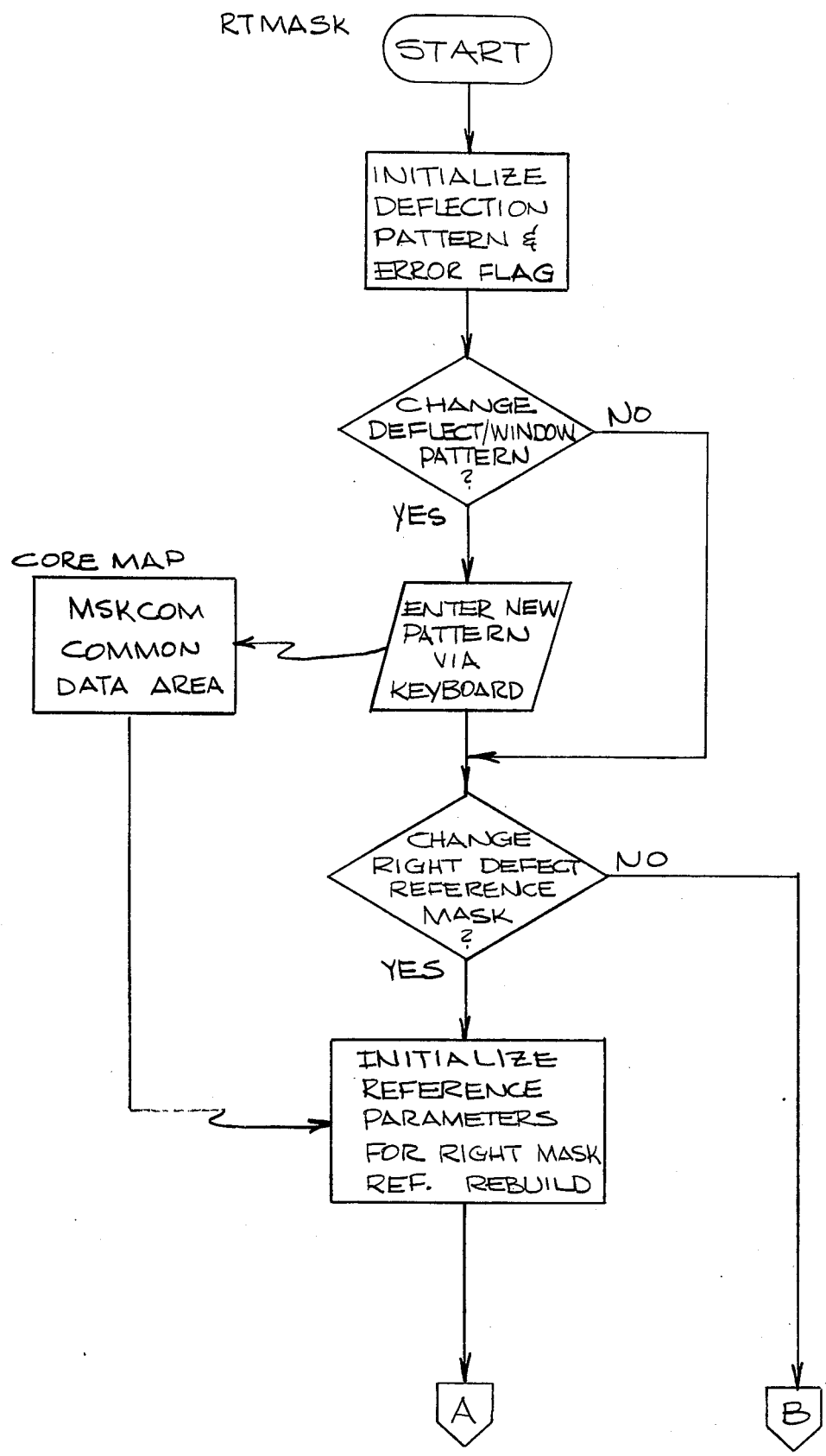
Figure 31B:
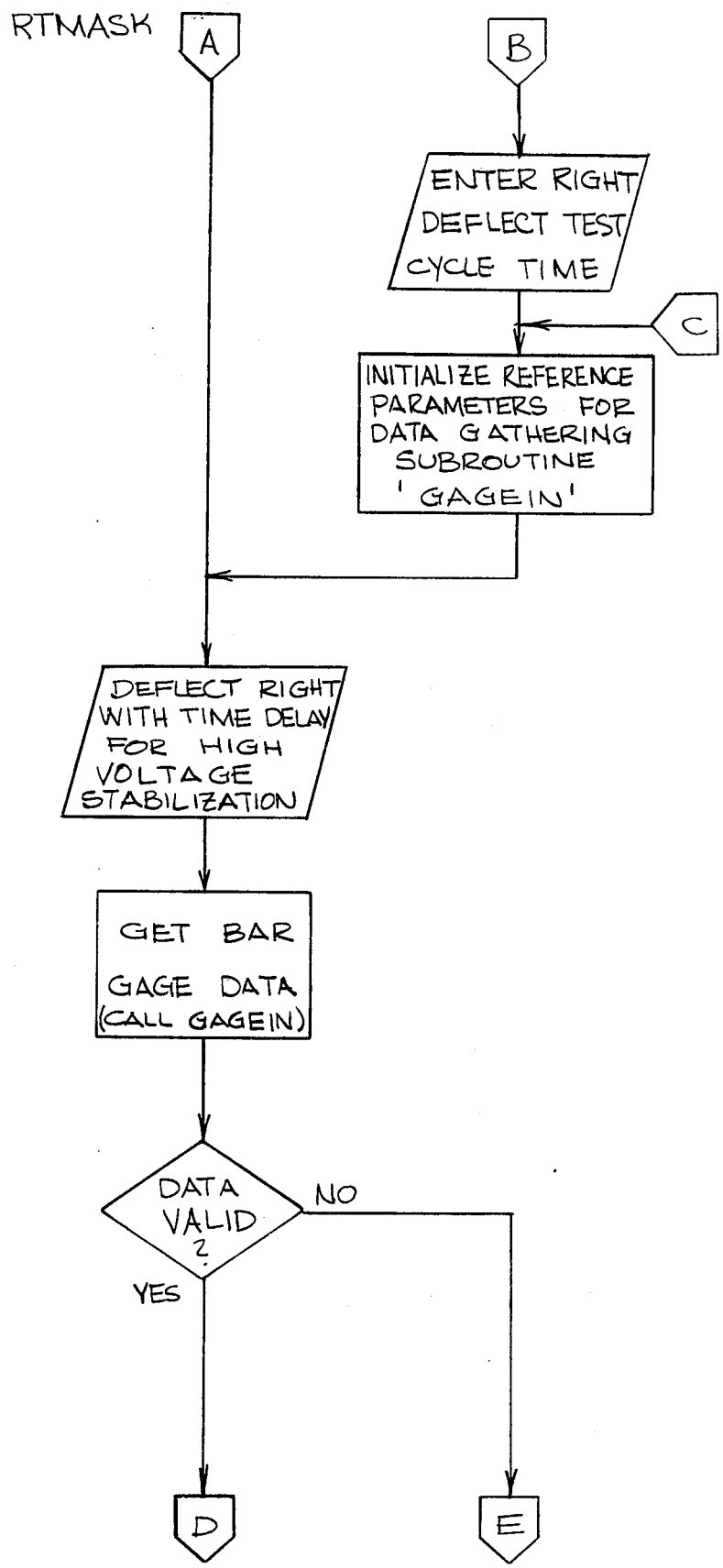

ZERO, see FIG. 26. This program runs in the offline gage system. Its purpose is to zero all compensation maps, all slope and offset correction factors, and all right mask recalibration constants. MAPRNT, see FIG. 27A-C. This program runs under the off-line gage system. It does not require operator intervention. Its purpose is to print the field-of-view compensation maps, slope and offset correction factors, and left and right mask values, all as shown in FIGS. 27B and 27C.

GAGTPC, see FIG. 28. This program calculates hot aim size based on an internally stored compensation equation. Three variables are required for this equation. First, the % carbon is obtained from IGRADE in common area BDCCOM. Second, the bar temperature is obtained from ITMP22 in common area SYSCOM. Third, the cold aim size is obtained from ICDAIM in common area BDCCOM. The calculated hot aim size is stored in IHAIM1 and IHAIM2 in common BDCCOM.

CMPNST, see FIG. 29. This auxiliary subroutine is appended to any subroutine requiring gage diameter data compensation. Specifically, this subroutine linearizes the bar measurement data for its position in the gage field-of-view, corrects the measurement data for slope and offset data per subroutine CORDAT, and performs automatic recalibration from right mask data generated by subroutine GAGRCL.

Bar 10 size data from each head is linearized by the CMPNST subroutine using compensation maps FCOMP1 and FCOMP2 generated by off-line program GAGMAP. Compensation is performed by the following steps.

1. The bar size and position data from accumulator 118 are used to determine the positions of the upper and lower edges 83, 82 of the bar 10 in the compensation map as follows:

Upper edge 83 position = (center bar position + bar size/2)/0.016

Lower edge 82 position = (center bar position − bar size/2)/0.016

If the center of a 1 inch bar is positioned ¾ inch above the center of the field-of-view, the position of the bar center is 2.048 inches + 0.75 inches = 2.798 inches. The upper and lower bar edge positions are determined as previously described. That is:

$$\text{Upper Edge 83 Position} = (2.748'' + \frac{1.0''}{2}) \div 0.016'' = 203 \quad \text{(Eq. 13)}$$

$$\text{Lower Edge 82 Position} = (2.748'' - \frac{1.0''}{2}) \div 0.016'' = 140 \quad \text{(Eq. 14)}$$

2. The compensation values corresponding to the upper and lower bar edges 83, 82 are obtained from the map and assigned values ICOR1 and ICOR2 respectively.

ICOR1 = IMAP (Upper Edge 83 Position)     (Eq. 15)

ICOR2 = IMAP (Lower Edge 82 Position)     (Eq. 16)

3. If both upper and lower edges 83, 82 are above the center of the field-of-view, then:

Corrected Bar Size = Uncorrected Size − ICOR1 + ICOR2     (Eq. 17)

4. If both upper and lower edges 83, 82 are below the center of the field-of-view, then;

Corrected Bar Size = Uncorrected Size + ICOR1 − ICOR2     (Eq. 18)

5. If upper edge 83 is above the center of the field-of-view and lower edge 82 below, then:

Corrected Bar Size = Uncorrected Size − ICOR1 − ICOR2     (Eq. 19)

CALIBRATION PROGRAM (201)

CALIBR, see FIG. 30A-F. This program runs in the off-line gage system. It does not require operator intervention. Its purpose is to establish a performance log for the gage on printer 63. It performs the following functions:

1. Deflect to each left and right mask 95, 94 and:
   a. Measure and print size of each mask;
   b. Calculate and print deviation from stored mask value;
   c. Measure and print (+) slope value;
   d. Measure and print (−) slope value;
   e. Print window value used for each mask.
2. Measure and print analog test size, + and − slope values.
3. Measure and print digital test.
4. Print calibration update values used by recalibration.

RECALIBRATION PROGRAMS (202)

RTMASK, see FIG. 31A-D. This disc resident subroutine is an overlay, run in the off-line mode, by means of which any of the following bar diameter gage functions may be exercised:

1. Right deflect electronic window gates may be changed to accommodate changes in image-dissector 90 parameters.
2. Right deflect diameter reference values, stored in common tables, may be updated to compensate for drift, component aging, etc.
3. If no changes are desired, the program can be run cyclicly, with a deviation printout on printer 63 for each head to observe electronic and temperature related drift, see FIG. 31D.

Upon return from this subroutine, the image-dissector 90 sweep is returned to the center, a full electronic window gate is restored, and the current through the back-light source lamps is reversed to prolong lamp life. This program is designed primarily as a long-term drift check tool, with the additional capability of updating the window gates and reference table values. It is invoked by the subroutine SUBCLL, and requires operator interaction.

Figure 32A:
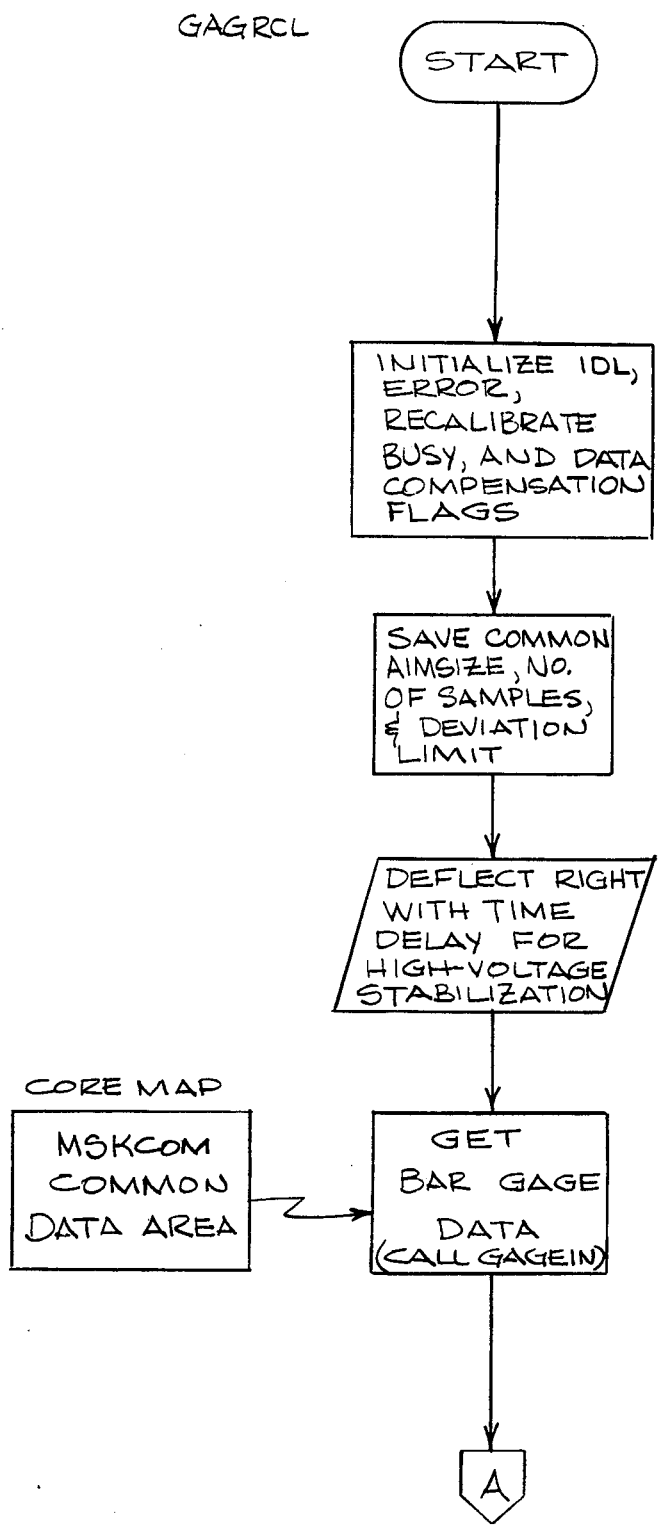
Figure 32B:
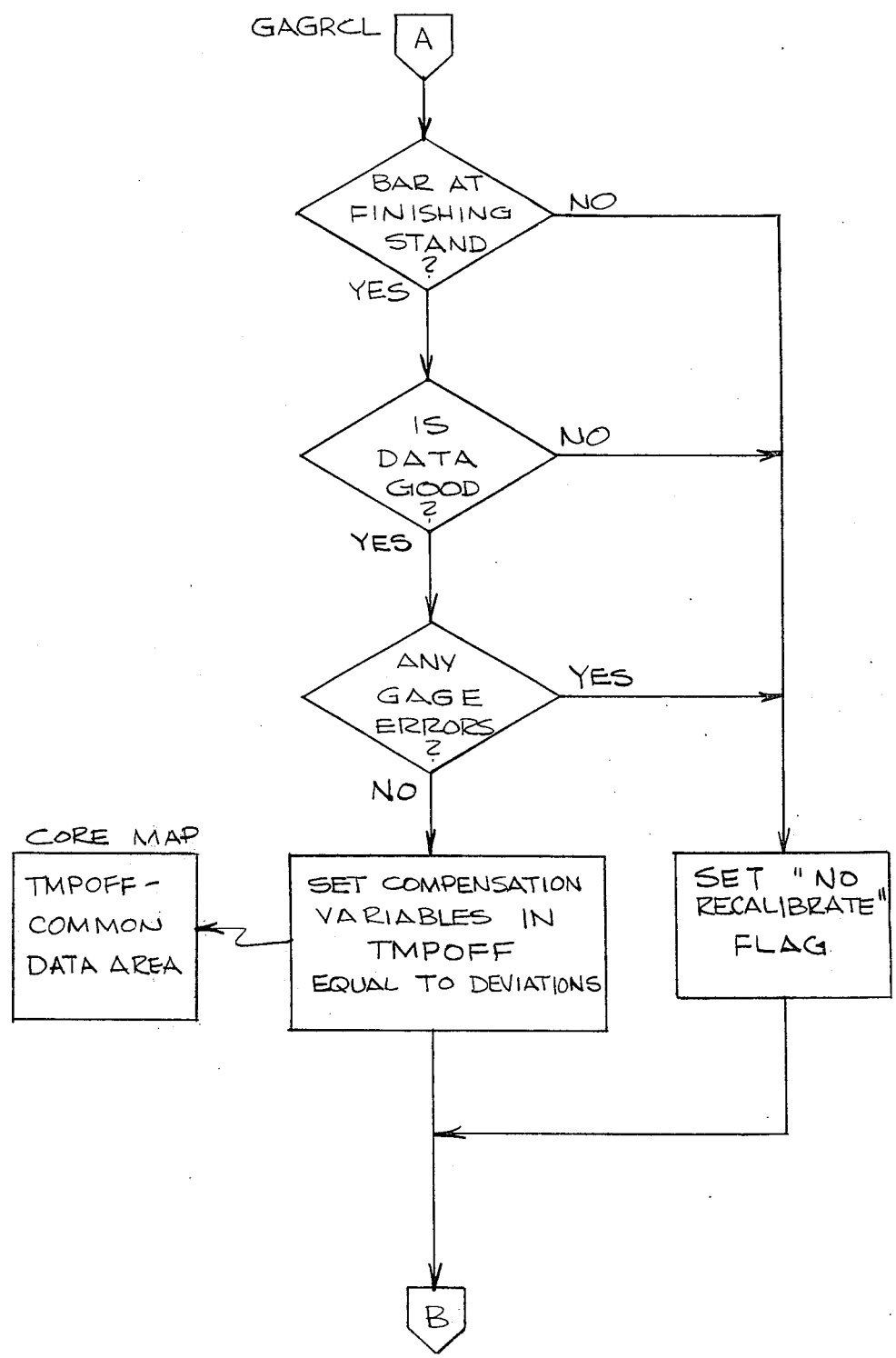
Figure 32C:
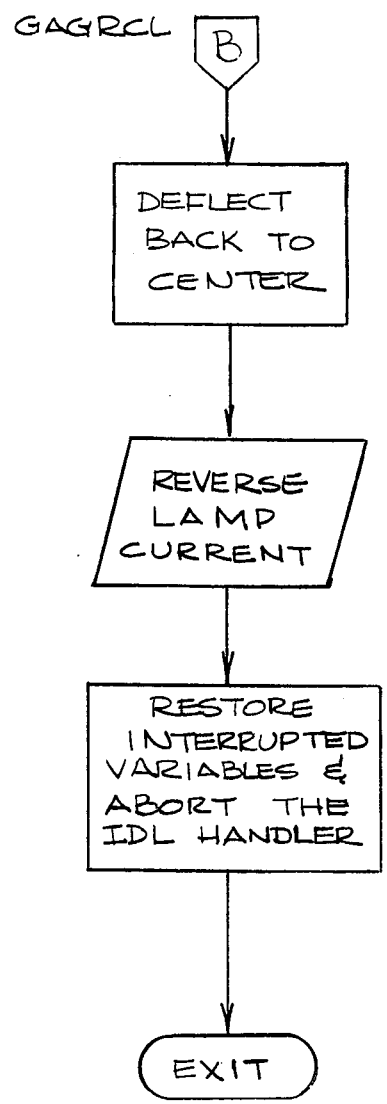
Figure 33A:
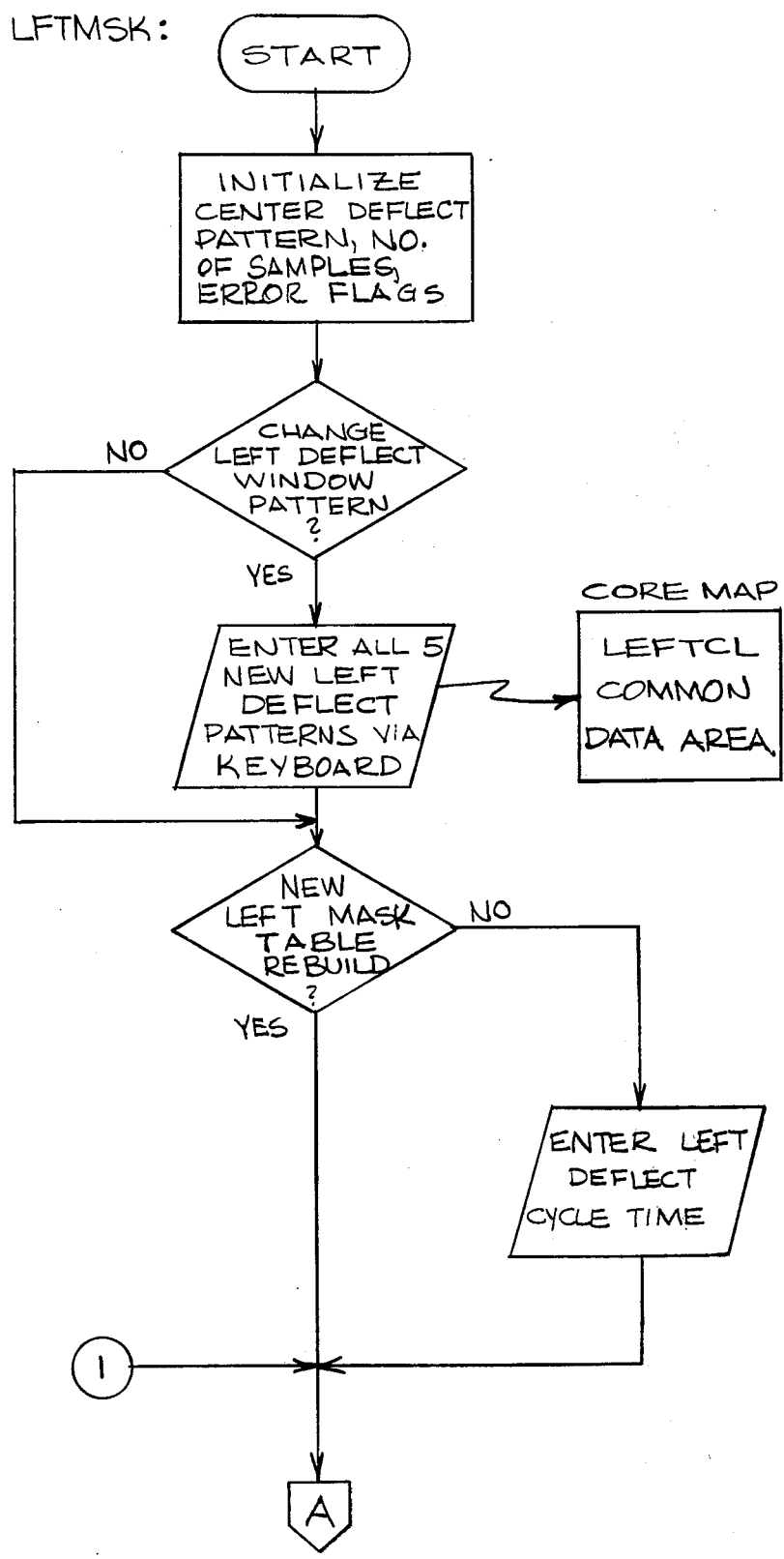
Figure 33C:
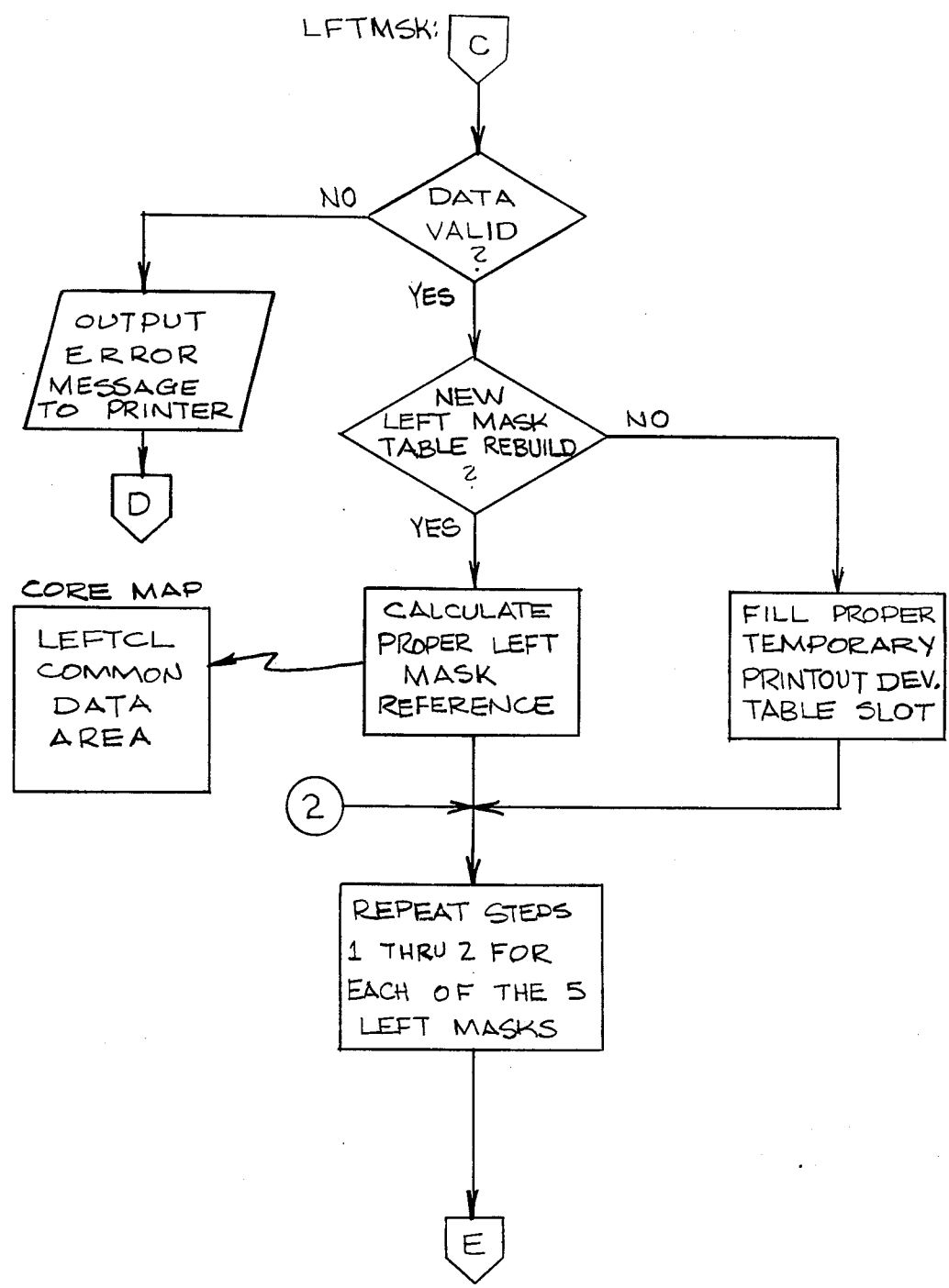

GAGRCL, see FIG. 32A-C. This program is run under the on-line system. It requires no operator interaction. Its purpose is to automatically recalibrate the bar diameter gage periodically by updating the drift correction terms ITMP1 and ITMP2. It deflects the camera sweep to scan the right mask 94 and equates the drift terms with any deviations from an initial calibration reference value. Before exit, the sweep is returned to the center with a normal window, and the back-light-source current is reversed.

The automatic recalibration system provides the means to maintain gage accuracy by checking the calibration whenever bar 10 is not in the gage field-of-view. This recalibration system is implemented after bar 10 clears the gage, and before the next one passes through, as determined by a signal from hot metal detector electronics 57. This is accomplished using software to calculate scaling factors based on the differences between an on-line measurement of a known internal reference, right mask 94, and an off-line measurement of the same internal reference made during system calibration. Following a recalibration, the measurements on the next bar 10 in the gage field-of-view is corrected using these scaling factors.

The key to the recalibration measurement is masked photocathode electrode 91 on the front of the image dissector tube 90. The mask pattern is shown in FIG. 5. The photocathode electrode 91 has five 0.1 inch wide masks spaced 0.1 inches apart on the left side and a single 0.25 inch mask centered on the right side. Construction and operating features of image dissector tube 90 and photocathode 91 are described above in FIGS. 4, 5, 6. There are "C" scan, "R" scan and "L" scan positions established by X-axis bias. There is no distinction between right mask camera signals and bar camera signals. If no adjustments are made to the electronics, the measurement of the right mask at time $T_1$ should be the same as the measurement at time $T_2$. Any differences are assumed to be electronic drift.

The recalibration system only uses right mask 94 to calculate the correction factors. The five left masks 95 are only used in the off-line calibration system for linearity checks. The right masks for both cameras are measured and saved on the disc by executing the right mask program "RT" in the off-line calibration system. The two variables are stored in core in common data area MSKCOM under the names IMASK1 and IMASK2. This data is transferred from disc to common area MSKCOM in core when the control system is activated.

The on-line measurement of right mask 94 is performed by the GAGRCL task. After hot metal detector 55 detects the tail end of bar 10 being rolled clearing the gage, GAGRCL deflects both dissector tube images to the right and measures mask 94. The difference between the measured value from camera 1 and IMASK1 is stored in variable ITMP1 in common data area TMPOFF. The difference for camera 2 is stored in ITMP2 in area TMPOFF. These values represent changes in the gage measurement from the initial calibration to the on-line recalibration.

The on-line correction function is performed in subroutine CMPNST using variables ITMP1 and ITMP2. A slope correction is applied to each measurement based on the following formula:

For Camera Head 1:

$$\text{Corrected Bar Size} = \text{Bar Size} - \left(\frac{\text{Bar Size} \times \text{ITMP1}}{0.5''}\right) \quad \text{(Eq.20)}$$

For Camera Head 2:

$$\text{Corrected Bar Size} = \text{Bar Size} - \left(\frac{\text{Bar Size} \times \text{ITMP2}}{0.5''}\right) \quad \text{(Eq.21)}$$

As an example for an ITMP1 = 0.0006":
The corrected size for a 0.5" bar =

$$0.5'' - \frac{[0.5'' \times 0.0006'']}{0.5''} = 0.4994'' \quad \text{(Eq.22)}$$

The corrected size for a 1.0" bar = (Eq.23)

$$1.0'' - \frac{[1.0'' \times 0.0006'']}{0.5''} = 0.9988''$$

The corrected size for a 1.5" bar = (Eq.24)

$$1.5'' - \frac{[1.5'' \times 0.0006'']}{0.5''} = 1.4982''$$

The amount of correction for a ½ bar is equal to the values ITMP1 and ITMP2. Similarly, the correction is 2 X ITMP1 for a 1.0 inch bar and 3 X ITMP1 for a 1.5 inch bar. This is because lens 86 reduction is ½. Thus a ½ inch bar is projected as a 0.25 inch shadow on photocathode electrode 91 which is the approximate width of right mask 94.

LFTMSK, see FIG. 33A–E. This disc resident subroutine is an overlay, run in the off-line mode, by means of which any of the following bar diameter gage functions may be exercised:

1. Left-deflect electronic window gates, used to select each of the five left-deflect bar references on left mask 95, may be changed to accommodate changes in image-dissector tube 90 parameters.

2. Left-deflect diameter reference values, stored in common tables, may be updated to compensate for drift, component aging, etc.

3. If no changes are desired, the program can be run cyclicly, with a deviation printout on printer 63 of each of the five left-deflect etched bar references for each head, to observe electronic and temperature related drift, see FIG. 33E. Maximum cycle time is 32,000 seconds.

Upon return from this subroutine, the image-dissector tube 90 sweep is returned to the center, a full electronic window gate is restored, and the current through the back-light source lamps is reversed, to prolong lamp life. This program is designed as a field-of-view and electronic drift check took, with the additional capability of updating the window gates and reference table values. It is invoked by the subroutine SUBCLL, and requires operator interaction.

PROFILE AND POSITION PROGRAMS (203)

Figure 34:
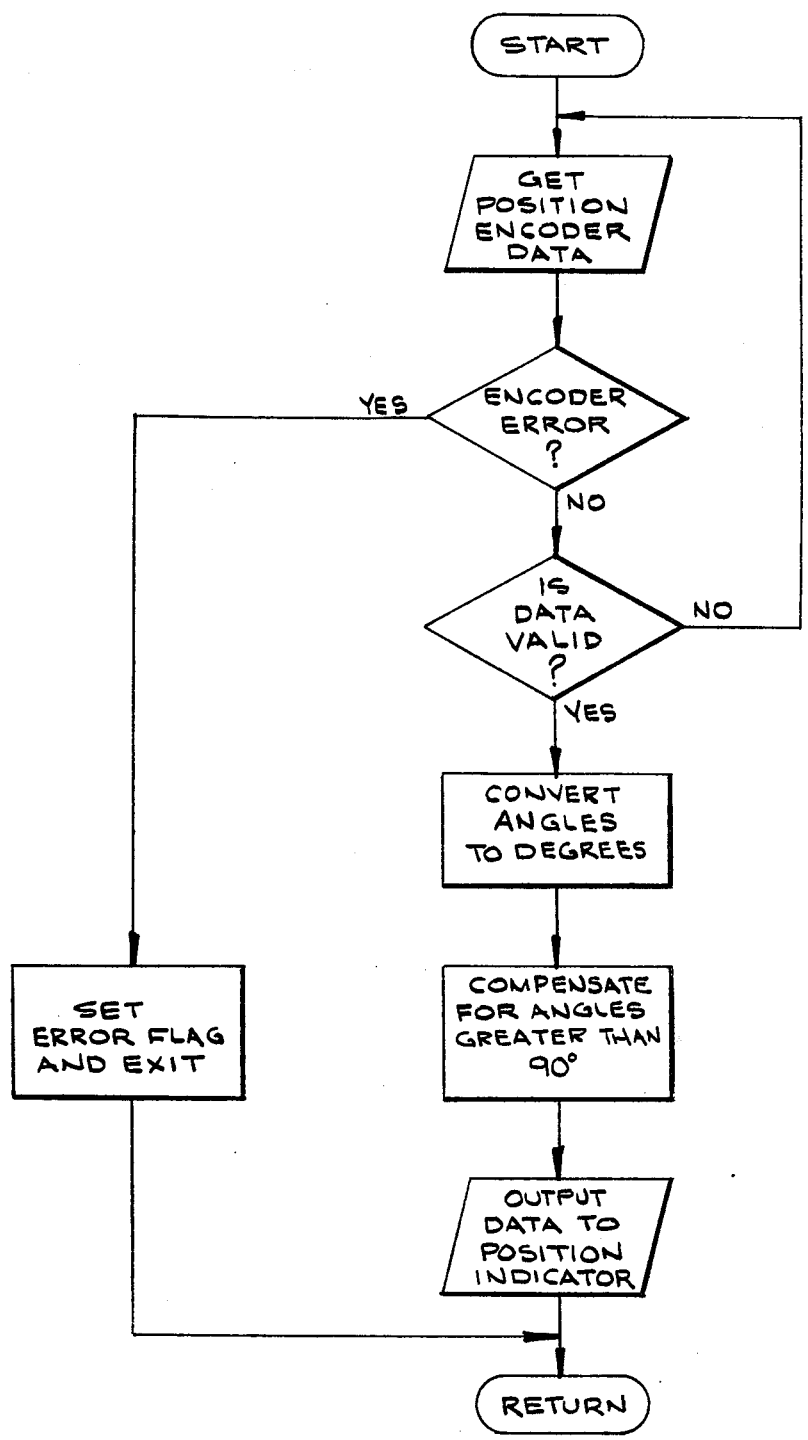

ENCNGL, see FIG. 34. This auxiliary subroutine is appended to any subroutine requiring the angular position of the bar diameter gage heads. It reads the position encoder electronics 23, checks validity, puts both the binary and decimal values of position into common, and sets an error flag in the event of encoder failure.

Figure 35:
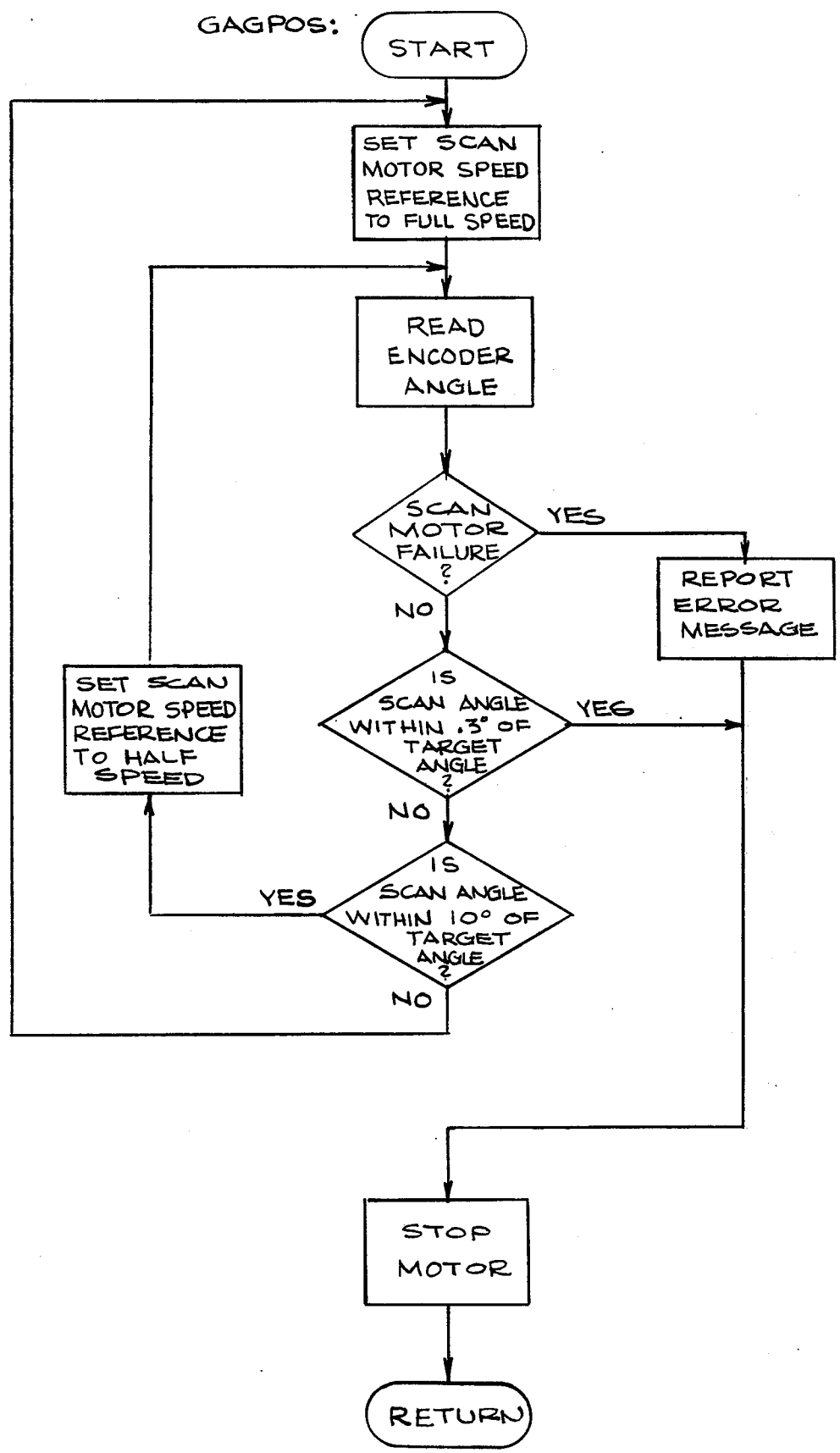
Figure 36A:
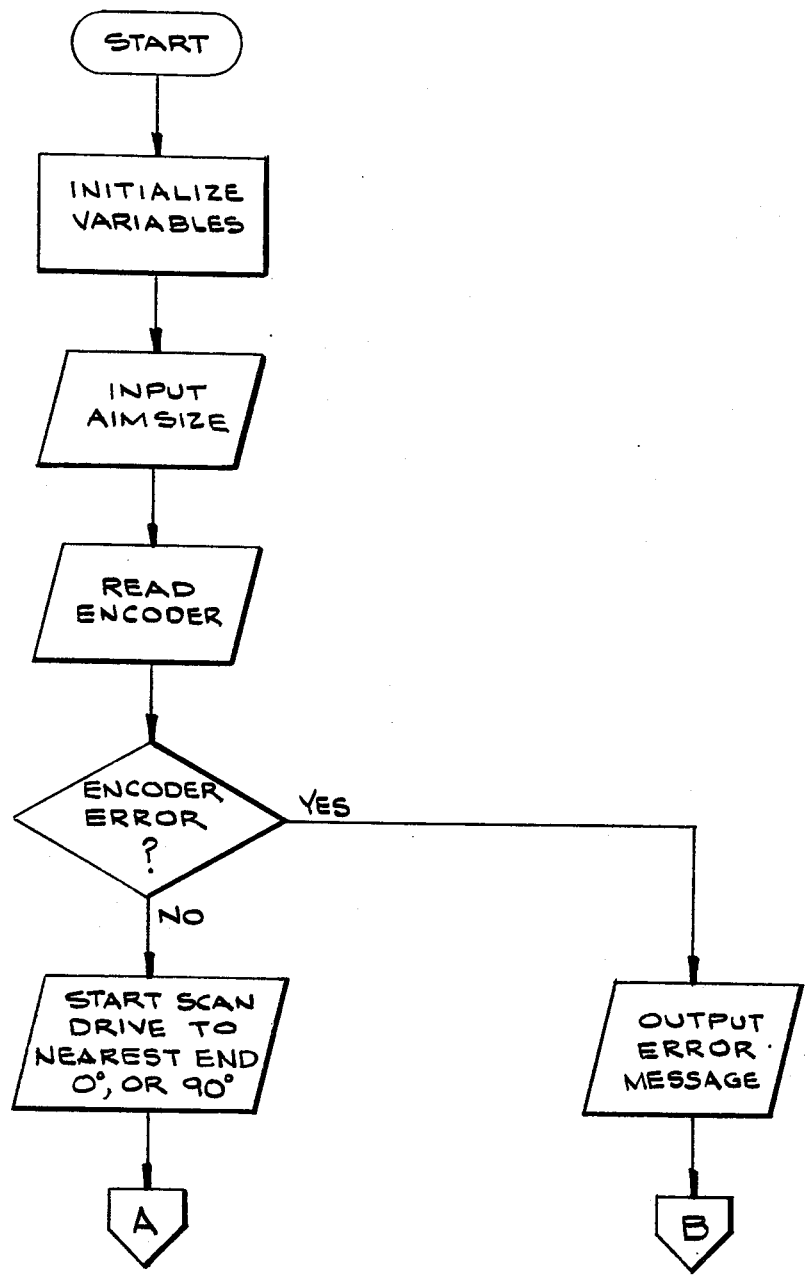
Figure 36B:
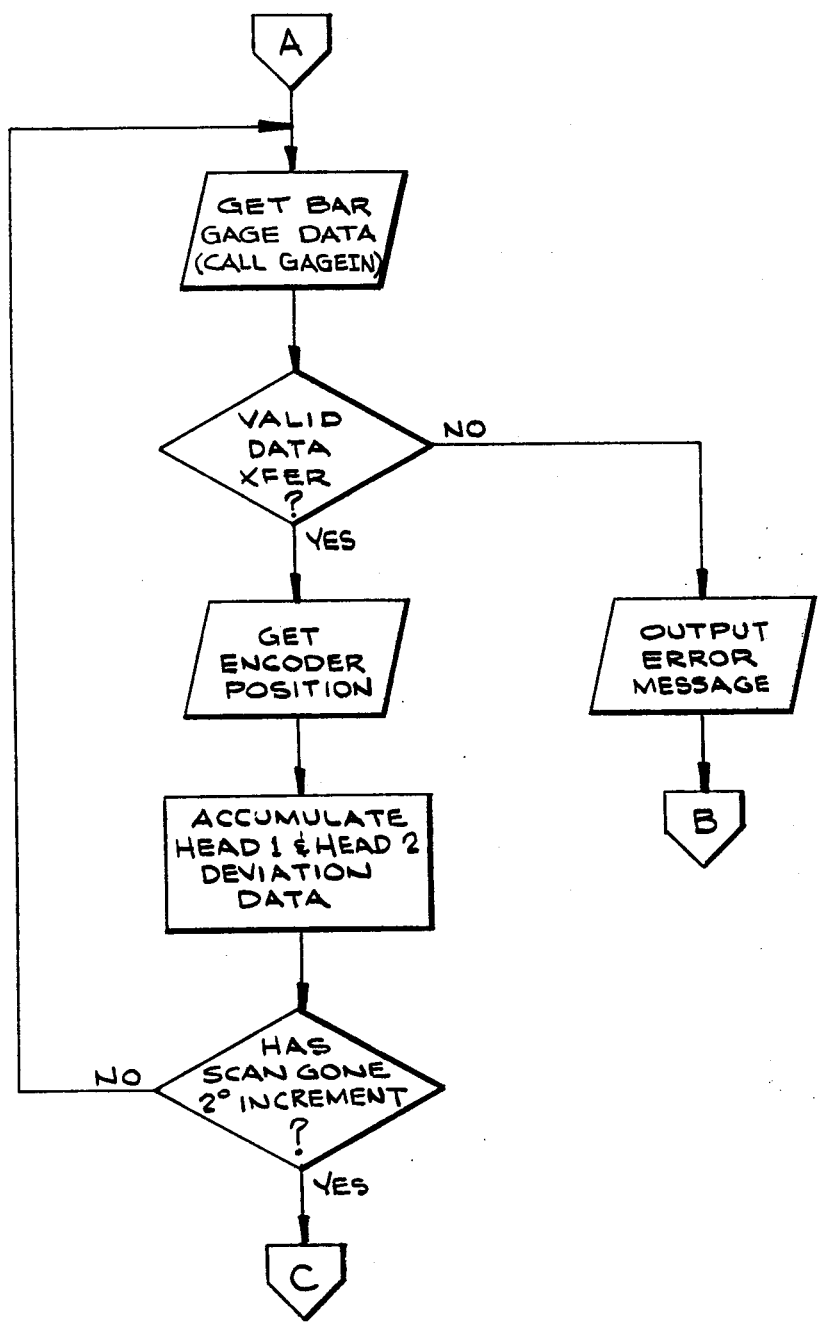
Figure 36D:
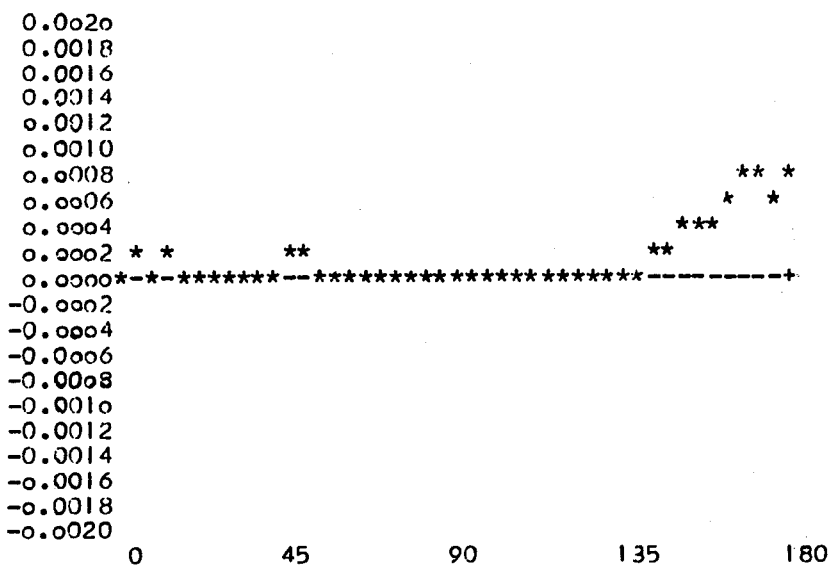
Figure 37A:
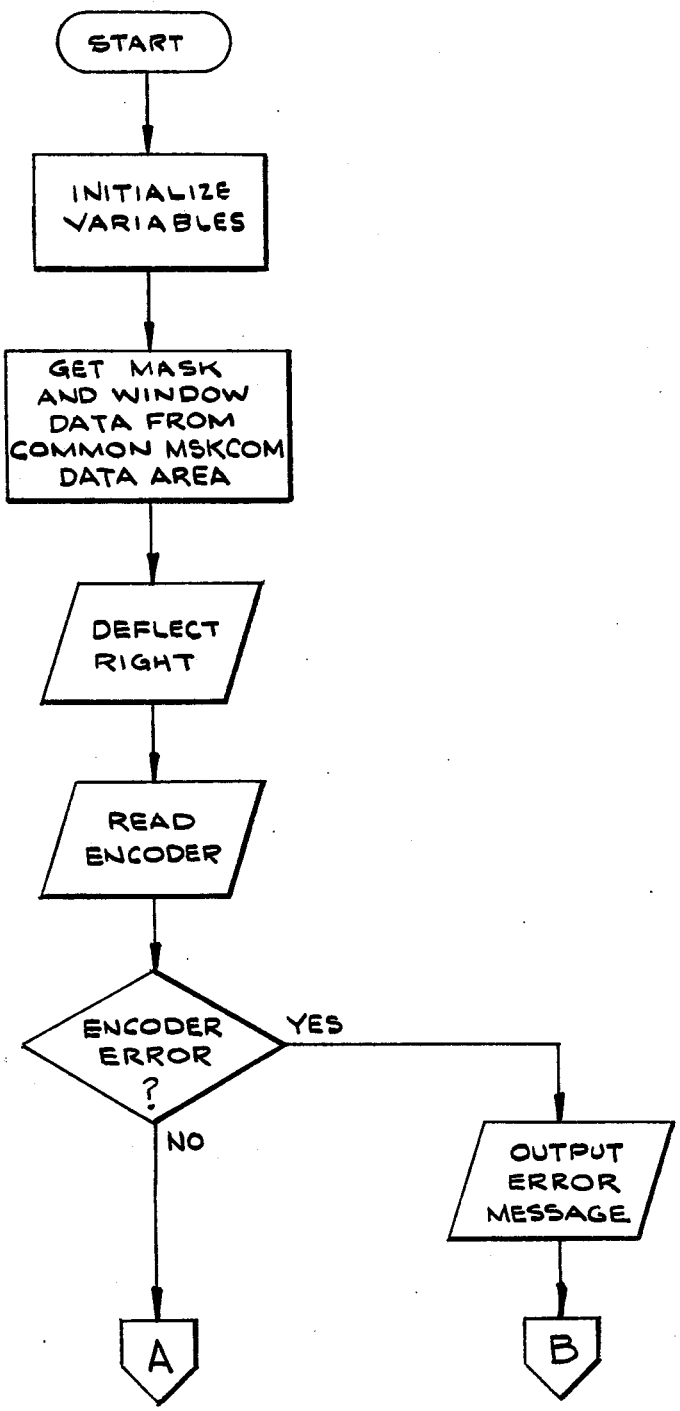
Figure 37B:
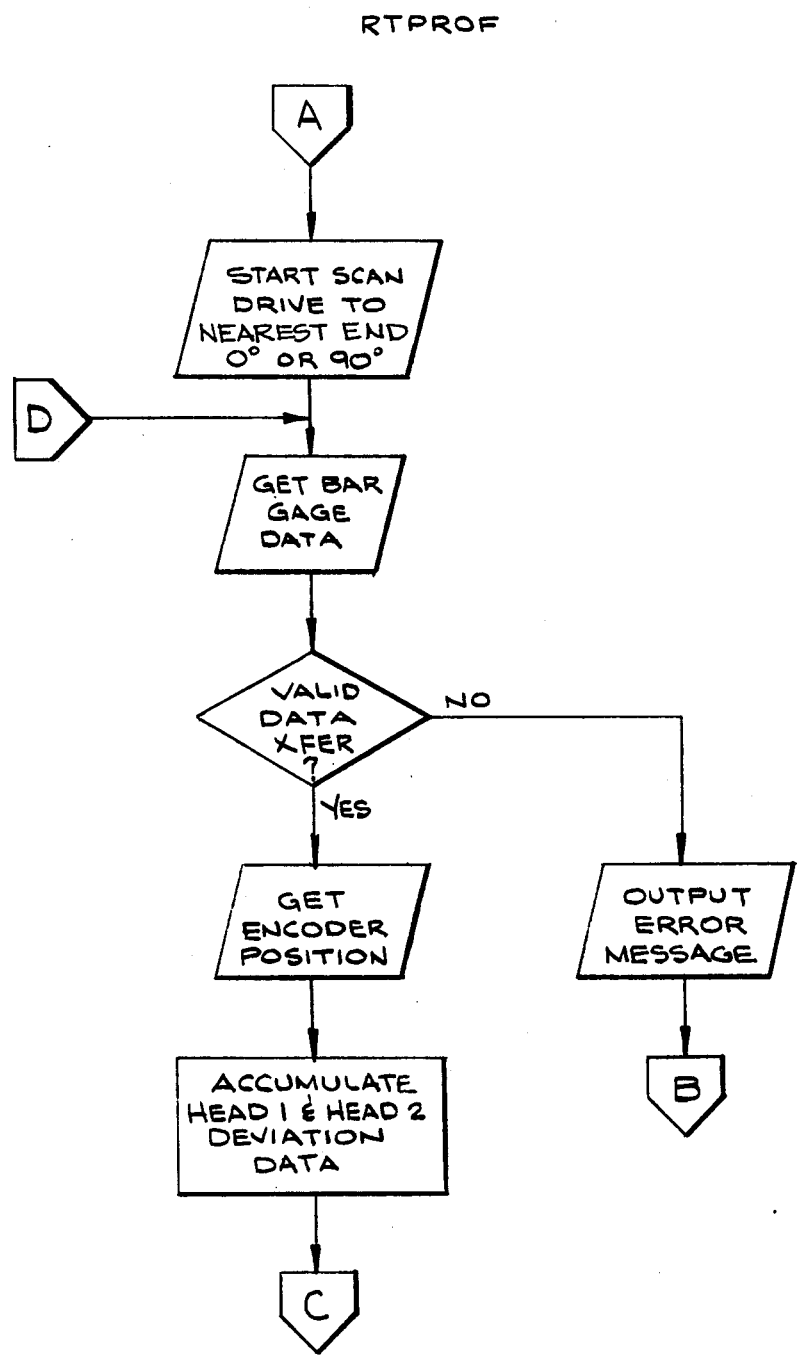
Figure 37C:
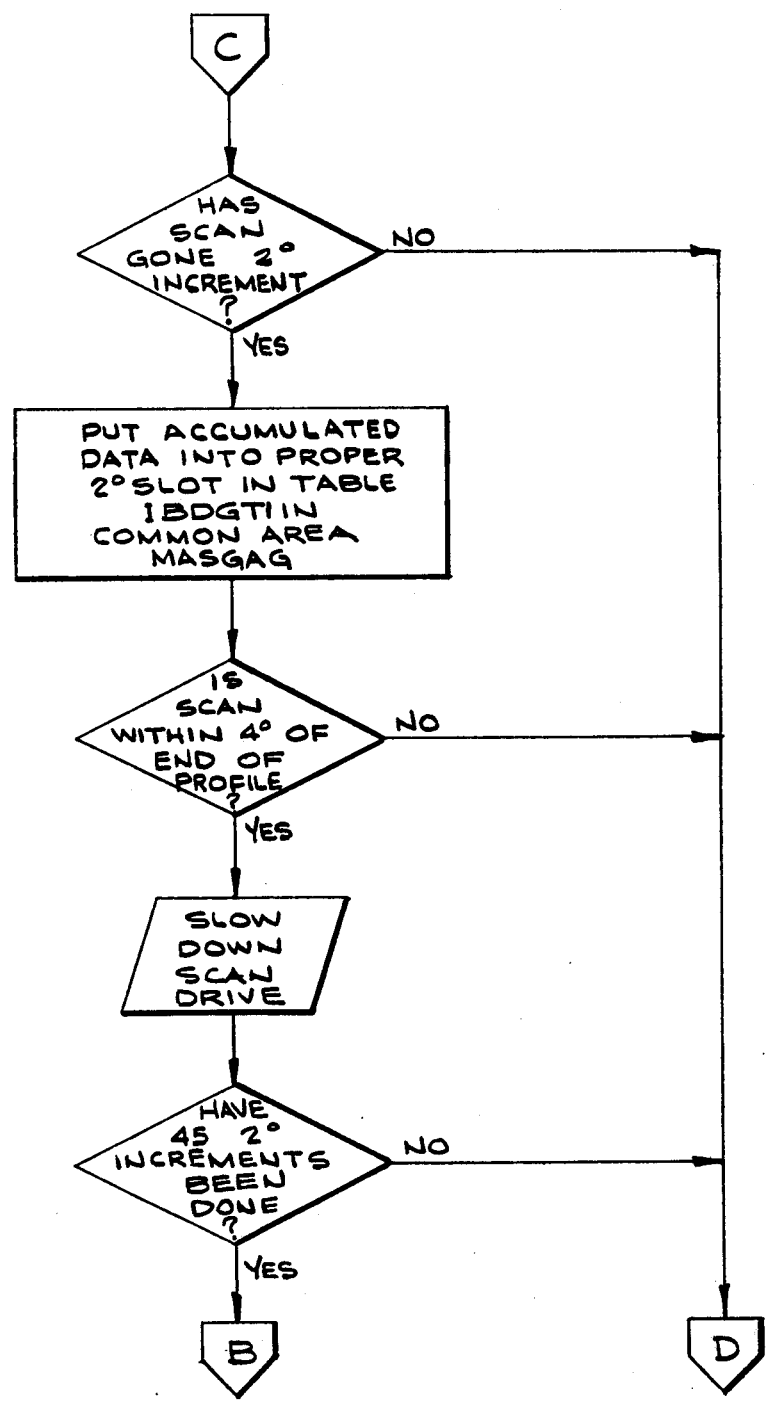
Figure 37D:
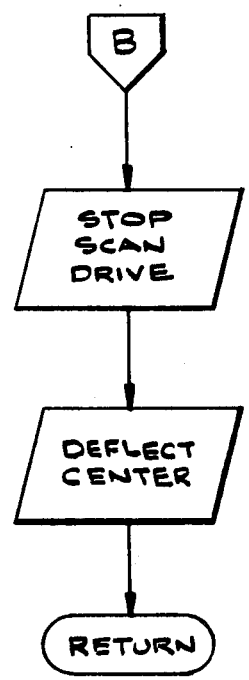
Figure 31E:
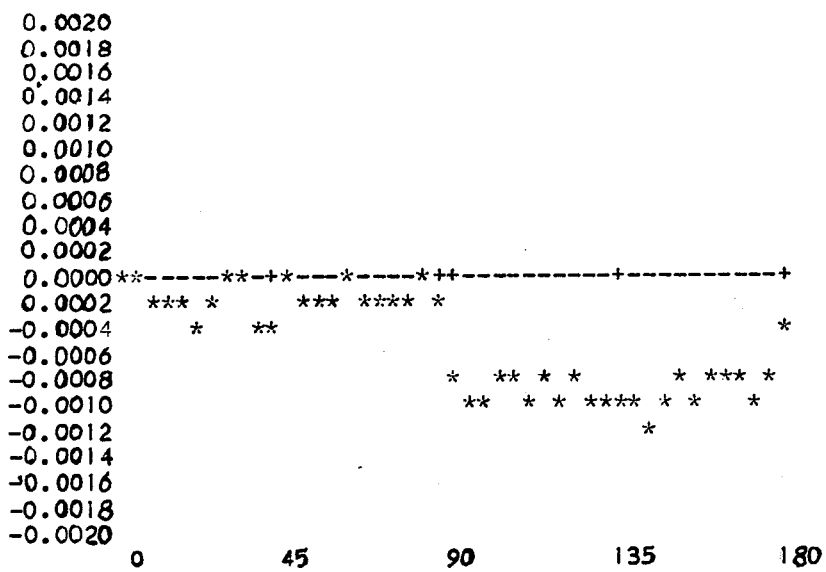

GAGPOS, see FIG. 35. This disc resident subroutine is an overlay, run under the off-line system, and requires operator interaction. It is invoked by the subroutine SUBCLL through the mnemonic SC. Its purpose is to drive the scanner to an angular position input through the terminal keyboard 60, 63. The following outline will aid in understanding the program:

1. If the target angle is greater than 10 degrees away from the scan position, full speed voltage is fed over cable 29 to scan motor controller 16 to drive toward the target angle. Less than 10°, go to step 3.

2. Continue full speed until scanner is within 10° of target.

3. When within 10 degrees of the target angle, output 16 is reduced to half-speed voltage.

4. When within 0.3 degrees of the target angle, apply zero volts to controller 16, and exit.

The operator is required to enter the target angle via the keyboard.

PROFIL, see FIG. 36A-D. This program is run under the gage off-line system. It requires operator intervention. Its purpose is to scan the camera through a complete 90° cycle and build profile table FIG. 36D containing the deviations for each 2 degree increment IBDGT1(94). It does not plot this data. The PLOT routine PL run under the off-line system performs this task.

There are three possible error conditions generated.

1. Scan motor failure — indicates that the motor didn't start, or an end of the scan cycle was not found (0 or 90°).

2. Encoder failure — generated if the ready bit was not generated by the encoder.

3. IDL failure — generated if an IDL transfer time-out occurs.

RTPROF, see FIG. 37A-E. This program is run under the gage off-line system. Its purpose is to deflect to the right mask on both cameras while scanning the cameras through a complete 90° cycle and building a profile table FIG. 37E containing the deviations for each 2° increment IBDGT1(94). It does not plot this data. The plot routine PL run under the off-line system performs this task.

There are three possible error conditions generated.

1. Scan motor failure — indicates that the motor didn't start, or an end of the scan cycle was not found (0 or 90°).

2. Encoder failure — generated if the ready bit was not generated by the encoder.

3. IDL failure — generated if an IDL transfer time-out occurs.

The program deflects scan right before beginning the profile and deflects back to center after the scan is complete.

Figure 38A:
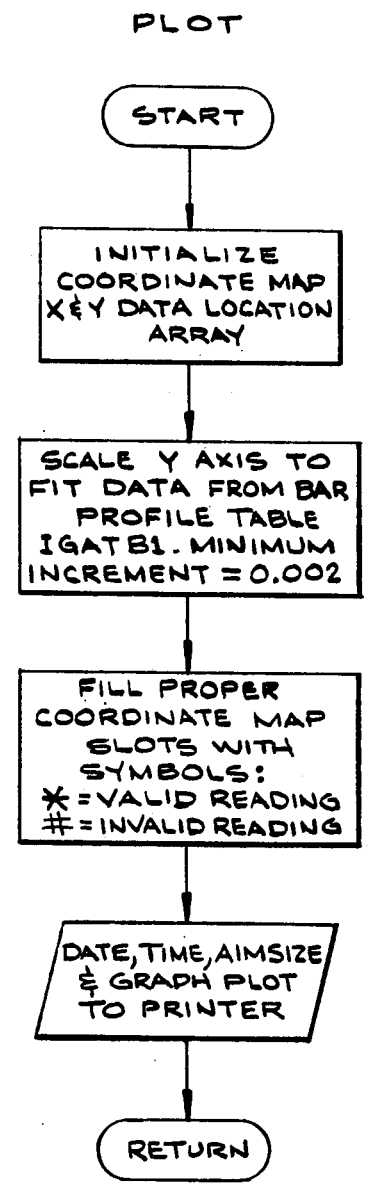
Figure 38B:
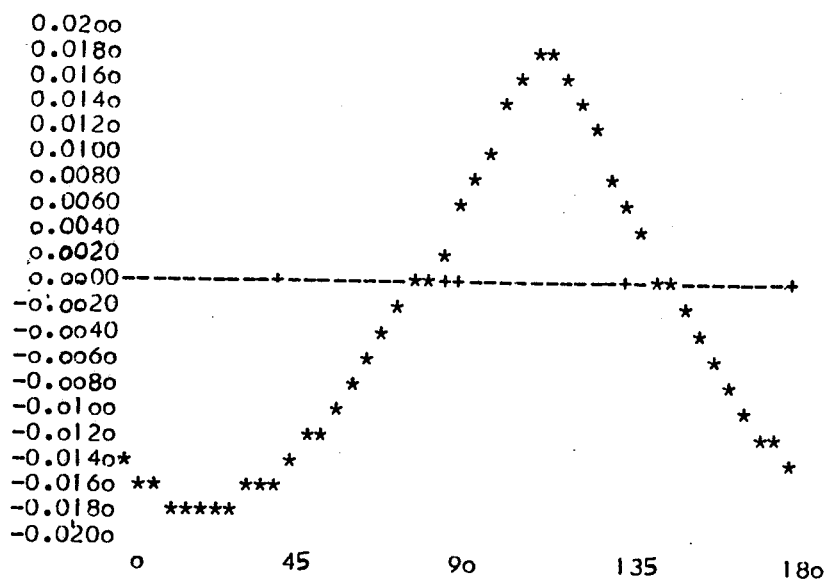

PLOT, see FIG. 38A-B. This program runs under the off-line gage system. It does not require operator intervention. Its purpose is to plot the data contained in the profile table IBDGT1 stored in core 194, see FIG. 38B. The Y-axis is set to 10 rows above the axis and 10 rows below the axis. The scale is floating with a minimum of .0002 inches. Deviation is plotted along the Y-axis and angular position of the scanner is plotted along the X-axis in increments of 4° per column. Data points which are blank or out of range are represented by a "#".

Figure 39A:
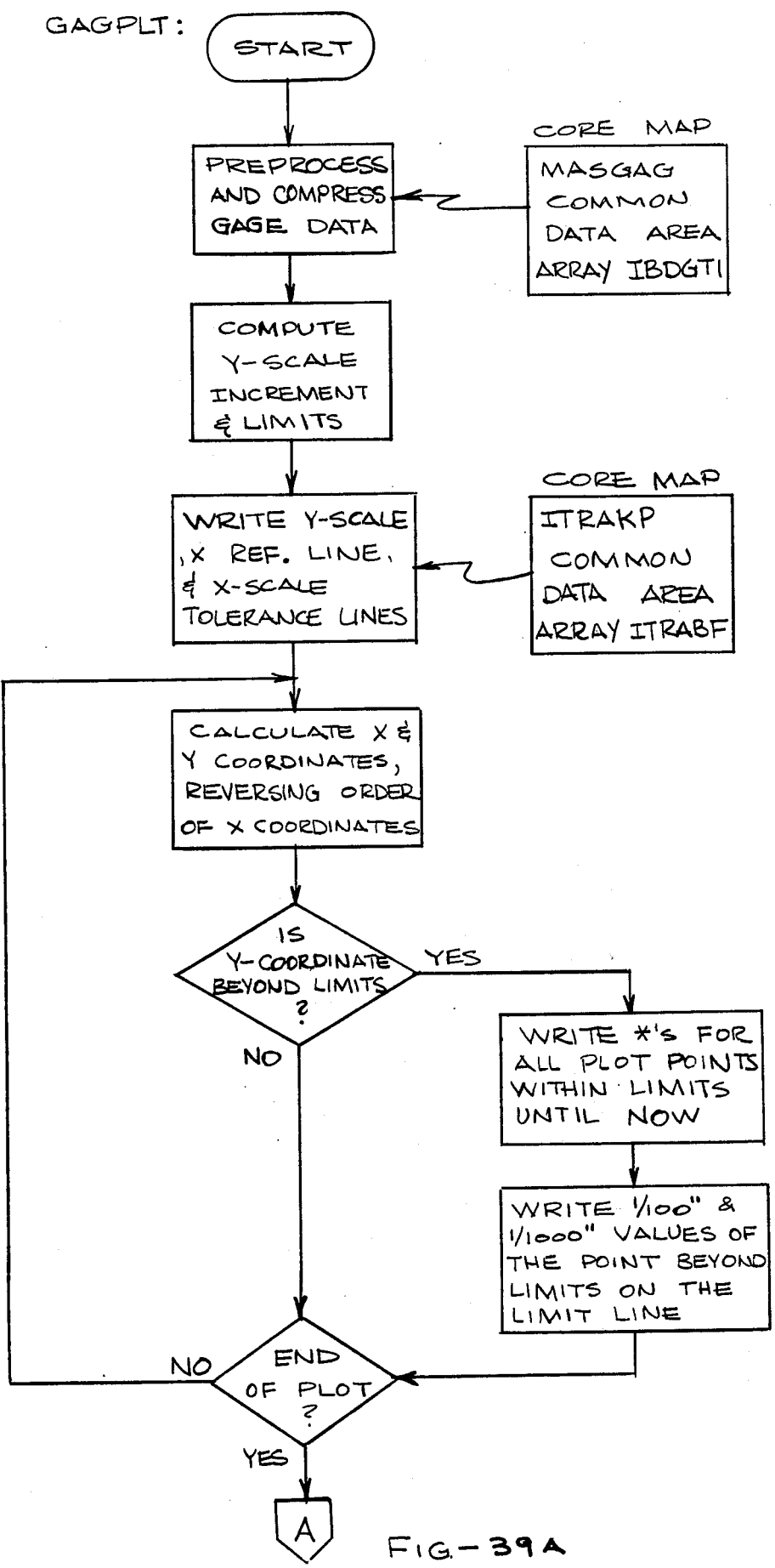
Figure 39B:
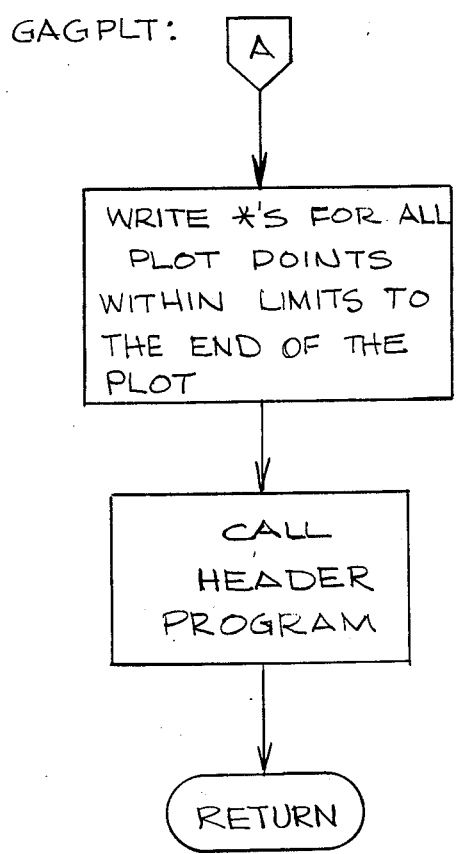

GAGPLT, see FIG. 39A-B. This on-line program takes the 90 element profile table IBDGT1 stored in core 194 from common area MASGAG and compresses it to a 60 element table. Each table entry now represents 3 degrees. It scans the table and determines what Y-axis scale increments to use based on the maximum and minimum values in the profile table. This increment is either 0.001 inch or 0.002 inch. Next, it writes the aim size tolerance lines on CRT and printing terminals 60, 63. The program then calculates the Y displacement position of each 3° table entry and writes a "*" on the CRT and printing terminals 60, 63 corresponding to this X and Y location. Finally, it calls the HEADER program and exits. A bar profile display using the GAGPLT program is illustrated in FIG. 3 as printout 65 from printing terminal 63.

Figure 40:
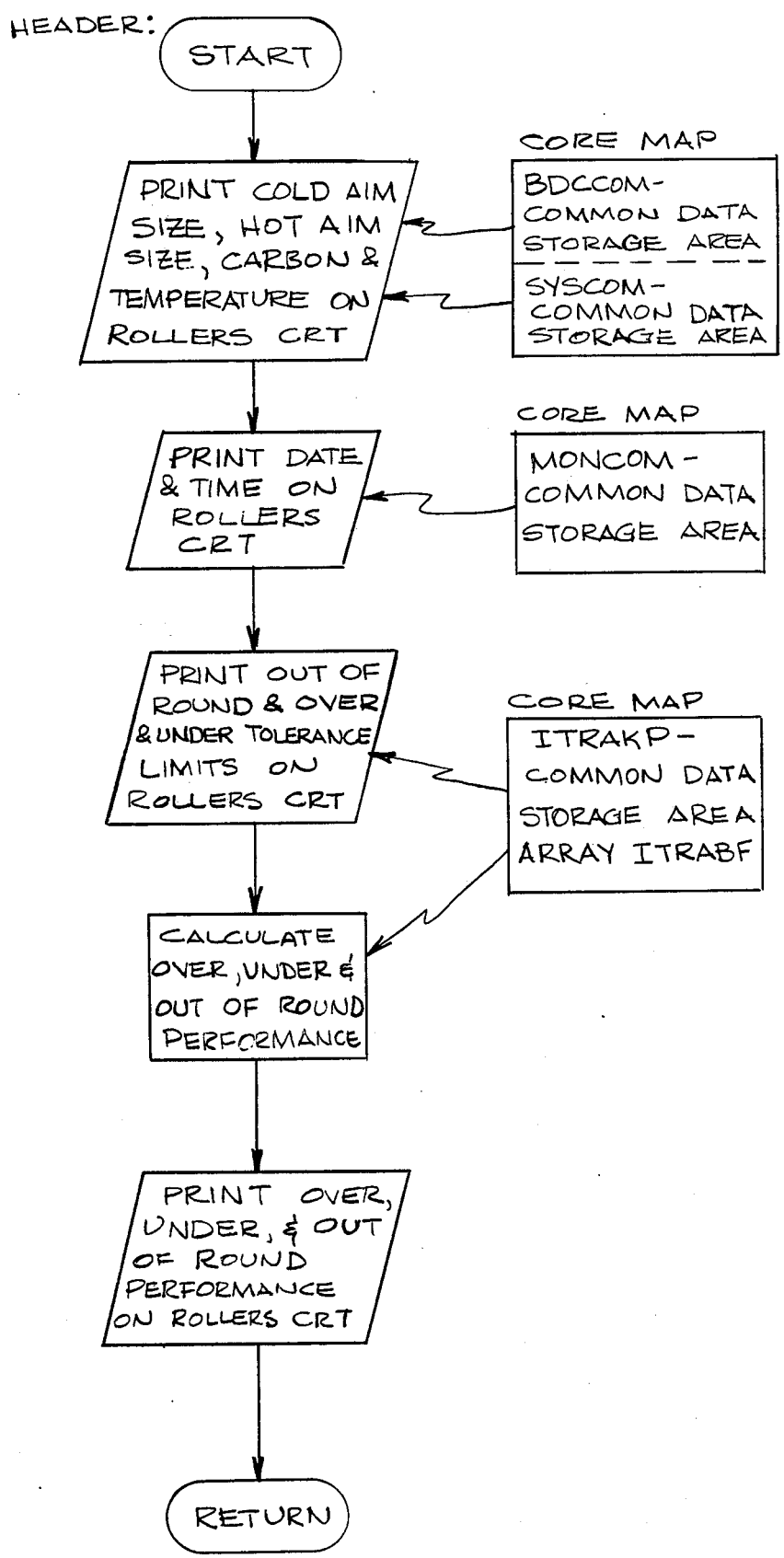

HEADER, see FIG. 40. This on-line program writes the bar cold aim size, carbon and temperature on CRT 60. Next, it writes the date, time, maximum tolerance, minimum tolerance, and out-of-round tolerance or CRT 60 also. Next, it scans the profile table IBDGT1 and calculates the over, under and out-of-round performance based on the respective tolerance limits. It then prints these values and exits.

Figure 41A:
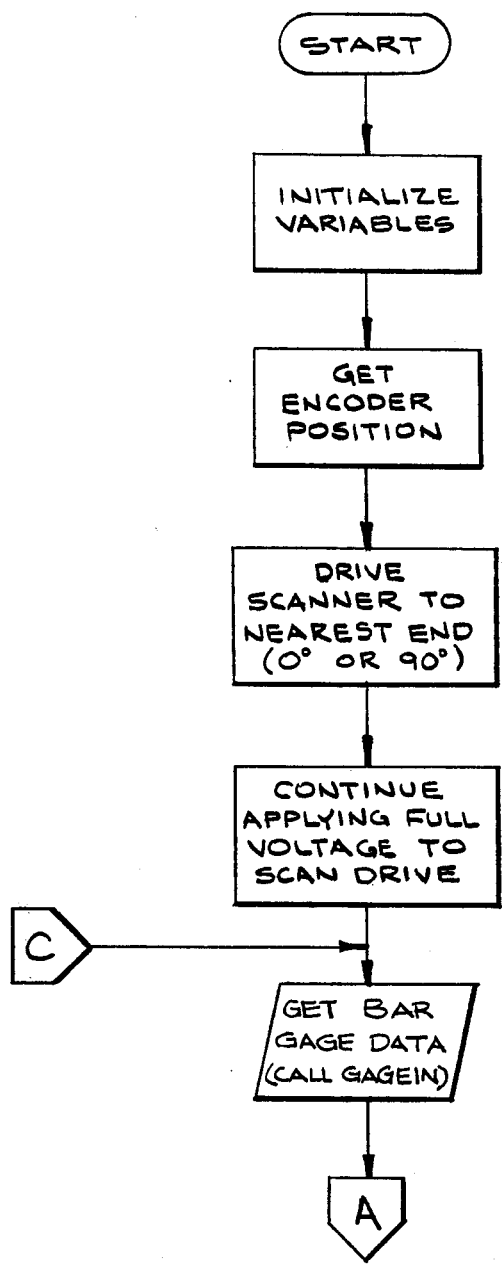
Figure 41:
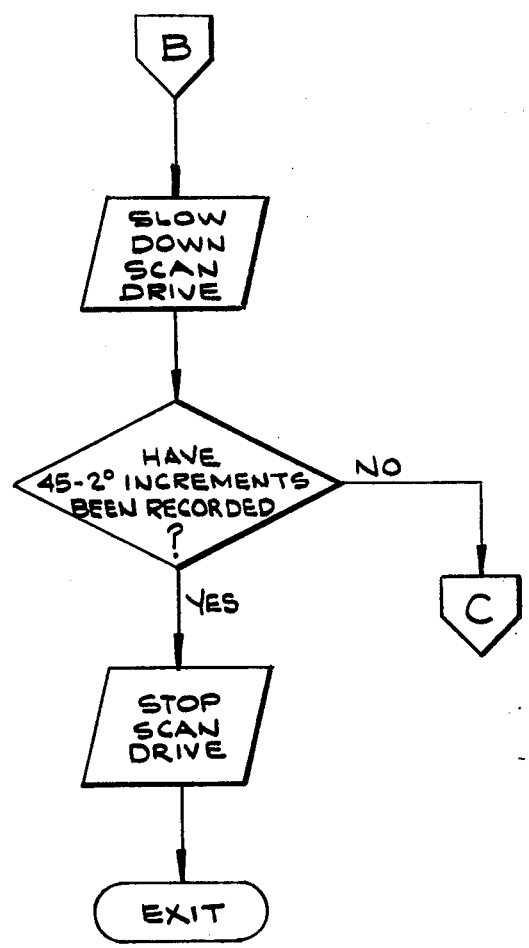
Figure 42A:
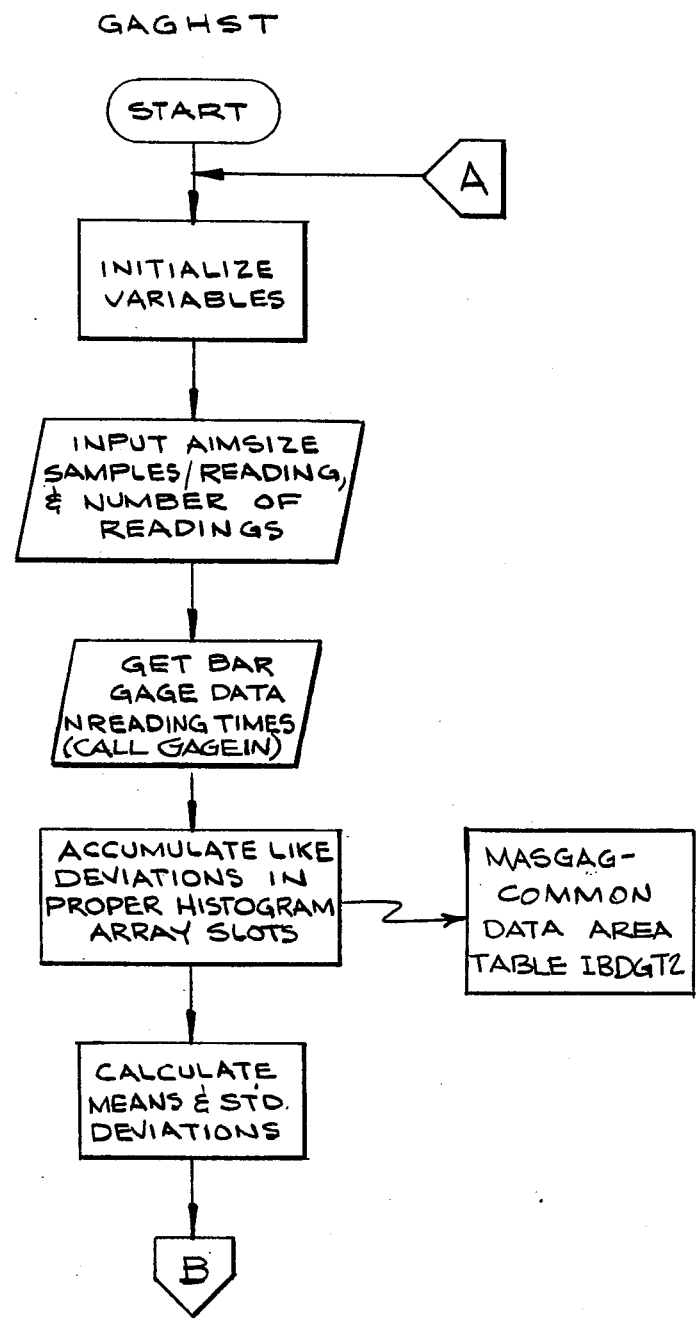
Figure 42B:
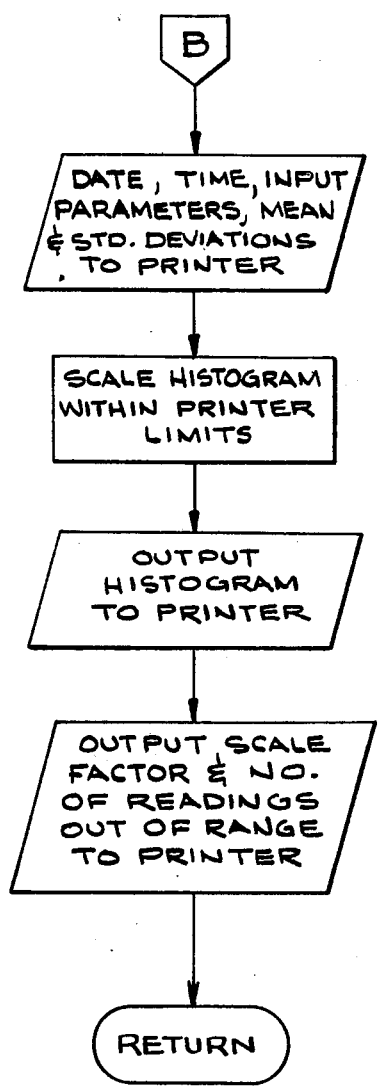
Figure 43:
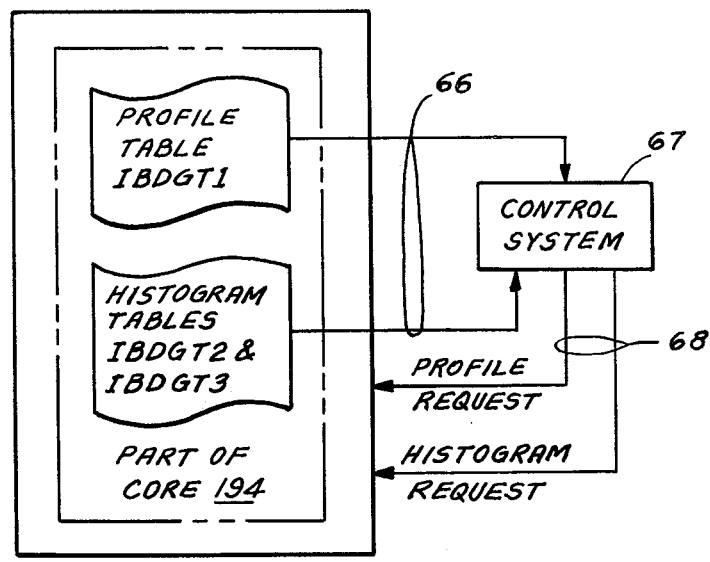
FIG. 43 is a flow chart showing the computer in FIG. 1 communicating with a control system which utilizes the profile and histogram of the present invention.

GAGPRO, see FIGS. 41A-C. This program is run under the gage on-line system. It requires no operator intervention. Its purpose is to scan the camera through a complete 90° cycle and build a profile table containing the deviations for each 2° increment IBDGTI(94). It does not plot this data.

There are three possible error conditions generated.

1. Scan motor failure — indicates that the motor didn't start, or an end of the scan cycle was not found (0° or 90°).

2. Encoder failure — generated if the ready bit was not generated by the encoder.

3. IDL failure — generated if an IDL transfer time-out occurs.

HISTOGRAM PROGRAM (204)

GAGHST, see FIG. 42A-D. This program runs under the on-line and off-line gage system. It requires operator intervention. Its purpose is to gather a number of readings from each head and print a histogram for each head binned at 0.0002 inch increments for a range of 0.005 to −0.005 inches. In addition, it calculates and prints the mean and standard deviation of all readings from each head. The operator must enter the number of readings desired and the aim size.

We claim:

1. An electro-optical system for gaging two dimensions of a moving bar at various peripheral positions of the bar, comprising:

(a) first and second electronic camera head means aimed to receive first and second images of the moving bar and generate corresponding first and second raw camera signals, each raw camera signal having at least one error;

(b) scanner means adapted to scan the first and second electronic camera head means about the lateral profile of the bar a prescribed angular displacement while generating a scanner position signal;

(c) means for controlling movement of the scanner means;

(d) electronic circuit means including means for processing the first and second raw camera signals to produce corresponding first and second bar size pulses, each first and second bar size pulse having at least one said error;

(e) calculator means assimilating the first and second bar size pulses, the scanner position signal and at least one corresponding error-compensating signal for:

1. compensating each bar size pulse for one or more sources of error as a function of a corresponding one or more error-compensating signals, thereby to produce corresponding first and second corrected bar size pulses, 2. plotting bar profile using corrected first and second bar size pulses and scanner position signals, and 3. storing the bar profile data and optionally the corrected first and second bar size data; and (f) means for utilizing the stored data to indicate and/or record a corrected bar profile and, if desired, each bar size measurement.

2. The system of claim 1 wherein each electronic camera head means is back-lighted.

3. The system of claim 1 wherein each electronic camera head means includes a telecentric lens system to permit imaging of bar movement anywhere in a prescribed field-of-view.

4. The system of claim 1 wherein each electronic camera head means includes an image responsive device adapted to be scanned electronically, and the electronic circuit means further includes a sweep generator for driving the scanning of each image responsive device.

5. The system of claim 4 wherein the sweep generator is circuited for a single axis scan of the image responsive device.

6. The system of claim 4 wherein the sweep generator is circuited for a linear bidirectional sweep cycle having equal upsweep and downsweep half cycles.

7. The system of claim 6 further including the electronic circuit means to include means responsive to the first and second bar size pulses for producing respective first error-compensating signals relating to first and second bar centerline position data, and the calculator means is modified to receive the respective first error-compensating signals and to effectively compensate the first and second bar size pulses according to a predetermined value of corresponding bar centerline position data.

8. The system of claim 7 wherein each of the first and second bar centerline position data is produced in response to detecting successive bar size pulse leading edges in respective upsweep and downsweep halves of a corresponding first and second camera means bidirectional sweep cycle and determining the bar centerline position to be half of the distance between the successive bar size pulse leading edges.

9. The system of claim 4 wherein the sweep generator is circuited for a nonlinear bidirectional sweep cycle.

10. The system of claim 4 wherein each image responsive device includes one or more calibration masks, the electronic circuit means includes respective means for offsetting each scan from a central sweep to one of the calibration masks, and the calculator means is a programmed computer adapted to include a program for recalibrating the gaging system without a bar by controlling the selection and use of each calibration mask in response to an appropriate command signal.

11. The system of claim 1 wherein each electronic camera head means includes a variable-gain image responsive device, and the electronic circuit means includes a selfbalancing measuring loop having an automatic gain control ciuruit for varying image device gain to maintain output current constant.

12. The system of claim 1 wherein the camera pulse processing means includes an autocorrelator for removing camera signal noise.

13. The system of claim 1 wherein the camera pulse processing means includes differentiated pulse edge detection circuitry for each raw camera signal and an autocorrelator to remove noise from each differentiated raw camera signal.

14. The system of claim 1 wherein the calculator means is a programmed computer adapted to include a scanner means position control program to act on the scanner position control means.

15. The system of claim 1 wherein the calculator means ia a programmed computer adapted to receive respective first and second error-compensating signals and include a compensation program that will effectively correct each of the first and second bar size pulses for camera field-of-view.

16. The system of claim 1 wherein the calculator means is a programmed computer adapted to receive respective third and fourth error-compensating signals and include a compensation program that will effectively correct each of the first and second bar size pulses for offset and drift factors in response to the third and fourth error-compensating signals, respectively.

17. The system of claim 1 further including means for sensing bar temperature and producing a bar temperature signal as a fifth error-compensating signal, and wherein the calculator means is a programmed computer adapted to receive the fifth error-compensating signal and include a compensation program that will effectively correct each of the first and second bar size pulses to a cold size proportional to the bar temperature signal representing the fifth error-compensating signal.

18. The system of claim 17 further including means for producing a bar composition signal as a sixth error-compensating signal and wherein the calculator means is a programmed computer also adapted to receive the sixth error-compensating signal and include a compensation program that will effectively correct each of the first and second bar size pulses for bar composition effect on temperature correction.

19. The system of claim 1 wherein the calculator means is a programmed computer adapted to include a program for calibrating and/or recalibrating the gaging system in response to one or more appropriate command signals.

20. The system of claim 1 further including a source of bar aim size data, and wherein the calculator means is a programmed computer adapted to receive the bar aim size data and include a profile deviation program for plotting and storing bar profile deviation from the aim size data in response to an appropriate command signal.

21. The system of claim 20 further including a source of bar size tolerance data, and the profile deviation program is modified to overlay the bar size tolerance in the plotting and storing of bar profile deviation data in response to a first modified command signal.

22. The system of claim 20 wherein the calculator means is a programmed computer adapted to include a histogram program for plotting and storing a gaging system histogram in response to a second modified command signal.

23. An electro-optical system for gaging two dimensions of a moving bar at various peripheral positions of the bar, comprising:
(a) first and second electronic camera head means aimed to receive first and second images of the moving bar on a central portion of an electronically scanned image responsive device and generate corresponding first and second raw camera signals, each image responsive device having one or more calibration masks alongside the central portion thereof, each raw camera signal having at least one error;
(b) scanner means adapted to scan the first and second electronic camera head means about the lateral profile of the bar a prescribed angular displacement while generating a scanner position signal;
(c) means for controlling movement of the scanner means;
(d) electronic circuit means including means for processing the first and second raw camera signals to produce corresponding first and second bar size pulses, each first and second bar size pulse having at least one said error, said first and second electronic circuit means further including a sweep generator for driving the scanning of each image responsive device, and means for offsetting the scan from a central sweep to a calibration mask;

(e) calculator means assimilating the first and second bar size pulses, the scanner position signal and at least one corresponding error-compensating signal for:
 1. compensating each bar size pulse for one or more sources of error as a function of a corresponding one or more error-compensating signals, thereby to produce corresponding first and second corrected bar size pulses,
 2. calibrating the gaging system using a standard bar,
 3. recalibrating the gaging system without a bar by controlling the selection and use of a calibration mask,
 4. plotting bar profile using either calibrated or recalibrated first and second bar size pulses and scanner position signals, and
 5. storing the bar profile data and optionally either the calibrated or recalibrated first and second bar size data; and (f) means for utilizing the stored data to indicate and/or record recalibrated bar profile and, if desired, each recalibrated bar size measurement.

24. An electro-optical method of gaging two dimensions of a moving bar at various peripheral positions, which method comprises:

(a) imaging a moving bar upon first and second electronic cameras head means and generating corresponding first and second raw camera signals, each raw camera signal having at least one error;

(b) scanning the lateral profile of said bar with the first and second electronic cameras head means while traversing a predetermined angular displacement and generating a scanning position signal;

(c) controlling scanning means movement;

(d) processing the first and second raw camera signals to produce corresponding first and second bar size pulses which represent the two bar dimensions;

(e) assimilating the first and second bar size pulses, the scanner position signal, and at least one error-compensating signal, and calculating:
 1. correction factors to compensate the first and second bar size pulses for one or more sources of error as a function of corresponding one or more error compensating signals, and subsequently producing corresponding first and second corrected bar size pulses,
 2. a plot of bar profile using the first and second corrected bar size signals and the scanner means position signal, and storing the bar profile data and optionally the corrected first and second bar size data; and (f) utilizing the stored data to indicate and/or record bar profile and, if desired, each bar size measurement.

* * * * *

UNITED STATES PATENT OFFICE
CERTIFICATE OF CORRECTION

PATENT NO. : 4,121,292
DATED : October 17, 1978
INVENTOR(S) : Tom L. Galanis, et al.

It is certified that error appears in the above-identified patent and that said Letters Patent are hereby corrected as shown below:

Col. 1, line 30 and 31, "determined" should read --determine--.

Col. 6, line 5, "sanner" should read --scanner--.

Col. 8, line 39 and 40, "crossectional" should read --cross-sectional-- (should be hyphenated).

Col. 9, line 30, "dottedline" should read --dotted-line-- (should be hyphenated).

Col. 10, line 36, "separator" should read --separate--.

Col. 12, line 25, the word "reset" should be added after "sweep".

Col. 12, line 51, "some" should read --same--.

Col. 12, line 54, "28" should read --98--.

Col. 12, line 65, "ae" should read --are--.

Col. 13, line 28, "side" should read --size--.

Col. 13, line 54, "alternatively" should read --alternately--.

Col. 15, line 42, "correlation" should read --correction--.

Col. 15, line 58, "of" should read --in--.

Col. 16, line 29, "of" should read --to--.

Col. 19, line 12, "IIJ" should read --11I--.

Col. 19, line 12, "if" should read --is--.

UNITED STATES PATENT AND TRADEMARK OFFICE
CERTIFICATE OF CORRECTION

PATENT NO. : 4,121,292

DATED : October 17, 1978

INVENTOR(S) : Tom L. Galanis et al

It is certified that error appears in the above–identified patent and that said Letters Patent are hereby corrected as shown below:

Column 19, line 66, "154" should read -- 145 --.

Signed and Sealed this

Twelfth Day of June 1979

[SEAL]

Attest:

RUTH C. MASON
*Attesting Officer*

DONALD W. BANNER
*Commissioner of Patents and Trademarks*